April 18, 1933.  D. L. LINDQUIST ET AL  1,904,646

ELEVATOR SYSTEM

Filed Feb. 3, 1925  15 Sheets-Sheet 1

April 18, 1933.　　D. L. LINDQUIST ET AL　　1,904,646
ELEVATOR SYSTEM
Filed Feb. 3, 1925　　15 Sheets-Sheet 2
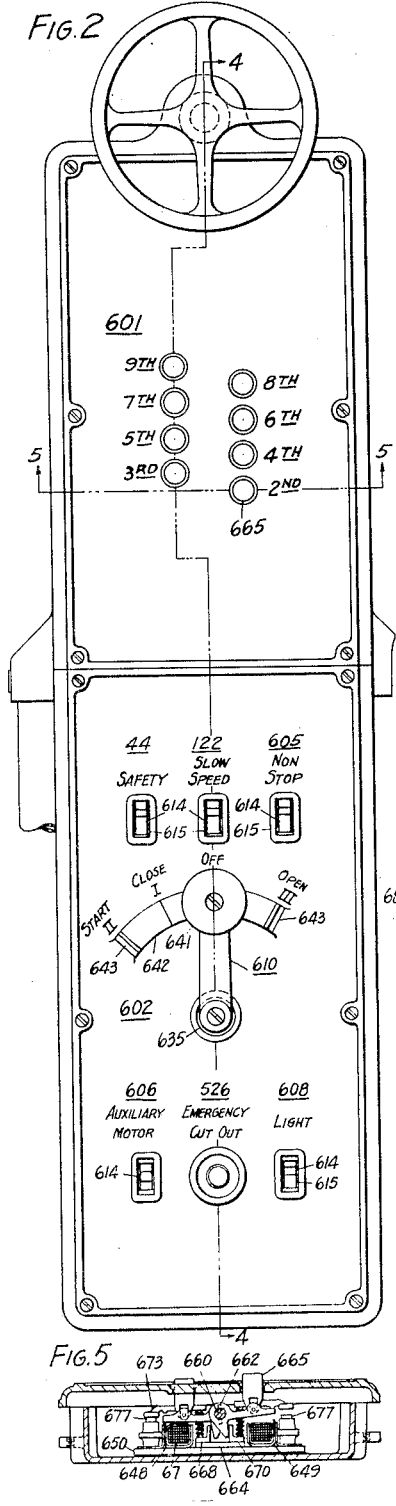
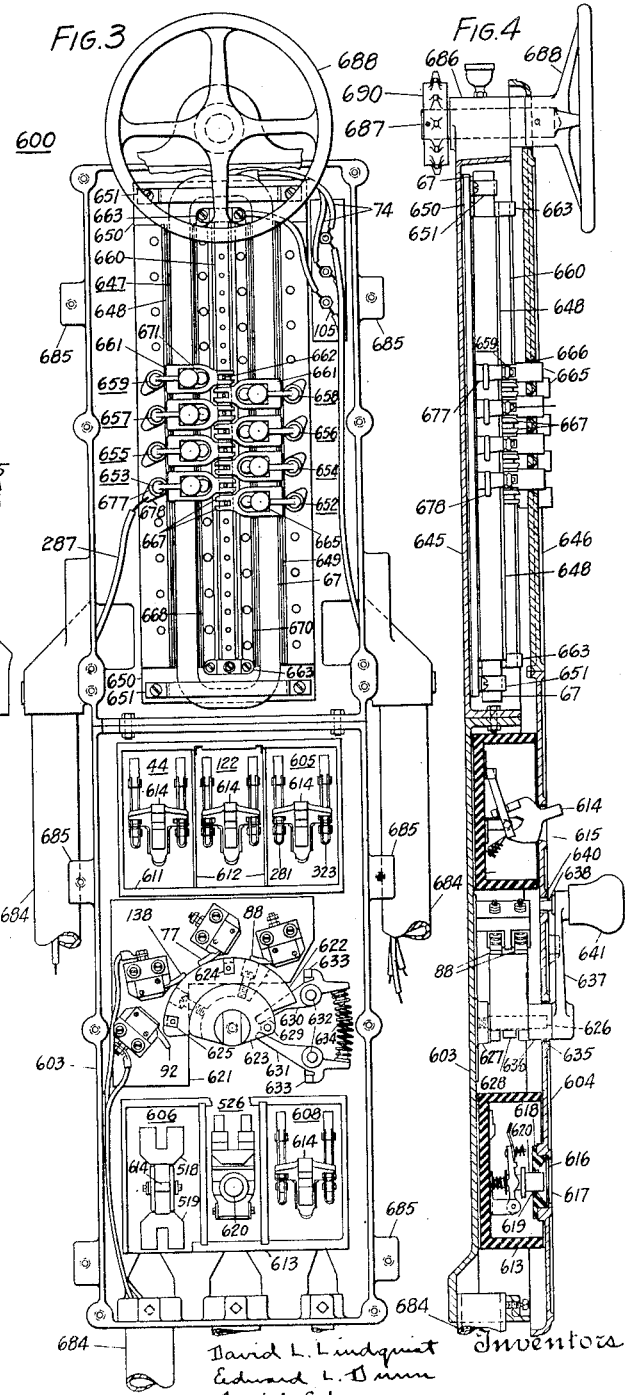

April 18, 1933.  D. L. LINDQUIST ET AL  1,904,646
ELEVATOR SYSTEM
Filed Feb. 3, 1925  15 Sheets-Sheet 3

David L. Lindquist
Edward L. Dunn
David C. Larson
Inventors
By their Attorney Walter F. Bradley April 18, 1933. D. L. LINDQUIST ET AL 1,904,646
ELEVATOR SYSTEM
Filed Feb. 3, 1925 15 Sheets-Sheet 4
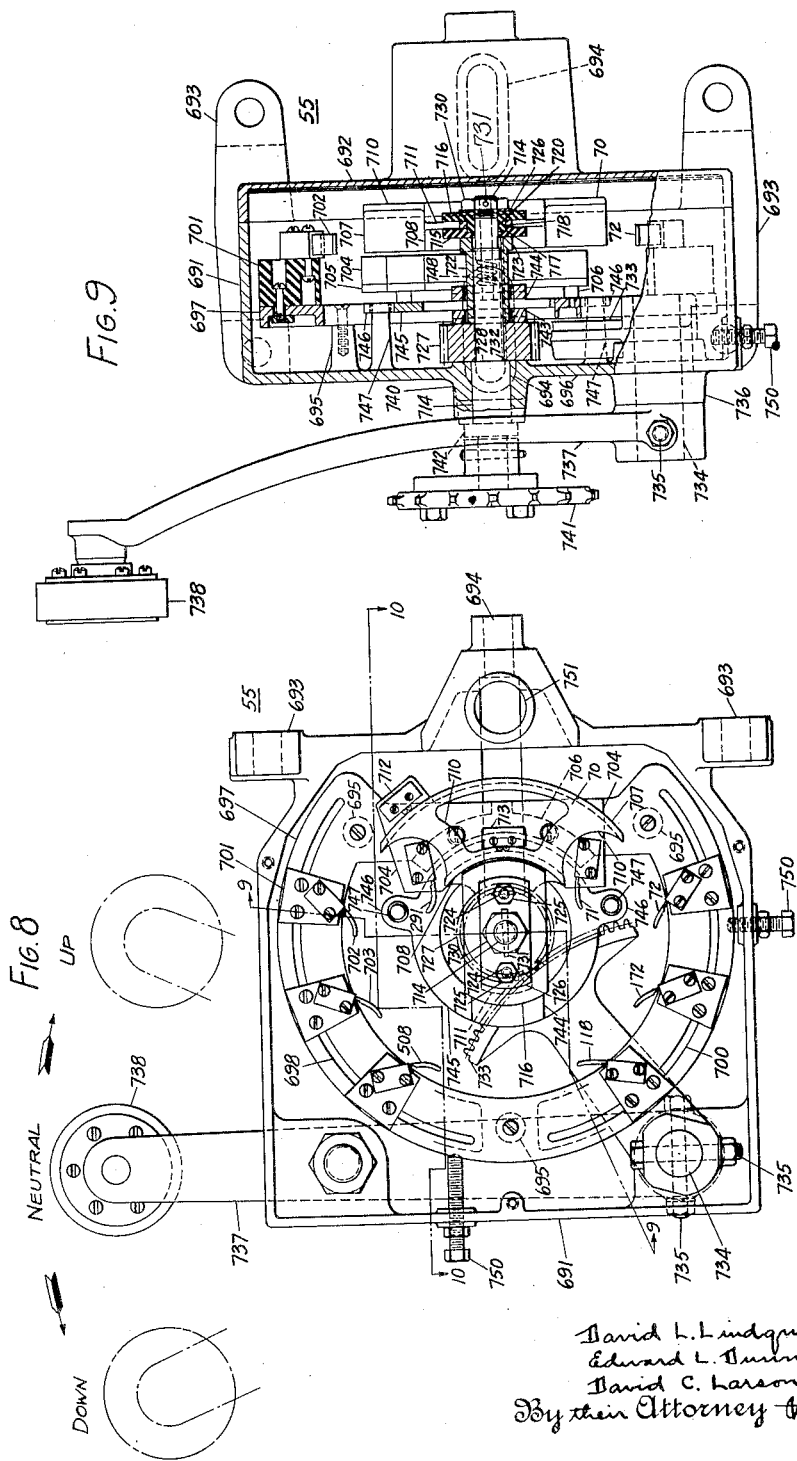

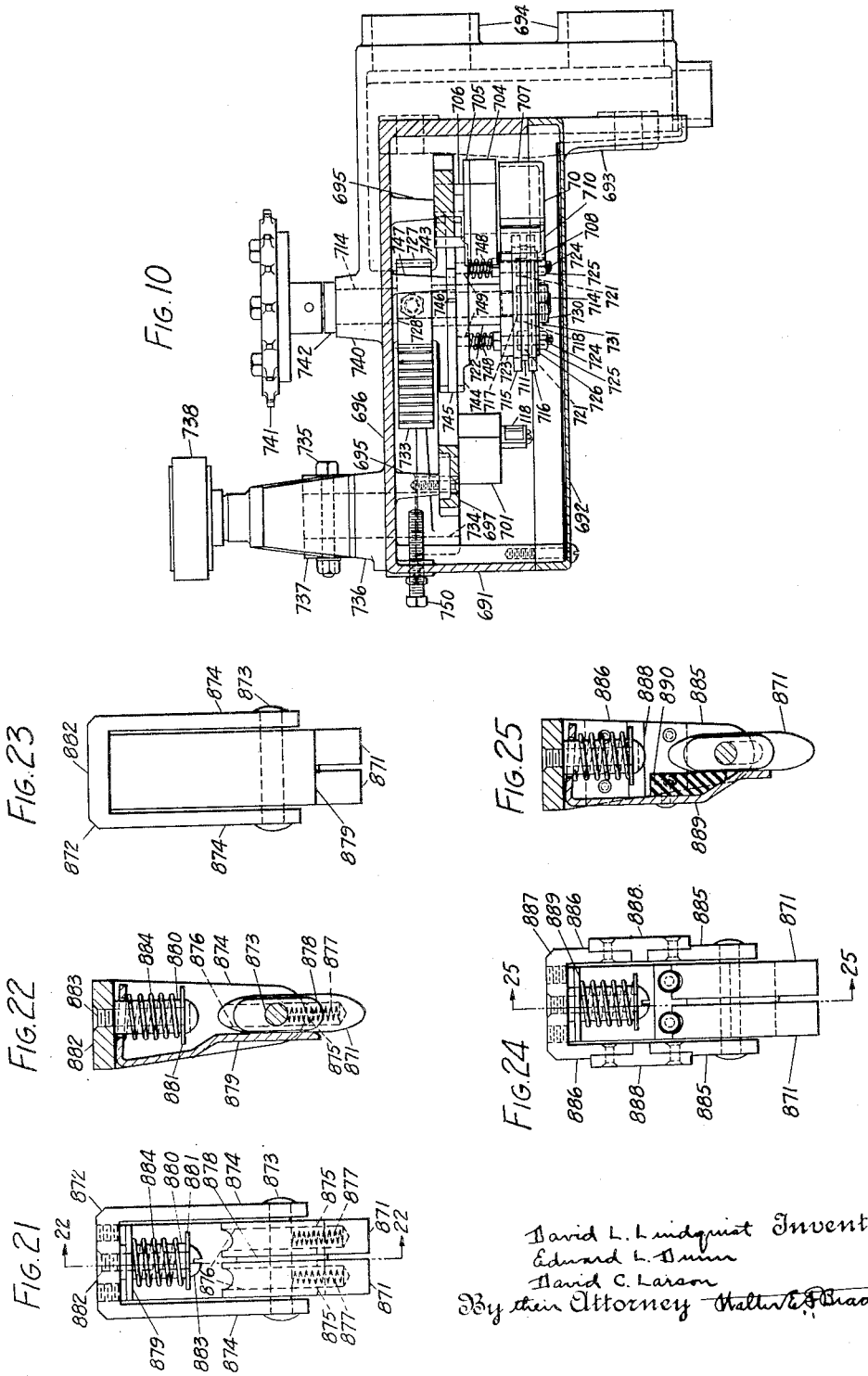

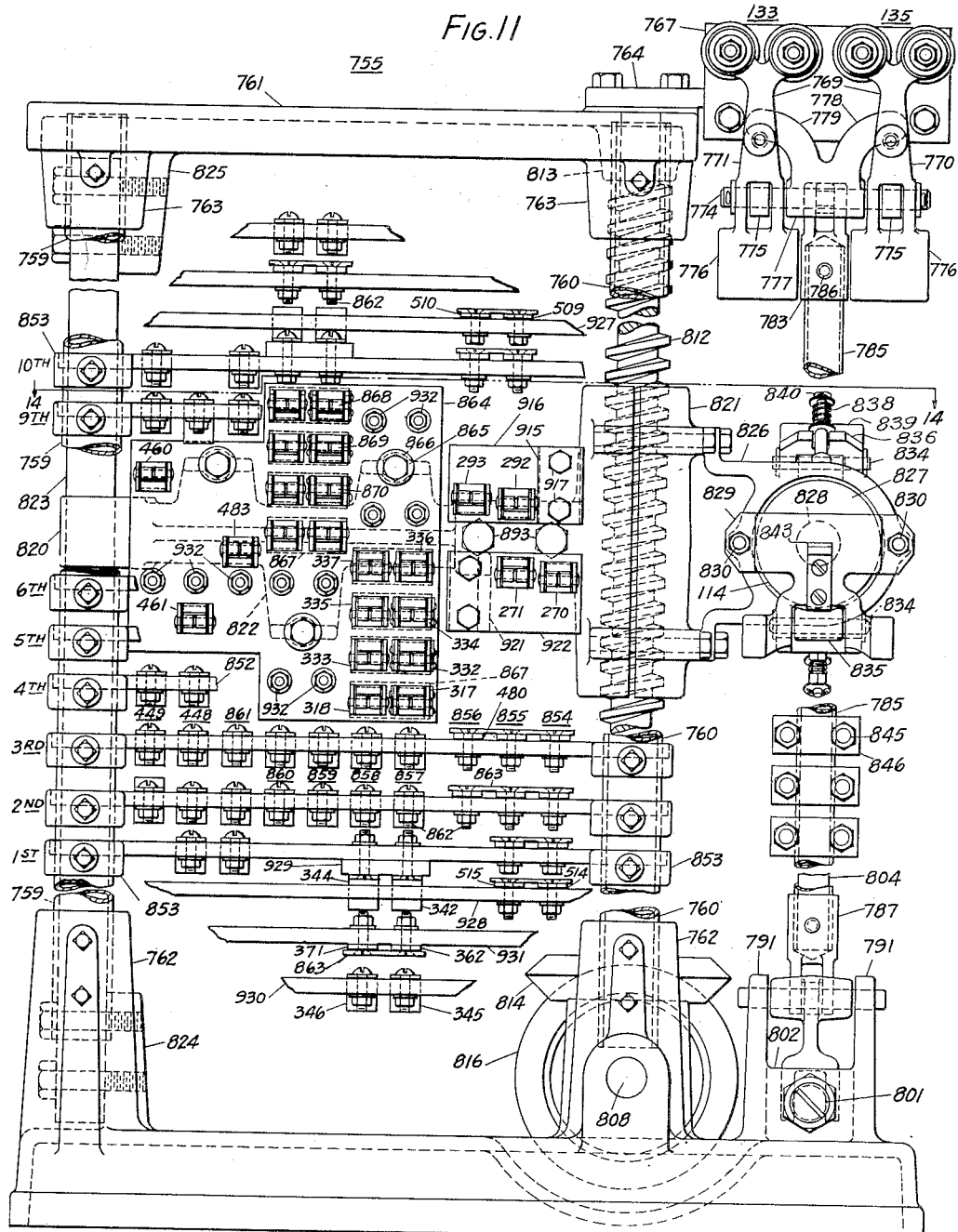

April 18, 1933.     D. L. LINDQUIST ET AL     1,904,646
ELEVATOR SYSTEM
Filed Feb. 3, 1925     15 Sheets-Sheet 7
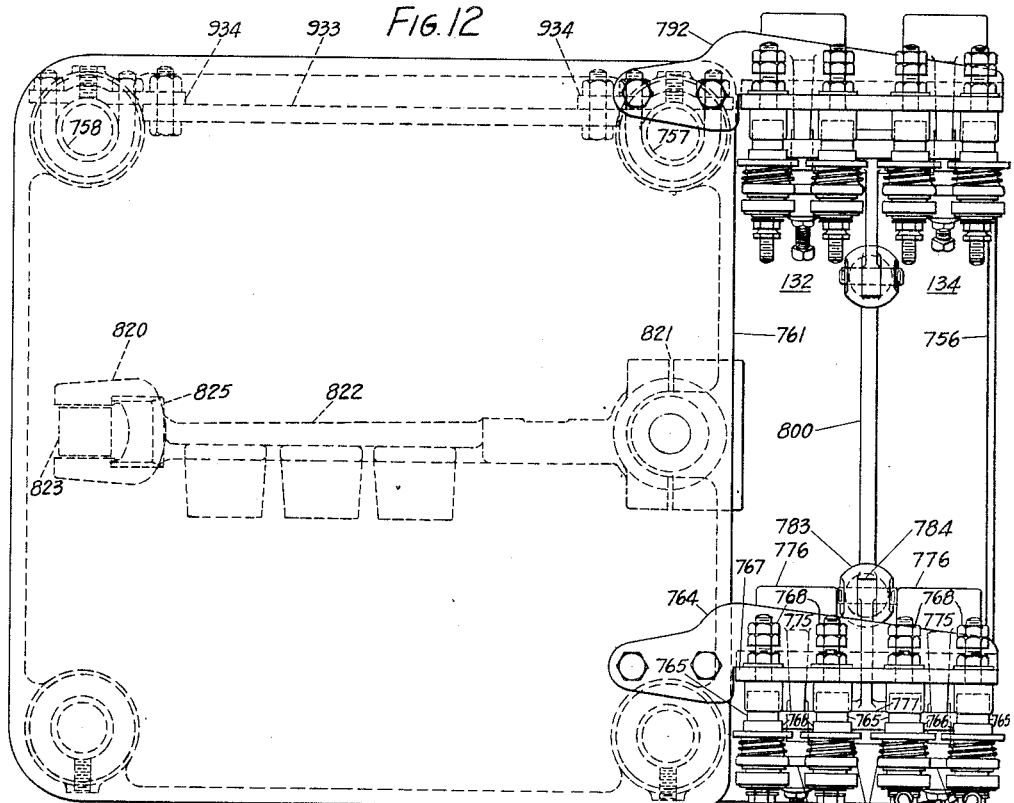
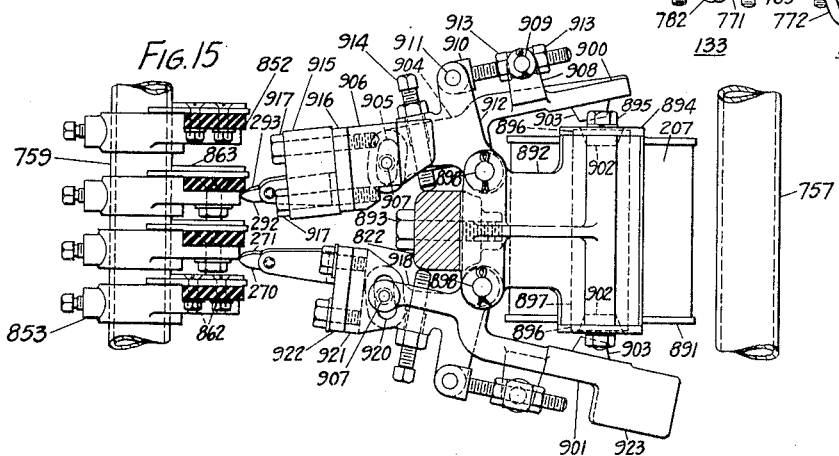
David L. Lindquist Inventors
Edward L. Dunn
David C. Larson
By their Attorney Walter F. Bradley

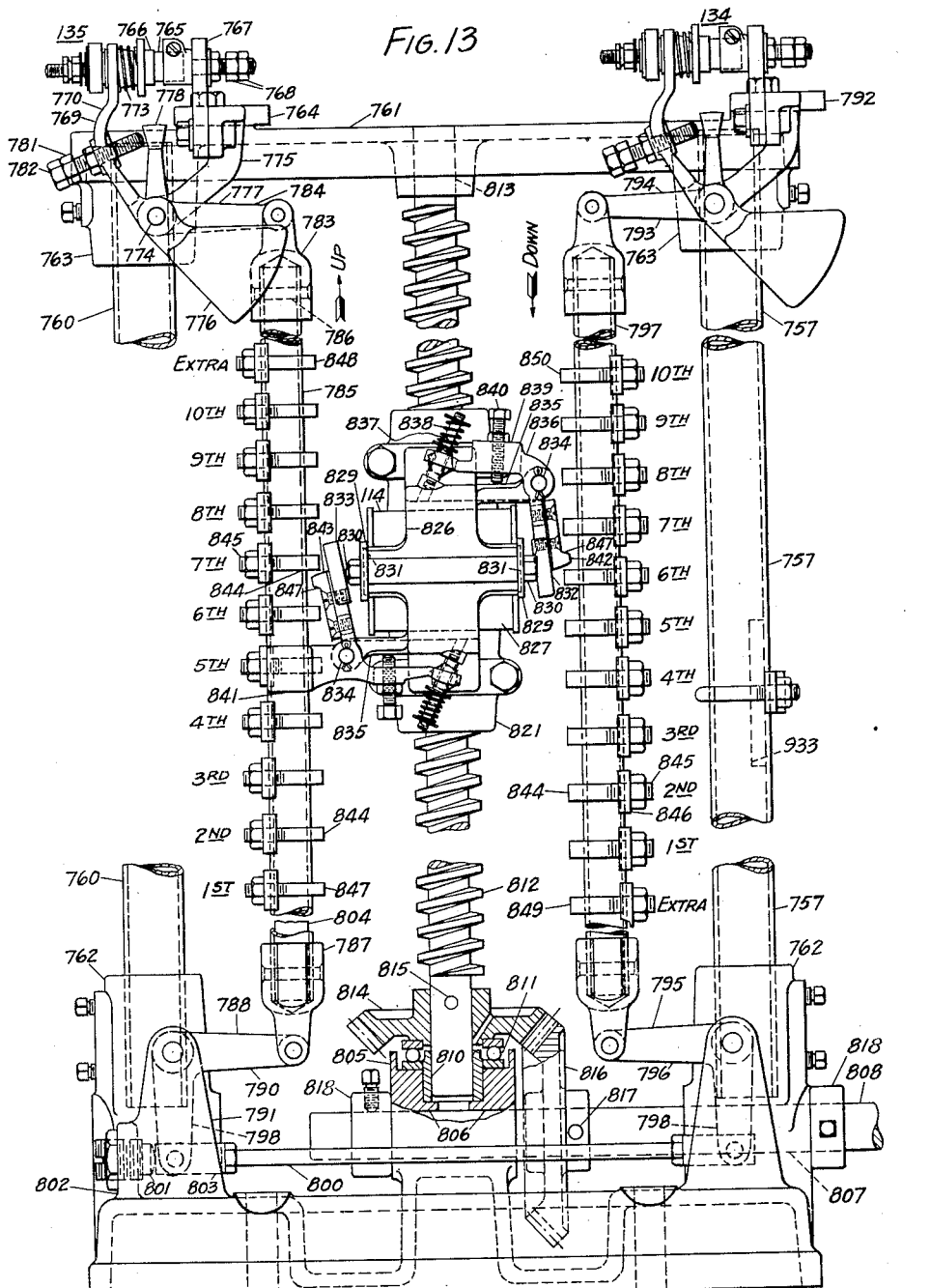

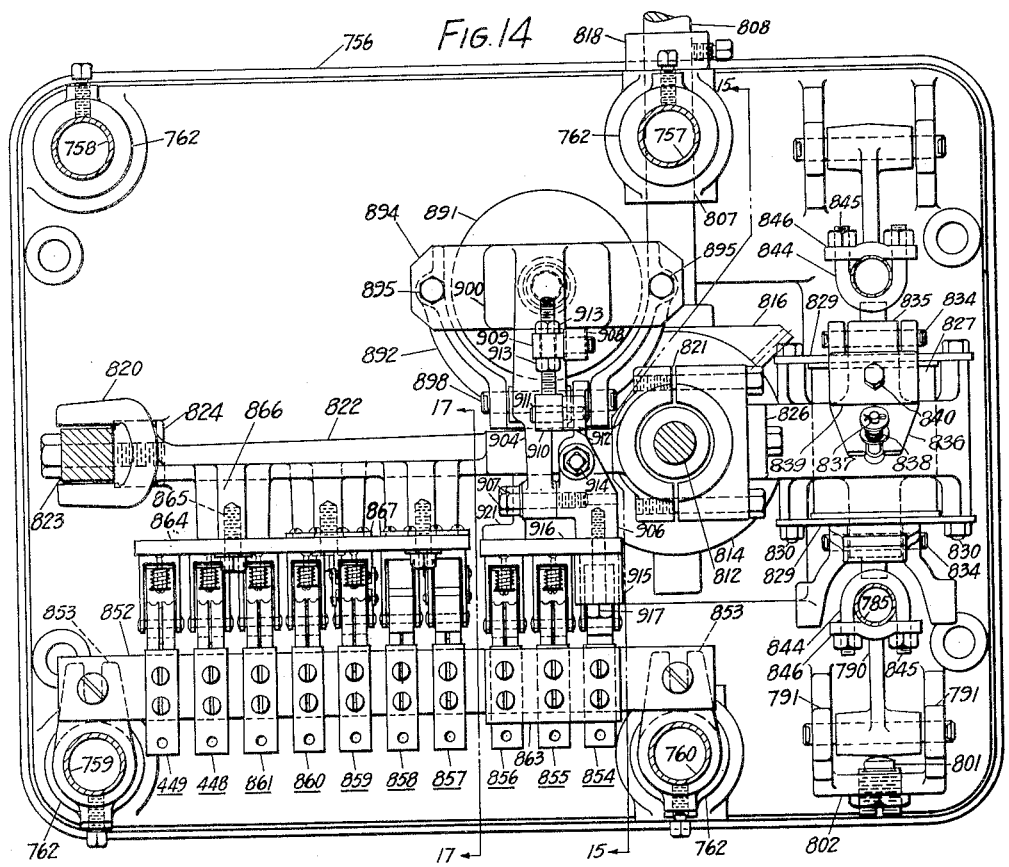
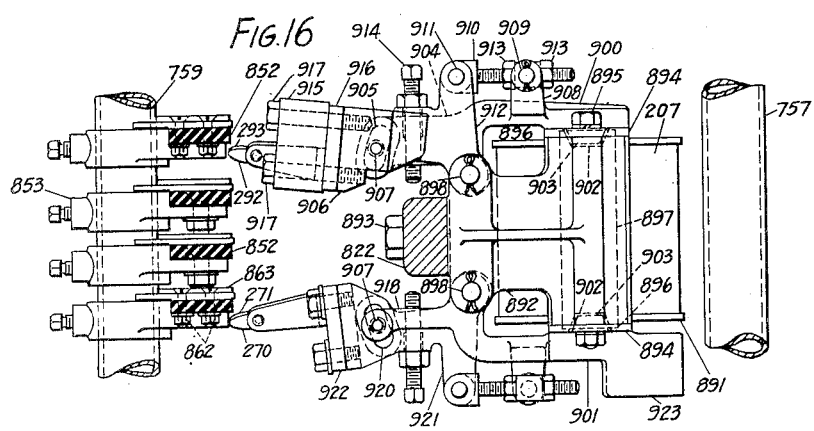

April 18, 1933. D. L. LINDQUIST ET AL 1,904,646
ELEVATOR SYSTEM
Filed Feb. 3, 1925 15 Sheets-Sheet 10
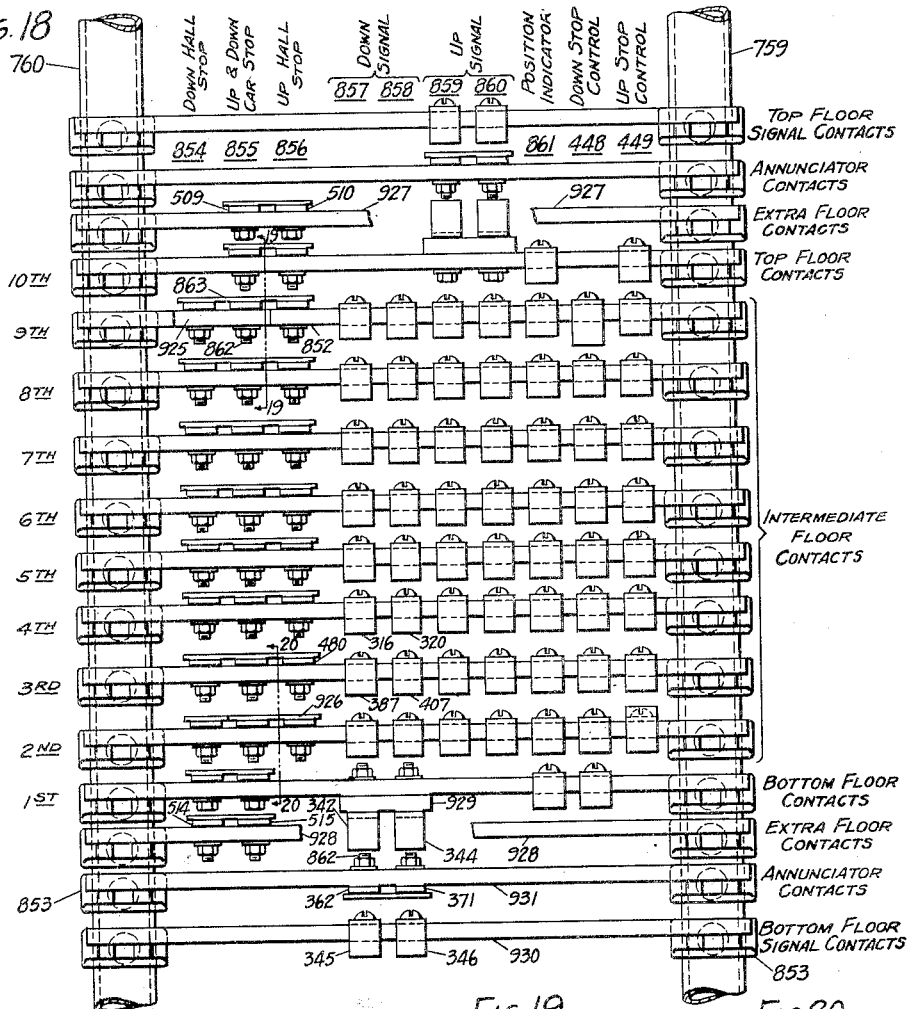
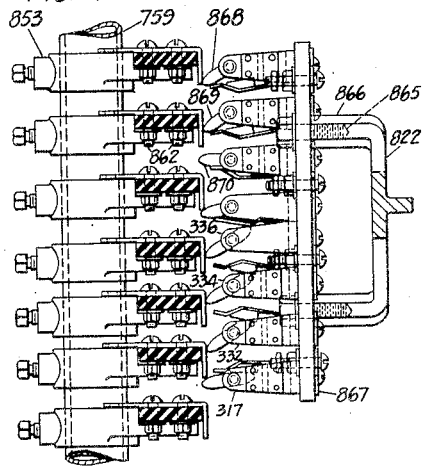
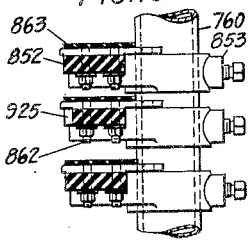
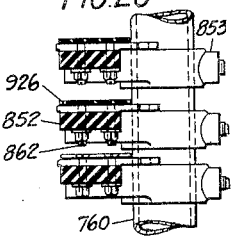

April 18, 1933.  D. L. LINDQUIST ET AL  1,904,646
ELEVATOR SYSTEM
Filed Feb. 3, 1925   15 Sheets-Sheet 11
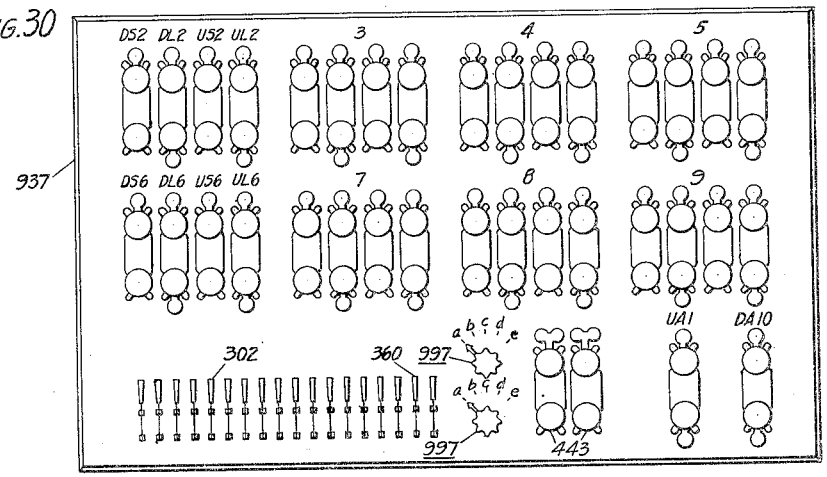
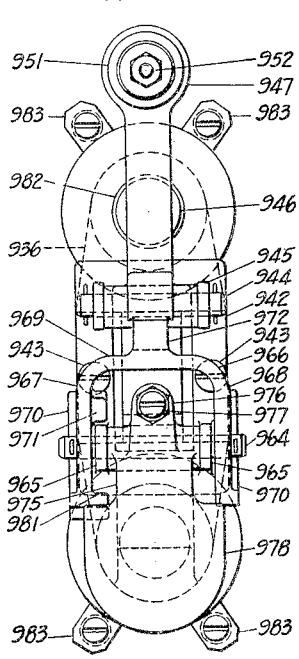
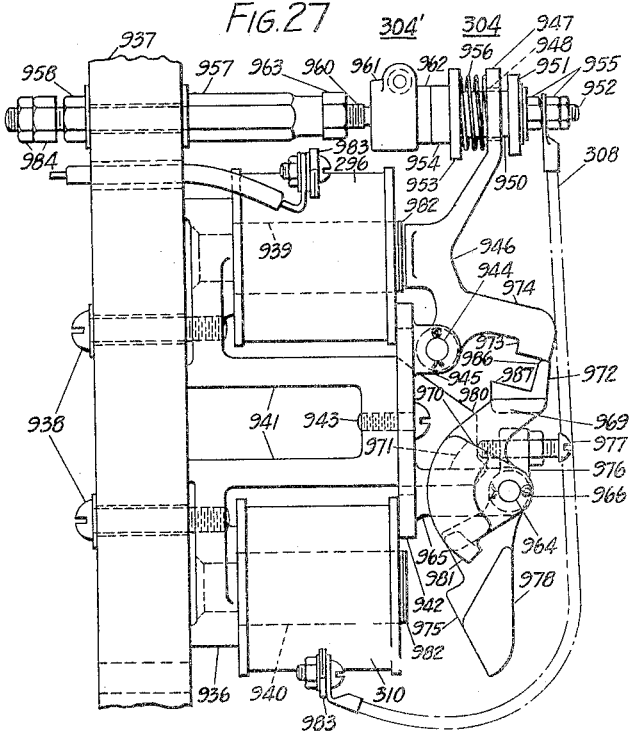

April 18, 1933.  D. L. LINDQUIST ET AL  1,904,646

ELEVATOR SYSTEM

Filed Feb. 3, 1925   15 Sheets—Sheet 12

David L. Lindquist, Edward L. Dunn, David C. Larson, Inventors
By their Attorney April 18, 1933.  D. L. LINDQUIST ET AL  1,904,646
ELEVATOR SYSTEM
Filed Feb. 3, 1925   15 Sheets-Sheet 15

Patented Apr. 18, 1933                                                1,904,646

UNITED STATES PATENT OFFICE

DAVID L. LINDQUIST, OF HARTSDALE, NEW YORK, AND EDWARD L. DUNN, OF EAST ORANGE, NEW JERSEY, AND DAVID C. LARSON, OF YONKERS, NEW YORK, ASSIGNORS TO OTIS ELEVATOR COMPANY, OF JERSEY CITY, NEW JERSEY, A CORPORATION OF NEW JERSEY

ELEVATOR SYSTEM

Application filed February 3, 1925. Serial No. 6,561.

This invention relates to elevator systems.

The principal object of the invention is to provide an elevator system wherein the maximum of service with greatly increased efficiency of operation may be obtained with a single elevator car or with a bank of elevator cars.

One feature of the invention is to have the starting of an elevator car under the control of an operator, with the stopping of the car, to pick up prospective passengers, under the control of the passengers themselves, without further act of the operator.

Another feature is to have the car stop to discharge passengers at floors selected by the operator, the stopping operation being automatic.

A third feature involves the stopping of only one car of a bank of elevators at a landing in response to the pushing of a button by a prospective passenger.

A fourth feature resides in automatically signalling the approach of a car about to stop at a landing, when the stop is caused by a prospective passenger, without signalling the approach when the stop is caused by the operator.

Other features and advantages will become apparent from the following description, taken in connection with the accompanying drawings wherein one embodiment of the invention is illustrated and in which:—

Figure 2 is a front elevation of the car operating box;

Figure 3 is a similar view with the cover plates removed;

Figure 4 is a view in vertical section taken along the line 4—4 of Figure 2;

Figure 5 is a view in horizontal section taken along the line 5—5 of Figure 2;

Figure 8 is a front elevation of the "director switch", with the cover plate removed;

Figure 9 is a view, partly in elevation and partly in section, along line 9—9 of Figure 8;

Figure 10 is a view in horizontal section taken along the line 10—10 of Figure 8;

Figure 11 is a side elevation, with parts broken away, of the selector machine;

Figure 12 is a plan view of the same;

Figure 13 is a front elevation of the same, with parts omitted to emphasize particularly the slow-down and stop mechanism;

Figure 14 is a view in horizontal section taken along the line 14—14 of Figure 11;

Figure 15 is a detail of the brush magnet and stop brushes taken along line 15—15 of Figure 14, showing the position of the brushes relative to their contacts when the brush magnet is not energized;

Figure 16 is a similar view but with the brush magnet energized;

Figure 17 is a detail of the signal brushes and their contacts taken along line 17—17 of Figure 14;

Figure 18 is a face view of the stationary contacts showing their arrangement in the selector machine;

Figure 19 is a detail taken along the line 19—19 of Figure 18;

Figure 20 is a similar detail taken along the line 20—20 of Figure 18;

Figure 21 is a detail in plan of one type of brush used in the selector machine;

Figure 22 is a section, with parts in elevation, along line 22—22 of Figure 21;

Figure 23 is a bottom view of the brush;

Figure 24 is a detail of another type of brush;

Figure 25 is a section, with parts in elevation, along line 25—25 of Figure 24;

Figure 26 is a front elevation of a floor stop switch;

Figure 27 is a side elevation of the same;

Figure 30 is a diagrammatic representation of an arrangement of the switches mounted on the "stop and signal" panel;

Figure 1:
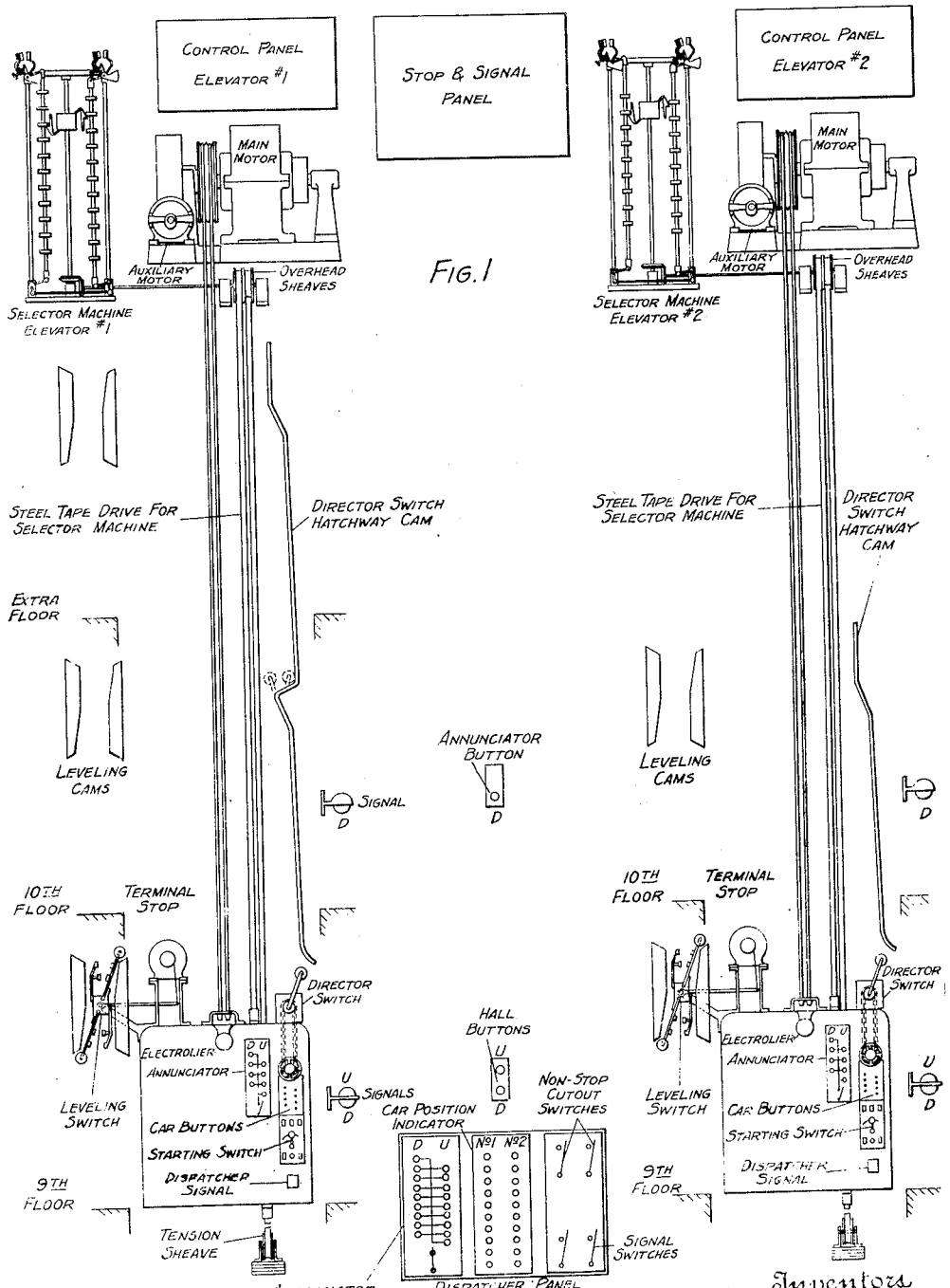
Figure 1 is a simplified schematic representation of two elevators, as illustrative of a group of elevators in a bank.

For a general understanding of the invention, reference may be had to Figure 1 wherein various parts of the system are indicated by legend. Referring particularly to the left hand half of the figure wherein the parts for one elevator, hereinafter to be known as Elevator No. 1, are represented, the car is driven by the main motor controlled by various electromagnetic switches mounted on the control panel. The starting of the car is under control of an operator in the car, a starting switch, preferably arranged in the car operating box, being provided for this purpose. The starting switch is not employed to determine the direction of travel of the car, it being preferred to arrange a separate switch for this purpose. This "director switch" is reversed by the "director switch" hatchway cams at the terminal floors, being preferably mounted on the top of the car for convenience of operation.

Normally, once the car has started, it will continue to run until stopped by the selector machine. The selector machine is driven preferably by means of two steel tapes attached to the car. One tape extends from the top of the car to an overhead sheave around which it is wound in a manner similar to the winding of a measuring tape. The other tape extends from the bottom of the car around a tension sheave and then up to a second overhead sheave upon which it is similarly but oppositely wound. The overhead sheaves cause the operation of the selector machine, one tape winding up as the other is unwound in the driving operation. This silent drive is as positive as a sprocket chain and is unaffected by sliding or stretching ropes.

Push buttons are provided in the car, preferably arranged in the car operating box, for causing the selector machine to stop the car at the intermediate floors. A wheel or lever is also provided in the car for reversing the "director switch" by hand. In the event of extra floors, the hatchway cams are arranged to permit the return of the "director switch" with the car stopped at the terminal floor and to again reverse the switch as the extra floor is reached.

A leveling switch and leveling cams may be provided for causing the car to be brought to the landing in the event that an exact stop has not been made. An auxiliary motor also may be provided in the event that it is not desired to effect the leveling operation with the main motor.

The other elevators in a group, as indicated by Elevator No. 2, are arranged in an identical manner except that no provision may be made for extra floor runs. "Up" and "down" push buttons, common to all the elevators, are arranged at the intermediate floors. These push buttons, to be known as hall buttons, are for causing the selector machines to effect the operation of signals upon the approach of their respective cars and to stop the cars at the landings. The hall buttons are preferably arranged to act through floor stop switches and floor signal switches mounted on the "stop and signal" panel.

Each car may be provided with an annunciator for indicating the various calls to the operator, in which event buttons may be provided at the top and bottom floors for causing the operation of the annunciator for those floors. A separate annunciator and a position indicator may be provided on the dispatcher panel for the convenience of the dispatcher in directing the various cars of the group. Signal switches may be arranged on the dispatcher panel for operating signals in the various cars. Non-stop cut-out switches also may be arranged on this panel for insuring the response of the cars to calls from the various floors.

The system will be described as applied to a ten floor installation with extra top and bottom floors. It is to be understood, however, that the system may be arranged for any number of floors, ten being chosen merely for purpose of description. The car operating box, "director switch", selector machine and floor switches will be described for Elevator No. 1, it being understood that these devices are identical for all the elevators of a group.

Referring now to Figures 2 to 7 inclusive, the details of the preferred form of car operating box will be described. This box, designated as a whole by numeral 600, is separated into an upper and lower compartment, the upper compartment 601 for the magnetic push button apparatus and the lower compartment 602 for various control switches employed in the present system. The compartments may be joined in any suitable manner, for example by means of bolts as illustrated.

The lower compartment comprises a casing 603 and cover plate 604 within which the control switches are enclosed. These switches comprise safety switch 44, slow speed switch 122, non-stop switch 605, auxiliary motor switch 606, emergency cut-out switch 526, light switch 608 and starting switch 610. The safety, slow speed and non-stop switches are arranged in a group and mounted in an insulating box 611. The switches are separated by insulating partitions 612. The auxiliary motor, emergency cut-out and light switches are similarly arranged in insulating box 613. The boxes 611 and 613 are secured to the casing 603.

Safety switch 44, slow speed switch 122, non-stop switch 605 and light switch 608 may be of any suitable construction, being illustrated as double pole, single throw knife switches. Each switch is provided with an operating lever 614. Apertures 615, through which these levers extend, are provided in the cover plate 604. The safety switch, slow speed switch and light switch are provided with toggle arrangements (not shown), of any well known construction, for maintaining the switches in either closed or open positions. As it is desired to respond to all calls from the various floors except under certain conditions, as will be explained later, the non-stop switch is spring-biased to closed position. The two blades of the safety switch, slow speed switch and light switch are electrically connected. The blades of the non-stop switch, however, are unconnected, forming in effect two separate switches 281 and 323 for the hall stop and signal circuits respectively. The light switch is used for completing the circuit to the lamp in the car, indicated in Figure 1. The purpose of the other switches will be evident from the description of operation hereinafter set forth.

Auxiliary motor switch 606 in effect forms two switches 518 and 519. The switches are arranged in any suitable manner for connection to a common feed, such connection being diagrammatically represented in Figure 32. The switches are biased by means of a spring (not shown) tending to maintain them in open position. The operating lever 614 for the switches extends through an additional aperture 615 provided in cover plate 604.

The emergency cut-out switch 526 is a double pole switch, spring-biased to open position. The switch is mounted behind a glass plate 616 arranged in an aperture 617 in cover plate 604. The glass plate 616 is held against a seat, formed around the aperture 617, by means of a retainer 618. The retainer is formed with an aperture 619 for supporting the switch operating button 620. In operation, the glass plate must be broken before the switch can be closed.

Pairs of starting switch contacts 77, 88, 92 and 138 are mounted on a panel 621 secured to the casing 603. Contact bars 624 and 625, for bridging the pairs of contacts, are mounted on a segment 622 of insulating material. The segment 622 is carried by a segmental support 623, being secured thereto as by means of screws in the manner illustrated. Support 623 is pivotally mounted on a spindle 626 secured in a boss 627 formed on the base of casing 603. A positioning collar 628 is pinned to the spindle between the sides of support 623. A centering roller 629 is pivotally mounted between the sides of support 623 and is arranged to cooperate with centering arms 630 and 631 to return the starting switch to off or "neutral" position. These arms are pivotally mounted on the base of the casing by means of pins 632 and are forced against limit stops 633 by means of a centering spring 634. The stops 633 are arranged so that the centering arms cannot return the starting switch beyond the "neutral" position. Spring 634, however, will yield and permit the starting switch to be moved into its operative or contact bridging positions.

Casing cover 604 is provided with another aperture 635 for receiving the segmental support hub 636. Starting switch lever 637 is secured to the exterior end of the hub. With the starting lever in "neutral" position, a locking pin 638, provided on the lever, extends into an aperture 640 in cover plate 601. Pin 638 may be withdrawn from the aperture by outward movement of the starting switch handle 641, as is well understood in the art. An arcuate boss 642 is formed on cover plate 604 under the end of the starting lever. Stops 643 for the starting lever are arranged at each end of the boss, an intermediate oblique surface being provided at "close" position. Three operative positions are indicated on the cover plate, namely, "Close", "Start" and "Open". For convenience of description, these positions will be hereinafter referred to as position I, position II and position III respectively.

In operation, as the starting switch is moved to the left, pin 638 will strike against the oblique surface of the boss 642, indicating that position I has been reached. In this position, contact bar 624 will bridge contacts 77 to cause the operation of the gate closing mechanism and contact bar 625 will bridge contacts 92 to cause the preparation of the automatic stop circuits. As the starting switch is moved farther to the left, the starting lever 637 will strike stop 643, indicating that position II has been reached. In this position, contact bar 624 will bridge contacts 138 to cause the starting of the car. Upon reverse movement of the starting switch to position III, contact bar 624 will bridge contacts 88 to cause the operation of the gate opening mechanism. Whenever released, the starting switch will be returned to "neutral" position, by the centering mechanism described above, where pin 638 will engage aperture 640 to lock the switch in position. The manner in which the above operations are effected will be described in conjunction with the description of operation of the system as a whole.

The upper or magnetic push button compartment 601 similarly comprises a casing 645 and cover plate 646 within which the magnetic push button apparatus is enclosed. The car button magnet 647 comprises a rectangular coil 67 arranged in elongated iron channels 648 and 649. The magnet is secured at each end to an insulating base 650 as by means of straps 651. The push button switches, 652, 654, 656 and 658 for the second, fourth, sixth and eighth floors respectively, are pivotally mounted on a shaft 660 in such manner that their armatures 661 extend over iron channel 649. Similarly, the push button switches, 653, 655, 657 and 659 for the third, fifth, seventh and ninth floors respectively, are pivotally mounted on shaft 660 but are staggered in relation to the switches 652, 654, 656 and 658. The armatures 661 of switches 653, 655, 657 and 659 extend over iron channel 648. The switches are positioned by means of pins 662 extending through shaft 660. The shaft is secured, as by screws, in supports 663 mounted on an insulating plate 664. Operating buttons 665 for the switches extend through apertures 666 in cover plate 646.

Figure 7:
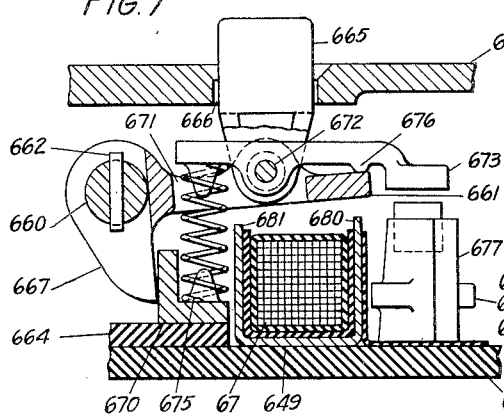
Figure 7 is a view taken along the line 7—7 of Figure 6.
Figure 6:
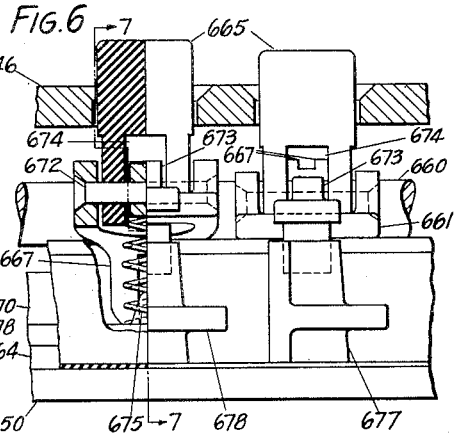
Figure 6 is a view of the car push button switches with parts shown in section.

Referring more particularly to Figures 6 and 7, the push button switch details will be described. In Figure 6 two switches are shown, one in open and the other in closed position. The pivoted end of armature 661 is formed with prongs 667 between which pin 662 extends. Stop 670, and a similar stop 668 shown in Figure 5, coextensive with shaft 660, are mounted on insulating plate 664 and are arranged to cooperate with the prongs 667 to limit the upward movement of the armature. The central portion of the armature is formed with an opening 671 across which a pin 672 extends. The pin is secured in the armature at each side of the opening to form a pivot for operating button 665 and contact lever 673. The contact lever 673 extends through a slot 674 formed in operating button 665. A spring 675 extends between the base portion of stop 670 and the inner end of contact lever 673. With the switch in open position, spring 675 acts through contact lever 673 to maintain armature 661 in position with prongs 667 abutting against stop 670. A fixed relation is maintained between lever 673 and armature 661, so long as the switch is in open position, by the engagement of projection 676 on the lever and the outer end of the armature. A stationary contact 677 is mounted on insulating base 650 in the path of the outer end of the contact lever 673. The stationary contact is provided with a lug 678 adapted for connection with a car stop contact on the selector machine.

In operation, pushing button 665 moves armature 661 and contact lever 673 down against the force of spring 675 until the lever engages stationary contact 677. Then armature 661 moves alone until its outer end engages flange 680 of the iron channel 649, spring 675 acting to maintain the contact lever and contact in engagement. With magnet coil 67 energized, this flange forms one pole of a U-shaped magnet, retaining the switch in closed position. It is preferred to provide an air gap between the armature and the pole formed by flange 681 of iron channel 649, as by shortening the flange, so as to prevent the armature from being held in by residual magnetism. Upon deenergization of magnet coil 67, spring 675 forces the armature into released position with prongs 667 abutting against stop 670. The armature in its movement engages projection 676, separating contact lever 673 and stationary contact 677 to open the switch. It will be seen that as many buttons may be pushed as may be desired, all of which will be retained in closed position in the above described manner so long as the magnet remains energized. Conductors 74 are in the circuit for magnet coil 67 (see Figure 3). A circuit for a push button switch may be traced from conductors 287 to a stationary contact 677, through the switch to shaft 660, support 663, to conductor 105. For convenience of description, these push buttons switches will be referred to hereinafter as car buttons.

Suitable conduits 684 are provided for the various conductors leading to and from the car operating box. Casings 603 and 645 are preferably formed with lugs 685 for mounting the box in the car. Casing 645 may be provided with a bearing 686 for the "director switch" hand control shaft 687. A hand wheel 688 is pinned to the end of shaft 687 extending into the car, while a sprocket wheel 690 is pinned to the end of the shaft extending to the rear of casing 645 and outside of the car.

Reference may now be had to Figures 8, 9 and 10 which illustrate the details of a preferred form of "director switch". This switch, designated as a whole by numeral 55, is enclosed in a suitable casing 691 and casing cover 692. The casing is provided with brackets 693 and bosses 694 arranged for mounting the switch on the elevator car. Within the casing and secured, as by screws, to a plurality of bosses 695 extending from its base 696 is an annular contact support 697. This support has two arcuate slots 698 and 700 in which a plurality of insulating contact bases 701 are adjustably mounted. Suitable spring contacts are secured to these bases, contacts 702 and 72 controlling the circuits for the closing coils of the main "up" and "down" direction switches respectively, and contacts 172, 118, 703 and 508 controlling the circuits for the operating coils of the main accelerating switches. Two feed contacts 71 and 291, similar in construction to the control contacts, are mounted on a support 704 of insulating material. This support, along with an intervening insulating strip 705, is secured to an arcuate boss 706 formed on the contact support 697.

Segment 70, for bridging the above mentioned contacts, comprises an arcuate channel member, formed of an outer flanged portion 707, inner flanged portion 708 and connecting web 710, and a supporting arm 711. The outer flange 707 is arranged for bridging either set of control contacts, 72, 172 and 118 or 702, 703 and 508, while the inner flange 708 is arranged to engage either feed contact 71 or 291. It will be observed that a circuit may thus be completed from either feed contact to the corresponding set of control contacts. Oil wipers 712 and 713 are mounted on insulating support 704 to engage the contact surfaces of flanges 707 and 708 respectively. The supporting arm 711 is mounted on shaft 714 between two insulating plates 715 and 716. A projection 717 on plate 716 extends through an aperture 718 in supporting arm 711 into a recess formed in plate 715. Shaft 714 extends through an inner aperture 720 formed in projection 717 and plate 715. Two other projections 721 are formed on plate 716, being disposed diametrically opposite the projection 717. These latter projections are similarly arranged to extend through apertures in supporting arm 711 into recesses in plate 715. A sleeve 722, arranged on shaft 714, is formed with a flange 723 adjacent to plate 715. Flange 723, plate 715 and projections 721 are apertured to receive studs 724. Nuts 725, on the threaded ends of these studs, clamp the supporting arm 711, plates 715 and 716 and a separating washer 726 against the flange 723. It will be observed that with this arrangement the segment 70 is completely insulated from the flange 723 and shaft 714. A pinion 727 is arranged on shaft 714 in abutting relation with the end of sleeve 722. The pinion, sleeve and segment are held in assembled relation against a shoulder 728, formed on shaft 714, by means of a nut 730 and locking pin 731. A key 732, mounted in a keyway in shaft 714, forms a driving connection between pinion 727 and sleeve 722, while the flange 723 and studs 724 form an operating connection between sleeve 722 and segment 70.

Pinion 727 is driven by means of a segmental gear 733. This gear is mounted on the inner end of a driving shaft 734, being secured thereto as by means of a through bolt 735. Shaft 734 extends through its supporting bearing 736 to the outside of the casing. An operating arm 737 is mounted on the outer end of shaft 734, being similarly secured thereto as by means of another through bolt 735. A roller 738, for engaging the "director switch" hatchway cams, is mounted on the free end of operating arm 737.

Shaft 714 also extends through its supporting bearing 740 to the outside of the casing. A sprocket wheel 741 is mounted on the outer end of shaft 714 beyond the positioning flange 742, being secured as by means of a pin. Sprocket wheel 741 is connected by means of a sprocket chain, as indicated in Figure 1, to sprocket wheel 690 so as to permit operation of the "director switch" from the car.

Two friction plates 743 and 744 are mounted on sleeve 722, the sleeve being square in cross section to form a driving connection. These friction plates cooperate with a stationary annular disc 745 to maintain the "director switch" in the position into which it has been moved. The annular disc 745 is provided with apertured lugs 746. Projections 747, extending from base 696, fit into the apertures of the lugs 746 to hold disc 745 against turning. Friction plate 743, arranged on one side of disc 745, abuts against pinion 727. Friction plate 744 is forced against the other side of the disc, and the disc against friction plate 743, by means of springs 748 mounted on the studs 724. These studs extend into apertures 749 formed in friction plate 744.

Adjustable abutment screws 750, mounted in the sides of the casing 691, determine the limits of movement of the segmental gear 733. These screws form stops to prevent the disengagement of the contacts and bridging segment 70 by extreme movement of the segmental gear in either direction. A suitable opening 751 is provided in the casing 691 for the various conductors leading to and from the "director switch" contacts.

It will be noted, upon reference to Figure 1, that the top floor hatchway cam extends down the hatchway so as almost to engage the "director switch" roller with the car at rest at the ninth floor. The initial engagement of the cam and roller during up car travel will cause the "director switch" to be moved to half speed position. From the point of "director switch" half speed position, the cam slopes gradually to the left up to the point where it moves the switch into "neutral" position. As the control circuits will be broken at this latter point, the slope of the cam is increased in order to move the switch more rapidly into reverse position. It will be further noted that the cam is arranged to bring the "director switch" to "neutral" position before the top floor is reached in order to allow for the normal coast of the car. This is indicated in the figure by the roller in broken lines for the car at rest at the top floor. The cam at the bottom floor will be identical in construction but reversed so as to move the "director switch" into up position. It is to be understood that the arrangement of the cams may be varied to suit the particular installation.

In operation, assume that the "director switch" is in up position, as indicated by roller 738 and operating arm 737 in broken lines, Figure 8. In this position, flange 707 will bridge control contacts 702, 703 and 508 and flange 708 will engage feed contact 291. As the car approaches the top floor, roller 738, engaging the "director switch" hatchway cam, is carried gradually to the left. As a result of this movement, the segmental gear 733 rotates segment 70 in a clockwise direction. In this manner the circuits controlled by contacts 508, 703 and 702 are broken in the order of the contacts named. As the roller arm is moved into "neutral" position flange 708 moves off feed contact 291. As the roller is carried farther to the left, or into down position, similarly indicated by broken lines, segment 70 is caused to engage contacts 71, 72, 172 and 118, preparing the control circuits for down operation of the car. The friction plates 743 and 744 and disc 745 will permit the movement of the segment 70 but will hold it in this reverse position. Under normal operation, therefore, the segment 70 will remain in down position until similarly but oppositely moved by the hatchway cam at the bottom floor into up position. Again, the friction plates and disc will maintain the switch in this last moved position. Thus the "director switch" normally will be in one of its on positions.

In order to run to an extra floor the "director switch" segment is reversed by means of the handwheel 688. Referring again to Figure 1 and particularly to that part of the figure relating to Elevator No. 1, it will be noted that the top floor hatchway cam is arranged to permit the reversal of the "director switch" with the car at rest at the top floor. It is preferred to arrange the cam so as to permit the movement of the "director switch" only to half speed position. The roller, in position for car travel to the extra floor, is indicated in broken lines against the cam. The cam slopes from this point in the same manner as described for the top floor. With the car at rest at the extra floor, the roller, in its reversed position, abuts against the vertical portion of the cam, preventing its further movement at this point. It will be understood that the bottom floor cam will be arranged in a similar manner in the event of an extra bottom floor. When the "director switch" is moved by hand at the intermediate floors, the extent of movement is determined by abutment screw stops 750.

Reference may now be had to Figures 11 to 25 inclusive which illustrate the various details of a preferred form of selector machine. The selector machine, designated as a whole by numeral 755, comprises a frame formed by a base member 756, four standards 757, 758, 759 and 760 and a top member 761. The standards are secured in sockets formed in bosses 762 on base member 756 and sockets formed in bosses 763 on top member 761.

Referring to Figures 11 to 14 inclusive and particularly to Figure 13, the "selector" slow down and stop switches, 135 and 133 respectively, are mounted on a bracket 764 secured to top member 761 as by bolts. Each switch comprises a pair of stationary contacts 765 and a pair of bridging contacts 766. These contacts may be of any well known construction. Both pairs of stationary contacts are mounted on an insulating contact plate 767 carried by the bracket 764. Each stationary contact is provided with means, such as binding nuts 768, for connecting the switches in the system. Each pair of bridging contacts is mounted in an arm 769 of a contact lever, lever 770 being for the slow-down switch and lever 771 being for the stop switch. Each bridging contact is insulated in any well known manner from its contact lever, the bridge being formed by a flexible conductor 772 connected to the two contacts forming a pair, as illustrated for switch 135 in Figure 12. With the switches in closed positions, each bridging contact is pressed into engagement with its corresponding stationary contact by means of a spring 773. Both contact levers 770 and 771 are pivotally mounted on a pin 774 supported by arms 775 depending from bracket 764. The other arm 776 of each lever is enlarged to form a weight. Each weight acts as a bias tending to move its corresponding switch to closed position. Also pivotally mounted on pin 774, preferably between contact levers 770 and 771, is a bell crank lever 777. The vertical arm of the bell crank lever is formed with diverging prongs 778 and 779 extending into the paths of contact levers 770 and 771 respectively. Abutment screw 781, adjustably mounted in arm 769 of contact lever 770, and abutment screw 782, adjustably mounted in arm 769 of contact lever 771, are arranged for engagement by prongs 778 and 779 respectively during the operation of the switches. The abutment screws are adjusted so that, during the operation of opening the switches, prong 778 will engage screw 781 to open the slow-down switch 135 before prong 779 engages screw 782 to open the stop switch 133. It is to be understood that refinements of adjustments may be made to suit the operating conditions of the particular installation. A socket 783 is pivotally mounted on the horizontal arm 784 of bell crank lever 777. A vertical tube 785 is secured in socket 783, as by means of a pin 786. This tube extends into and is similarly secured in another socket 787. The socket 787 is pivotally mounted on the horizontal arm 788 of a bell crank lever 790. Bell crank lever 790 is pivotally mounted between supports 791 formed on base member 756.

The "selector" slow-down and stop switches, 134 and 132 respectively, are identical in construction with slow-down and stop switches 135 and 133, above described, and are similarly mounted on bracket 792. The mechanical construction of the closing mechanism is similar. The horizontal arm 793 of the top bell crank lever 794 and the horizontal arm 795 of the bottom bell crank lever 796, however, extend to the left instead of to the right as do the corresponding arms of bell crank levers 777 and 790. Thus to open switches 135 and 133, tube 785 must move in the up direction as indicated, while to open switches 134 and 132, tube 797, extending between levers 794 and 796, must move in the down direction. The depending arms 798 of the bottom bell crank levers 790 and 796 are joined by means of a cross rod 800. With the cross rod connection, tube 785 must be pulled in the up direction in order to effect the downward movement of tube 797 and, conversely, tube 797 must be pulled in the up direction in order to effect the downward movement of tube 785. Thus the weight of one tube is counterbalanced by the weight of the other. An adjustable screw stop 801 extends through a connecting web 802 for supports 791 into abutting relation with end piece 803 provided on cross rod 800. A weight 804, provided in the lower end of tube 785, serves to unbalance tubes 785 and 797 and acts as a bias tending to maintain the switch opening mechanism in normal position, i. e., the position in which end piece 803 engages screw stop 801. The screw 801 is so adjusted that, with the switch opening mechanism in normal position, the "selector" switches will be free to return to closed positions. A preferred form of mechanism for causing the operation of the switches will now be described.

The base member 756 is formed with a centrally disposed pedestal 805. This pedestal and the boss 762, for standard 757, are arranged to provide bearings 806 and 807 respectively for the selector machine operating shaft 808. The overhead sheaves are secured to the outer end of this shaft as indicated in Figure 1. The pedestal 805 is further arranged to receive a vertical bearing 810 and to support a ball thrust bearing 811 for screw 812. This screw extends vertically into a bearing 813 formed in the top member 761. A bevel gear 814 is secured, as by pin 815, to the lower end of screw 812. Another bevel gear 816, engaging gear 814 in a driving relation, is secured, as by pin 817, to operating shaft 808. Operative engagement between the bevel gears is maintained by positioning collars 818, secured on shaft 808.

A crosshead, comprising a forked end 820, a nut 821 and frame 822 extending therebetween, is arranged to be driven by screw 812. The forked end 820 engages a vertically extending bar 823 to form a guide for the crosshead. Bar 823 is secured to lugs 824 and 825 formed on base member 756 and top member 761 respectively. A pawl magnet frame 826 is carried by the crosshead nut 821, being secured thereto as by bolts. Frame 826 is arranged to receive the pawl magnet 827. The pawl magnet comprises a coil 114 and central core 828. Non-magnetic plates 829, positioned at each end of the pawl magnet, are secured to the frame 826 as by means of through bolts 830. These plates form a mounting for the pawl magnet, being provided with recesses 831 into which the core 828 extends. The pawl magnet armatures 832 and 833 are pivotally mounted, as by means of pins 834, on arms 835 extending outwardly in opposite directions from the top and bottom of frame 826. The non-magnetic plates 829 further serve as spacing members to prevent armatures 832 and 833 from being held in by residual magnetism. Armature 832 extends inwardly from its pivot point to form an arm 836. The end of arm 836 is bifurcated to engage a pin 837 secured in frame 826. A spring 838 is arranged on pin 837 in such manner as to be compressed by arm 836 when the armature is drawn in by pawl magnet 827. Between its end and pivot point, the arm is enlarged to form a weight 839. Spring 838 and weight 839 act to move the armature into unattracted position when the pawl magnet coil 114 is deenergized, the spring acting to give rapid initial movement. An adjusting screw 840, provided in arm 836, engages frame arm 835 to determine the amount of outward movement of the armature. Armature 833 is similarly arranged with an arm, slot, pin, spring and adjusting screw but is reversed. Thus its weight 841, in order to function properly, extends outwardly from the pivot point. Pawls 842 and 843 are secured, as by screws, to armatures 832 and 833 respectively, pawl 843 being reversed to correspond with its armature. These pawls, with armatures 832 and 833 in unattracted position, are arranged to engage stopping collars 844 provided on tubes 785 and 797. Each tube is provided with nine of these stopping collars, tube 785 with collars for the second to the tenth floors inclusive for operative engagement by pawl 843 to stop in the up direction and tube 797 with collars for the ninth to the first floors inclusive for operative engagement by pawl 842 to stop in the down direction. Each collar 844 may be formed with a U bolt 845 and clamping plate 846 so as to be readily adjustable.

The "selector" stop switches 133 and 132 are arranged in the circuits for the closing coils of the main "up" and "down" direction switches respectively. The "selector" slow-down switches 134 and 135 are arranged in circuits for the operating coil of the first accelerating switch. These circuits are clearly shown in the diagram in Figure 32, reference to which will be had later.

In operation, assume that the car has started in the up direction from the first floor and that the seventh floor car button 657, for example, has been pushed. The selector machine operating shaft 808, driven by means of steel tapes in the manner previously described, will rotate screw 812 through bevel gears 816 and 814. The crosshead nut 821, therefore, will be driven upwardly by screw 812 in proportion to the movement of the elevator car. Pawl magnet coil 114 being energized while the car is running, the pawl magnet armatures 832 and 833 will be in their attracted positions and the pawls 842 and 843 will not engage the stopping collars. As the car reaches the seventh floor stopping zone, due to the fact that the seventh floor car button has been pushed, the pawl magnet coil 114 will be deenergized. The operation of effecting the energization and deenergization of the pawl magnet will be described later. Pawls 842 and 843 are now forced out into their unattracted or stop positions by the armature weights and springs. This is the position illustrated in Figure 13. As the crosshead is driven farther in the up direction, pawl 843 will engage the seventh floor stopping collar 844 on tube 785. The tube 785 will now be moved in the up direction with the crosshead, operating bell crank lever 777 to open first, slow-down switch 135, and then stop switch 133. The car, and therefore the crosshead, will now be brought to a stop in a manner to be described later. It will be noted that the bell crank levers 777 and 790 are moved counter-clockwise about their pivots, during the switch opening operation, moving tube 785 and consequently stopping collar 844 to the left as well as upwardly. Thus, if there is excessive movement of the crosshead, due to the fact that the car has not been stopped, no injury to the selector machine will result because the stopping collar will finally be withdrawn from operative engagement with the pawl by the movement of the levers. The back surface 847 of each pawl is so inclined that, for example in the above operation, as the back surface of pawl 842 strikes a stopping collar, the pawl will slide over the collar without operative engagement. "Selector" switches 134 and 132 will be opened, due to the connection between tubes 785 and 797, at the same time as switches 135 and 133 are opened. As the control circuits in which switches 134 and 132 are included are broken, due to the fact that the "director switch" is in up position, the opening of these switches is without effect at this time.

The "selector" switches will be held in open position until the pawl magnet coil 114 is again energized. When this coil is energized, pawl 843 will be withdrawn from operative engagement with the seventh floor stopping collar. Weight 804 will then act to move tube 785 downwardly and tube 797 upwardly until stopped by the engagement of screw stop 801 and cross rod end piece 803. Bell crank levers 777 and 794 will thus be moved out of operative engagement with the abutment screws, permiting the "selector" switches to close.

Additional stopping collars, 847 and 848 on tube 785, and 849 and 850 on tube 797, may be provided for extra floor runs. Thus pawl 843 will engage stopping collar 848 to cause the opening of switches 135 and 133 to slow down and stop the car at the extra floor landing. As the car comes down from the extra floor landing, pawl 842 will engage stopping collar 850 causing the slow down and stop at the top floor. Similar operation is effected on an extra bottom floor run by collars 849 and 847.

Referring now to Figures 11, 14 and 18, a plurality of bars 852 of insulating material are arranged between standards 759 and 760 to form mountings for the selector machine stationary contacts. Both of these standards are provided with a plurality of adjustable collars 853, the corresponding collars on each standard being arranged in horizontal alignment to form mountings for the bars 852. The stationary contacts are arranged on the bars 852 in columns, designated as follows: 854, "down" hall stop contacts; 855, "up" and "down" car stop contacts; 856, "up" hall stop contacts; 857 and 858, "down" signal contacts; and 859 and 860, "up" signal contacts. Additional stationary contacts may be provided, also arranged in columns, designated as follows: 861, position indicator contacts; 448, "down" stop control contacts; and 449, "up" stop control contacts. The stationary contacts are secured to the insulator bars 852, as by means of bolts 862. These bolts also secure insulating plates 863 on top of the stop contacts, for a purpose to be described later. The bars 852 for the intermediate floors are provided with contacts in each column. The tenth or top floor "down" hall stop, signal and stop control contacts may be omitted as no engagement is made with them during normal operation. Similarly, the first or bottom floor "up" hall stop, signal and stop control contacts may be omitted. The other contacts shown in Figures 11 and 18 will be referred to during the description of operation.

The selector machine is provided also with moving contacts or brushes for engaging the various stationary contacts. The stop control, position indicator and signal brushes are mounted on a panel 864, secured, as by bolts 865, to bosses 866 on crosshead frame 822. Both the "up" and "down" signal brushes are arranged in four pairs in tandem, forming in effect four columns corresponding with the "up" and "down" columns of stationary signal contacts. Leading "down" signal brushes 317 and 318 are for completing the circuits for hall signals in advance of the car during down operation. The remaining "down" signal brushes 332, 333, 334, 335, 336 and 337 are for maintaining the circuit for the signals, brushes 336 and 337 acting when the car is at rest at the floor. The brushes of each pair of signal brushes, for example brushes 317 and 318, are electrically connected as by means of a plate 867. These plates are secured to the back of the panel 864 as by means of the brush mounting screws. Brushes 317, 332 and 334 are constructed in such a manner that they operate to complete a circuit only when the car, and therefore the crosshead, is moving in the down direction. The "up" signal brushes are arranged so as to function in the same manner during up travel of the car. Thus "up" brushes 868, 869 and 870, corresponding to "down" brushes 317, 332 and 334, will complete a circuit only when the car is traveling in the up direction. The construction of the brushes in this manner avoids the completion of undesirable circuits for the signal lamps of the various elevators of a bank. The position indicator brush 483 and stop control brushes 460 and 461, which may be provided, are similar in construction to brush 336 and will complete a circuit with the car operating in either direction.

The construction of the two types of brushes is shown in detail in Figures 21 to 25 inclusive. Referring to Figures 21, 22 and 23, the brush contact pieces 871 are pivotally mounted in the brush frame 872, as by means of a pin 873 supported by the frame arms 874. The brush contact pieces are preferably provided with slots 875, through which the pivot pin 873 extends, so as to permit their longitudinal as well as pivotal movement. Longitudinal recesses 876 are formed in the brush contact pieces to receive springs 877. These springs abut yieldingly against pivot pin 873, tending to maintain the contact pieces in their outer position. The frame arms 874 and washer 878 close slots 875 to maintain the springs 877 in position.

A centering blade 879 for the brush contact pieces is loosely mounted on guide bushing 880. The bushing 880, along with a washer 881, is secured to the yoke 882 of the brush frame 872, as by means of a screw 883. A compression spring 884 is mounted on bushing 880 between centering blade 879 and washer 881. The outer end of the centering blade is bent in such manner as to form continuous engagement with the elongated surfaces of the contact pieces. Thus, when the brushes are not in engagement with a stationary contact, the centering blade will tend to maintain the brush contact pieces in central position. Upon engagement of the brush and a stationary contact however, the contact pieces will be rocked about their pivot pin 873, moving the outer end of the centering blade to the left, as viewed in Figure 22, against the force of compression spring 884. It will be observed that the centering blade acts as a lever, slidably pivoted against yoke 882, further to compress the spring 884 during this operation. Thus, as the brush leaves the stationary contact, the compression spring causes the centering blade to restore the contact pieces to their central position. As the circuit completed by the brush and stationary contact is from the frame and centering blade into the contact pieces, it will be seen that the circuit is not broken by rocking the contact pieces in either direction about their pivot pin.

The construction of the brush shown in Figures 24 and 25, for example, "up" signal brush 868, is only slightly modified. In this construction the ends 885 of the frame arms 886 are joined to the main body 887 of the brush frame by means of strips 888 of insulating material. The brush centering blade 889 is bent differently, a portion of the outer end, adjacent to the brush contact pieces, supporting a strip 890 of insulating material. The brush contact pieces 871, when rocked into their counterclockwise position, as viewed in Figure 25, by the engagement of the brush and a stationary contact during down car travel, will engage only the insulating strip 890, preventing the completion of a circuit. During up car travel however, the contact pieces will complete the circuit from the main body of the frame by way of the centering blade 889. In Figure 17 both forms of brushes are illustrated in various rocked positions which they may assume during up car travel.

Four brushes are employed to engage the stationary stop contacts, "up" hall stop brush 293 and "down" hall stop brush 270 for the contacts in columns 856 and 854 respectively, and "up" car stop brush 292 and "down" car stop brush 271 for the contacts in column 855. These brushes are of the type illustrated in Figures 21, 22 and 23, but are mounted in a different manner than the brushes above described. With the car at rest, the stop brushes assume a position relative to their stationary contacts such as illustrated in Figure 15. During the period of acceleration, however, the coil 207 of the brush magnet 891 is energized, causing the stop brushes to advance to a position such as illustrated in Figure 16. The brush magnet frame 892 is carried by the crosshead frame 822, being secured thereto as by bolts 893. Frame 892 is arranged to receive the brush magnet 891. Non-magnetic plates 894, positioned at each end of the brush magnet, are secured to the frame 892 as by means of through bolts 895. These plates form a mounting for the brush magnet, being provided with recesses 896 into which the brush magnet core 897 extends. Pins 898, extending between the sides of the brush magnet frame, form pivotal supports for the brush magnet armatures 900 and 901. A recess 902 is formed in each end of the core 897, through the non-magnetic plates, to receive lugs 903 on the armatures 900 and 901. The non-magnetic plates further serve as spacing members to provide an air gap between the armatures 900 and 901 in their attracted position and the core 897, as illustrated in Figure 16. Thus retention of the armatures in this position by residual magnetism is prevented.

Armature 900 is extended beyond its pivot point to form an arm 904, the outer ends of the arm being provided with a slot 905. A brush arm 906, also pivotally mounted on pin 898, is secured to arm 904, as by means of a set screw 907 extending through the slot 905. A lug 908 is formed on armature 900 to provide a mounting for a swivel 909. An eye bolt 910 is pivotally mounted, as by means of a pin 911, on a similar lug 912 formed on the brush arm 906. The eye bolt 910 extends through the swivel 909, being secured thereto as by nuts 913, to form an adjustment between the armature and brush arm. The brush arm is provided with an adjustable abutment screw 914 which engages the crosshead frame 822, with the brushes in normal or retarded position, i. e., the position which they assume with the car at rest or running at slow speed, to form a stop. The "up" stop brushes 292 and 293 and a weight 915 are mounted on a panel 916. This panel is secured to the end of brush arm 906, the securing screws 917 extending through the weight 915. The weight acts as a bias tending to return the brushes 292 and 293 to their retarded position. The advanced position of the brushes may be altered by releasing the set screw 907 and adjusting the nuts 913 on eye-bolt 910. After the correct advance position has been determined, the set screw 907 is again tightened. The retarded position of the brushes may be determined by means of the adjustable abutment screw 914.

Armature 901 also is extended beyond its pivot point to form an arm 918. The slot 920 is formed in brush arm 921, the set screw 907 extending through this slot into armature arm 918. The "down" stop brushes 270 and 271 are similarly mounted on a panel 922 secured to the end of brush arm 921. The weight 923, however, is formed on the end of the armature 901 adjacent to the brush magnet 891. The eyebolt and swivel adjustment, abutment screw and armature lug are arranged in the same manner as described above.

In operation, as previously explained, the crosshead is raised and lowered by means of the screw 812 driven by the elevator car. The stop control, position indicator and signal brushes, the brush magnet and its brushes and the pawl magnet and its pawls, being carried by the crosshead, are therefore moved up and down in proportion to the movement of the elevator car. Assume that the car has started from the first floor in the up direction. If there is no second floor call, the second floor stationary stop contacts in columns 855 and 856 will be "dead" so that the contact pieces for the "up" stop brushes 292 and 293 will strike the insulating bar 852, rock and sweep across the stationary contacts without completing a circuit. As the car accelerates, the energization of the brush magnet coil 207 is effected, causing the advance of the stop brushes. This brush advance may be effected before the second floor stop contacts are reached, depending on the distance between the floors. The manner in which the brush magnet coil is energized and the purpose of the advance and retard of the stop brushes will be explained along with the description of operation of the system as a whole. Assume that the "up" third floor hall button has been pushed. As will be seen from later description, hall stop contact 480 in column 856 will be "alive". Thus as the brush contact pieces of brush 293 sweep across contact 480, a circuit will be completed for causing the initial slow down of the car and the deenergization of the pawl magnet. The position of the stopping collars 844 relative to the position of the corresponding stationary stop contacts is such that, for example in the case assumed, pawl 843 will be released below the third floor collar. As the car continues its movement, the "selector" slow-down and stop switches will be opened in the manner previously described, causing the final slow down and stop of the car. At the same time the brush 293 will move past the contact and the brush magnet coil 207 will be deenergized. The weights 915 and 923 will act to move the stop brushes back into retarded position so that, with the car stopped at the third floor, the relative positions of the parts will be as illustrated in Figure 15.

The stationary stop contacts are preferably short so that the slow-down distance may be made as nearly uniform as possible. A long contact, such as illustrated for the signals, would permit response to the late operation of a car or hall button, i. e., the car might be caused to slow down when so near the floor that it would run past an undesirable distance. Similarly, the stop brush contact pieces are caused first to rock without making contact and then sweep across the contacts in order that a uniform slow-down distance as well as positive engagement may be assured. The insulating plates 863 on the top of the stop contacts cause the rocking of the brush contact pieces when the crosshead is being lowered.

A passage 925 for the "down" stop brushes is formed in the ninth floor insulating bar 852 to insure response to a ninth floor "down" call. Similarly, a passage 926 for the "up" stop brushes is formed in the second floor insulating plate 863 to insure response to a second floor "up" call. These passages are illustrated also in Figures 19 and 20. The manner in which these calls are responded to will be explained later.

Additional insulating bars 927 and 928 are provided for stop contacts 509 and 510 for the extra top floor and stop contacts 514 and 515 for the extra bottom floor respectively. The bars 927 and 928, contacts 509, 510, 514 and 515 and stopping collars 847, 848, 849 and 850, previously referred to, may be omitted in event that there are no extra floors. As it is generally desired to "make" such floors with one car only, these parts may be omitted from all the selector machines except one. On the other hand, more bars, stop contacts and stopping collars may be added if there are other extra floors, the "director switch" hatchway cams being arranged accordingly.

The leading signal brushes will operate to complete the circuit to the hall signals in advance of the car, the circuit being maintained by the brushes which follow. Thus with the "down" fourth floor signal contact 316 "alive", leading "down" signal brushes 317 and 318 will engage contacts 316 and 320 respectively to complete the signal lamp circuit. This circuit will be maintained by brushes 332—333, 334—335 and 336—337 engaging contacts 316 and 320 in sequence, brushes 336—337 being in engagement with these contacts with the car at rest at the fourth floor. The signal contacts are long as it is desired to provide continuous circuits. Further, the signal brushes are arranged so that each pair will not leave the contacts until after the engagement of the contacts by its succeeding pair, as may be seen upon reference to Figure 17 and to the diagram in Figure 33. The signal brush contact pieces are rocked by the signal contacts in the same manner that those for the stop brushes were rocked, the position of the signal brushes relative to their stationary contacts being such that the outer ends of the contact pieces will engage the contact with the car at rest at the floor. The "down" signal contacts 342 and 344 at the first floor are mounted on an insulating block 929 in order to prevent their engagement by brushes 336 and 337 with the car at rest at the first floor. The circuit for the first floor signal lamp is maintained by the engagement of leading brushes 317 and 318 with additional signal contacts 345 and 346 mounted on insulating bar 930. The signal contacts for the top floor are similarly arranged.

Contacts 362 and 371, mounted on insulating bar 931, may be provided for a bottom floor annunciator switch. As these contacts are employed only for a reset operation, they are made short to correspond with the stop contacts. Similar contacts may be arranged for the top floor annunciator switch.

The position indicator brush 483 and contacts, column 861, are employed to complete circuits for the car position indicator lamps. Thus these contacts, as is the case with the signal contacts, are long in order that the indicator lamps may be lighted for most of the car travel. The brush 483 is positioned on the panel with its pivot point in line with the center of an indicator contact when the car is at rest at the floor. Thus the lighting of the indicator lamps for either direction of car travel is assured. The stop control brushes 460 and 461 are arranged to lead the stop brushes 293 and 270, even with the stop brushes in their advanced positions, as will be seen upon reference to Figure 34. It is apparent that the stop control brushes may be mounted on the panels 916 and 922, with their stationary contacts arranged accordingly. In such event stop control brush 460 will be given a slight lead over stop brush 293, and stop control brush 461 given a slight lead over stop brush 270, the stop control brushes being advanced by the brush magnet along with the stop brushes.

When the car is stopped at a terminal landing, for example floor ten, those brush contact pieces which are in engagement with contacts will be in a counter-clockwise rocked position, as viewed in Figure 17. When the car starts in the down direction, these brush contact pieces must reverse, that is, rock into a clockwise position. In the event that any of the brush contact pieces are caught in any manner, their reversal will be permitted by the slots 875 and springs 877. The distance between the various contacts is made to correspond to the distance between floors for the particular installation by adjusting the position of the insulating bar supporting collars 853 on the standards 759 and 760. The stopping collars 844 on tubes 785 and 797 are then adjusted to correspond. The leads (not shown) for the pawl magnet coil 114, brush magnet coil 207 and stop brushes 270, 271, 292 and 293 are connected in any suitable manner to certain of the binding posts 932 on panel 864. Others of the binding posts are provided for the brushes mounted on the panel. Flexible conductors (not shown) extend from these binding posts to similar binding posts (not shown) on panel 933. The flexible conductors are suspended in very much the same manner that flexible cables are suspended from an elevator car. Panel 933 is secured to standards 757 and 758, as by means of clamps 934.

Reference may now be had to Figures 26 and 27 which illustrate the details of a preferred form of floor stop switch. Although all the floor stop switches are identical in construction, the "down" fourth floor switch will be described in order to aid the description of operation of the system as a whole, which follows. The switch frame 936 is mounted on the "stop and signal" panel 937, being secured thereto as by means of screws 938. The frame supports two cores, 939 for the upper or closing coil 296 and 940 for the lower or reset coil 310. The middle portion 941 of the frame, extending outwardly between coils 296 and 310, forms a mounting on which a plate 942 is secured, as by screws 943. This plate extends over a portion of the ends of both coils to retain them in position. A pin 944, supported by lugs 945 formed on plate 942, forms a pivotal mounting for the contact armature 946. The contact armature 946 extends upwardly to form an operating arm 947 for the movable contact 304. Contact 304 is slidably mounted in an aperture 948 formed in the end of arm 947, being insulated therefrom by means of insulating bushing 950 and washer 951. The bushing and washer are mounted on the contact stem 952 with the flange 953, formed on bushing 950, abutting against the contact block 954. Nuts 955 serve to hold the contact parts in assembled relation and to bind the terminal clip for conductor 308 to the contact. The end of arm 947 is arranged between flange 953 and washer 951, being maintained against washer 951 with the switch in open position by means of a spring 956.

A support 957 for the stationary contact 304' is mounted on panel 937, being secured at the rear thereof as by a nut 958. The contact end of support 957 is threaded to receive the stem 960 of the holder 961 for contact block 962. Thus the position of the stationary contact 304' relative to the position of the movable contact 304 may be adjusted, a nut 963 being provided on stem 960 for locking the stationary contact in adjusted position.

A pin 964, supported by additional lugs 965 formed on plate 942, forms a pivotal mounting for the latching member 966. This latching member, preferably of non-magnetic material, comprises a pair of arms 967 and 968, through which pivot pin 964 extends, and a connecting yoke 969. The latching member is biased by weights 970, formed on arms 967 and 968, to turn counter-clockwise, as viewed in Figure 27, the movement being limited by the engagement of a lug 971, formed on the inner side of arm 967, and one of the mounting lugs 965. A projection 972, extending upwardly from yoke 969, cooperates with a lug 973, depending from the horizontally extending arm 974 of contact armature 946, to latch the contacts 304, 304' in closed position.

The armature 975 for the reset magnet is pivotally mounted on pin 964 between the lugs 965. A lug 976 extends upwardly from the pivot point of the reset armature 975 to receive an adjustable abutment screw 977. A biasing weight 978, formed on the lower end of reset armature 975, tends to maintain the armature in unattracted position with screw 977 abutting against the projection 980 formed on the extended portion 941 of frame 936. A lug 981, formed on the lower end of arm 967, extends in the path of the weight 978, to be struck thereby as the reset armature 975 is moved to its attracted position. Non-magnetic plates 982, provided on the outer ends of cores 939 and 940, serve as spacing members to prevent the armatures 946 and 975 from being held in residual magnetism. The terminals 983, provided on the coils 296 and 310, and the binding nuts 984, provided on the end of contact support 957 extending to the rear of the panel, are for connecting the switch in the system, the connections to be described along with the description of the wiring diagram in Figure 33.

In operation, with the closing coil 296 energized in response to the pushing of its hall button, contacts 304, 304' will be closed, spring 956 yielding to permit the engagement of contact armature 946 and non-magnetic plate 982. With contact armature 946 in this attracted position, the latching member 966 is free to move into position with projection 972 beneath the lug 973, such movement being caused by the action of gravity on the weights 970. Upon the deenergization of coil 296, contact armature 946 is moved outwardly by the action of the spring 956 to cause the engagement of lug 973 and projection 972. As this movement is insufficient to cause the engagement of the end of arm 947 and washer 951, the contacts 304, 304' are latched in closed position. The switch is illustrated in these figures in its latched position.

Upon the energization of reset coil 310, the reset armature 975 is moved to attracted position. The reset armature will gain in speed as it is pulled in so that the weight 978 will strike the lug 981 a hammer blow. This blow insures the tripping out of the latch, i. e., the movement of projection 972 from under the lug 973, and therefore the release of the contact armature 946. Armature 946 now falls under the action of gravity into the notch 986 formed in the projection 972, separating contacts 304, 304'. The outward movement of the contact armature is limited by the engagement of lug 973 with a stop 987, forming one side of the notch 986.

Figure 28:
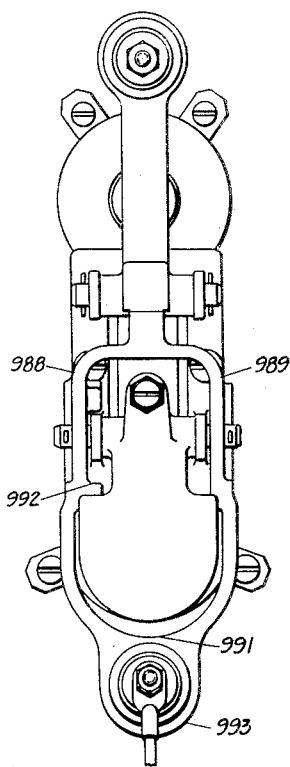
Figure 28 is a front elevation of a floor signal switch.
Figure 29:
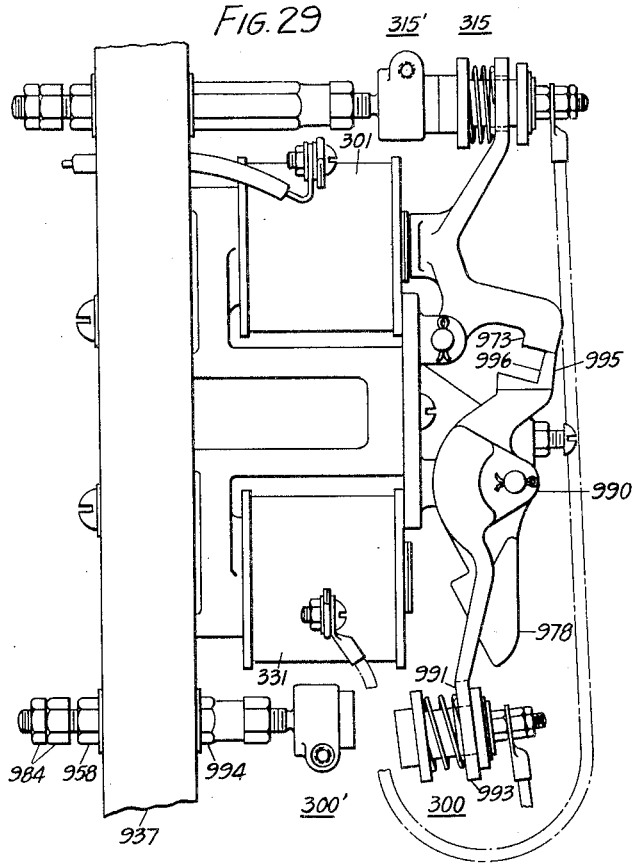
Figure 29 is a side elevation of the same.

Referring now to Figures 28 and 29, the preferred form of floor signal switch is identical in construction with the floor stop switch above described except that back contacts are provided. As in the case of the floor stop switch, the "down" fourth floor signal switch will be described. The arms 988 and 989 of the latching member 990 are extended below the reset armature biasing weight 978 where they are joined by a yoke 991. These arms 988 and 989 and yoke 991 are so formed as to permit the engagement of the lug 992 formed on arm 988 by weight 978, in the manner described above. The yoke 991 is formed with a depending lug 993 in which a movable contact 300, identical in construction with movable contact 304 of the floor stop switch, is slidably mounted. The contact support 994, for the stationary contact 300', is identical in construction with the contact support 957 for the floor stop switch, except that it is shortened. At the rear of the panel 937, the support is provided with the securing nut 958 and binding nuts 984. The large air gap between the reset magnet and armature, obtained by the preferred construction, prevents the premature tripping out of the latch when the switch, upon closing, completes the circuit for a signal lamp, the circuit for the lamp filament being through reset coil 331.

In operation, with the closing coil 301 energized, forward contacts 315, 315' will be closed, back contacts 300, 300' will be separated and projection 995 on latching member 990 will be moved under lug 973. Upon deenergization of closing coil 301, lug 973 will engage projection 995 to latch the forward contacts 315, 315' in closed position, as illustrated in the drawings. Upon energization of reset coil 331, weight 978 will not only trip out the latch for the forward contacts 315, 315' but also will cause the closure of back contacts 300, 300'. The lug 973 falling into the notch 996 will form a latch for the back contacts, retaining them in closed position. It will be noted that, upon the energization of the closing coil 301 again, the latch for back contacts 300, 300' is not released until the latching member 990 is free to move into position with projection 995 beneath lug 973, and therefore not until the forward contacts 315, 315' are closed.

The floor stop and signal switches for the intermediate floors are mounted in groups on the "stop and signal" panel 937, as illustrated in Figure 30. Each group comprises the "up" and "down" floor stop and signal switches for each floor. No stop or signal switches are provided for the first and tenth floors, these floors being made regular stops in a manner to be described later. However, floor annunciator switches, identical in construction with a floor signal switch, may be employed to serve as part of a call system for these floors. The switches have been characterized generally in accordance with the floor and circuit in which they are included. For example, DS2 indicates that the switch is in the "down" second floor stop circuit; UL6 indicates that the switch is in the "up" sixth floor lamp or signal circuit; and UA1 indicates that the switch is in the "up" first floor annunciator circuit.

A plurality of single pole, single throw knife switches are mounted on the panel 937 for cutting out of operation pairs of the switches in a group. Thus, for example, the opening of switch 302 will render the "down" fourth floor stop and signal switches unresponsive to the "down" fourth floor hall button. Similar knife switches are provided for the floor annunciator switches, for example, switch 360 for the "up" first floor annunciator switch.

Automatic non-stop switches 443, one for each elevator in the bank, also may be mounted on panel 937, two switches being shown by way of illustration. These switches are identical in construction with a floor stop switch except that two pairs of forward contacts are provided. Rotatable switches 997, one for each automatic non-stop switch, also may be mounted on the panel. Each switch has five positions, designated, a, b, c, d and e, indicating stop control, off, local, off and express positions respectively. The significance of these positions will be obvious from later description.

Figure 31:
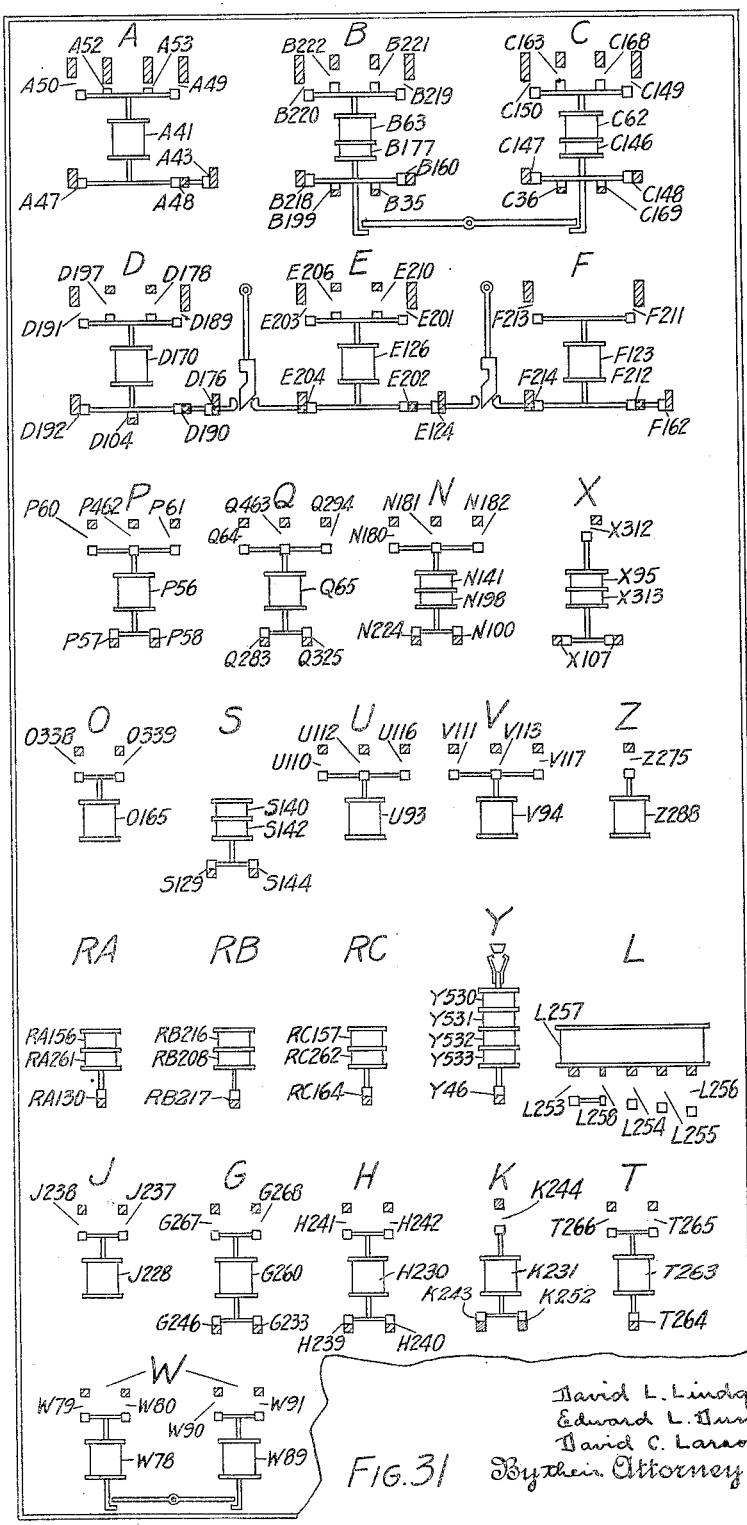
Figure 31 is a diagrammatic representation of the control panel, showing particularly the relation of the coils and contacts of the various switches.

The control panel 998 for Elevator No. 1 with its various switches is illustrated in Figure 31. No description will be given of this panel at this time as it is believed that it will be sufficiently understood from the description which follows.

Figure 32:
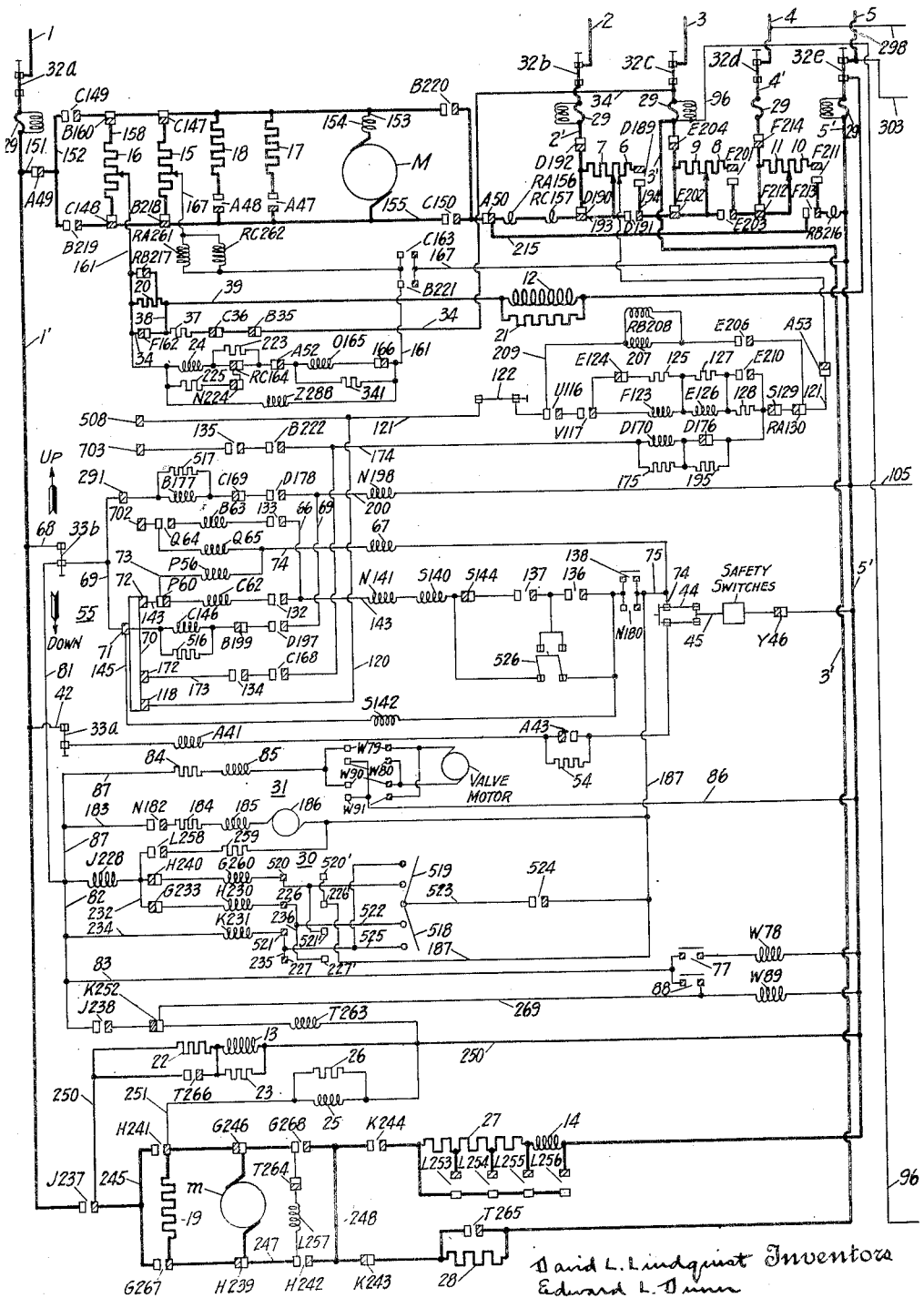
Figure 32 is a simplified diagram of the system of motor control used for each elevator.
Figure 33:
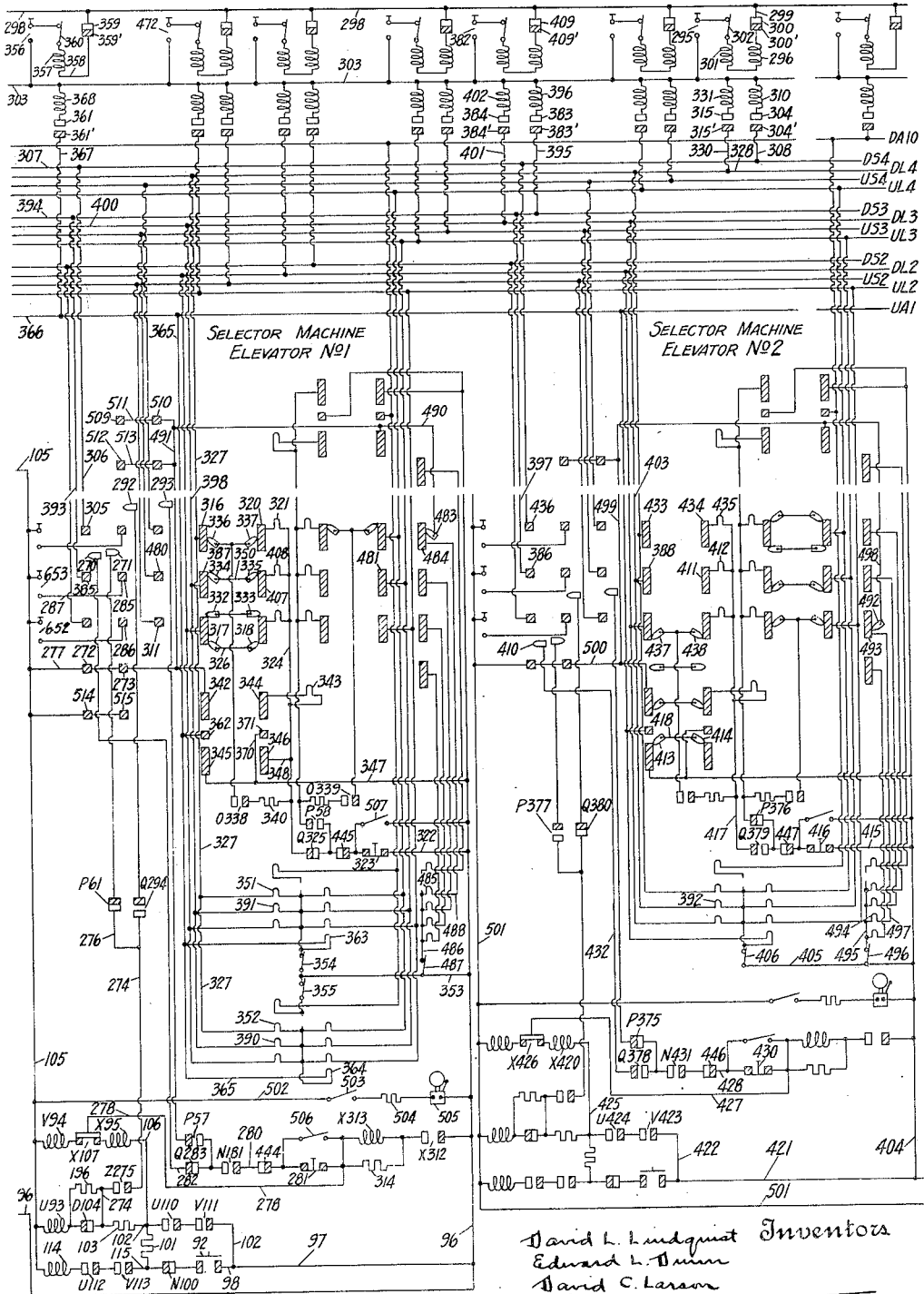
Figure 33 is a simplified diagram, extended from Figure 32, of the stop and signal control system for two elevators, as illustrative of a group.

Reference may now be had to Figures 32 and 33 which illustrate diagrammatically the various control and power circuits. No attempt is made in these figures to show the coils and contacts of the switches in their associated positions, "straight" diagrams being employed wherein the coils and contacts of the various switches are separated in such a manner as to render the circuits involved relatively simple. In order for a clearer understanding of the invention, the stationary contacts of the switches are illustrated in cross section. The relation of the coils and their contacts may be seen upon reference to Figure 31. It will be observed that Figure 32, taken in connection with the top portion and the left half, below the legend "Selector Machine, Elevator No. 1," of Figure 33, constitutes a complete wiring diagram for one elevator. The top portion and the right half, below the legend "Selector Machine, Elevator No. 2," of Figure 33 show the stop and signal control circuits for a second elevator, it being understood that the second elevator is provided with a motor control system identical with that illustrated in Figure 32. As much of the diagram as relates to floors 5 to 9 inclusive has been omitted in Figure 33 since it is believed that the invention will be clear without the additional illustration and that the diagram will be much simpler.

Referring particularly to Figure 32, the numerals 1 to 5 inclusive indicate the mains of a multi-voltage source, as illustrative of one form of power supply suitable for the present system and adopted for convenience of representation. Transfer resistances 6 and 7, 8 and 9, and 10 and 11 are associated with the multi-voltage mains for purposes of acceleration and retardation. The main motor armature is designated by the reference character M while the auxiliary motor armature is designated by m. Separately excited shunt fields 12 and 13 are provided for the main motor and auxiliary motor respectively. The auxiliary motor may be provided also with a series field 14 to assist in the "pick up" under its fast speed operating conditions. Various electro-dynamic brake resistances are employed, 15, 16, 17 and 18 for the main motor and 19 for the auxiliary motor. Field 12 is provided with a series resistance 20 and a discharge resistance 21. Similarly, field 13 is provided with series resistance 22 and discharge resistance 23. 24 is the main motor electromagnetic brake release coil while 25 is the auxiliary motor brake release coil. Coil 25 is provided with a permanent discharge resistance 26. The auxiliary motor is provided also with a starting resistance 27 for fast speed auxiliary operation and a slow-down resistance 28 for slow speed operation. The leveling switch is designated as a whole by the numeral 30, while the motor for moving the leveling switch out of the path of its cams is designated by numeral 31.

Various electromagnetic switches are provided which are designated as a whole as follows:—

A—Main potential switch,
B—Main "up" direction switch,
C—Main "down" direction switch,
D—Main first accelerating switch,
E—Main second accelerating switch,
F—Main third accelerating switch,
G—Auxiliary "up" direction switch,
H—Auxiliary "down" direction switch,
J—Auxiliary line switch,
K—Auxiliary speed switch,
L—Auxiliary accelerating switch,
N—Brake resistance switch,
O—Signal reset switch,
P—"Down" non-interference switch,
Q—"Up" non-interference switch,
RA—Retardation control load switch,
RB—Speed control load switch,
RC—Brake control load switch,
S—Door contact sequence relay,
T—Auxiliary slow-down switch,
U—Car stop switch,
V—Hall stop switch,
W—Valve motor switch,
X—Automatic reset switch,
Y—Fuse protective relay,
Z—Sequence stop relay.

Throughout the description which follows, these letters, in addition to the usual reference numerals, will be applied to the parts of the above enumerated switches. For example, contacts B35 will indicate that the contacts are on the main "up" direction switch, while operating coil A41 will indicate that the coil operates the main potential switch. This will be made clear by reference to Figure 31.

Various safety switches, limit switches and door and gate contacts may be employed, reference to which may be had in connection with the description of the various circuits and of the operation of the system.

It is assumed that the power main switch 32 a—e and the control line switch 33 a—b are closed.

According to the preferred arrangement, the main motor, when it is not in operation, is provided with a "standing field". This provision may be made by applying a reduced voltage to the field winding 12. The field circuit may be traced from power main 3, switch 32c, by way of line 34 through back contacts B35 and C36 of the direction switches and resistance 37, line 38, by way of line 39 through field 12, switch 32e, to power main 5. It is not desired to apply the full voltage of mains 1 and 5 to the field because of increased power consumption. On the other hand, it is not desired to have the field deenergized when the motor is at rest as a matter of safety and because of the large time constant involved in building up. The "standing field" not only reduces the time constant, since the applied voltage is merely increased, but also prevents too sudden acceleration with heavy load or down motion or light load on up motion of the car.

The operating coil A41 of the potential switch is energized from power main 1, switch 32a, fuse 29, line 1', by way of line 42 through switch 33a, coil A41 and auxiliary back contacts A43, car safety switch 44, by way of line 45 through "safety switches", indicated by legend, and contacts Y46 of the fuse protective relay, line 5', fuse 29, switch 32e, to main 5. The back contacts A47 and A48 therefore are open and consequently the electro-dynamic brake circuits, comprising the resistances 17 and 18 connected across the armature M, are broken. Also the forward contacts A49 and A50 are closed, preparing the motor armature circuit. Auxiliary forward contacts A52 and A53 are closed preparing the circuit for the brake release coil 24 and the circuit for the main accelerating switch coils respectively. Also, auxiliary back contacts A43 are separated inserting the cooling resistance 54 in series with the operating coil A41.

Assume that the car is at some intermediate floor, for example, floor 4. The "director switch" 55 will be in one of its on positions as previously explained. For the convenience of description, the switch is shown in its down position. Thus the "down" non-interference switch coil P56 is energized and consequently the back contacts P57 and P58 of this switch are open and the forward contacts P60 and P61 are closed. The function of contacts P57, P58 and P61 will be evident from the description of operation of the system particularly relating to the selector machine. Contacts P60 and the corresponding contacts Q64 of the "up" non-interference switch form an electrical interlock for the direction switch closing coils C62 and B63. Thus with contacts P60 closed and contacts Q64 open, completion of a circuit for coil C62 will not establish a circuit for coil B63 by way of coil P56, coil Q65 and line 66. The car button magnet coil 67, being arranged in series with coil P56, also is energized. The circuit for coils P56 and 67 may be traced from line 1', by way of line 68 through switch 33b, line 69, contacts 71 and 72, bridged by segment 70 of the "director switch", by way of line 73 through coil P56, by way of line 74 through coil 67, safety switch 44, line 45, to main 5 as previously traced.

The condition of the system so far described is normal for the car at rest and the switches so far described are illustrated in their normal positions for down car travel. If the "director switch" is in "up" position, it will close the circuit for non-interference coil Q65 instead of coil P56. The position of segment 70 may be different for the floors next to the top and bottom but this does not alter the above described circuits. The system being in condition to start, upon the operator's moving the starting switch to position I, starting switch contacts 77 are bridged to complete a circuit for a suitable form of door and gate operating mechanism. For convenience of illustration, contacts 77 are arranged to complete a circuit for valve motor switch operating coil W78. The valve motor switch may comprise two switches interlocked in a manner similar to the direction switches, a single reference letter W however being used. This switch, upon operation, closed contacts W79 and W80 to complete a circuit for a "valve motor", indicated by legend. The valve motor operates a valve for a gate engine (not shown), the engine operating in turn to close the gate. The circuit for coil W78 may be traced from switch 33b, line 81, line 82, by way of line 83 through contacts 77 and coil W78, line 5', fuse 29, switch 32e, to main 5. The circuit for the "valve motor" may be traced from line 81, by way of line 87 through a resistance 84 and valve motor series field 85, contacts W79, the valve motor armature, contacts W80, line 86, to line 5'.

If the operator, at any time after he has closed the gate and before he has advanced the starting switch to position II, desires to open the gate, or if he desires to arrest the movement while the gate is closing, he may do so by moving the starting switch to position III. Contacts 88 will then be bridged to complete a circuit for coil W89. As will be obvious from the description of the gate closing operation, the "valve motor" armature circuit reverses through contacts W90 and W91. The "valve motor" will now operate the valve in such manner as to cause the engine to open the gate. Obviously other forms of power operated gate and door mechanisms and arrangements for controlling such mechanisms may be employed without departing from the spirit of the present invention. The doors for each landing may be operated by the "valve motor" as is well understood in the art. For example, each door may have a separate engine, the controlling valves therefor being operated by the engagement of a retiring cam, also operated by the "valve motor", and rollers provided on the ends of the operating levers for the valves (not shown).

Referring now also to Figure 33, and particularly to the wiring diagram for Selector Machine, Elevator No. 1, according to the preferred arrangement, contacts 92 are bridged along with contacts 77 in position I of the starting switch as previously set forth. Closure of contacts 92 completes the circuits for coil U93 of the car stop switch, coil V94 of the hall stop switch and the closing coil X95 of the automatic reset switch. The various functions of these switches will be evident as the description proceeds. The circuit for coil U93 may be traced from line 3', through line 96 and line 97, by way of line 98 through contacts 92, back contacts N100 of the brake resistance relay, resistance 101, by way of line 102 through resistance 103, back contacts D104 of the first accelerating switch and coil U93, line 105, to line 5'. The circuits for coils V94 and X95 may be traced from line 102, by way of line 106 through coil X95, back contacts X107 and coil V94, line 105, to line 5' as before.

The car stop switch upon operation closes contacts U110, U112 and U116, while the hall stop switch upon operation closes contacts V111, V113 and V117. The current of the series circuit comprising coil V94 and coil X95, however, is not strong enough to cause the automatic reset switch X to act at this time. Contacts U110 together with contacts V111 form a by-pass for starting switch contacts 92, maintaining the circuits for coils U93, V94 and X95. Contacts U112 and V113 complete the circuit to the pawl magnet coil 114. Contacts U116 and V117 complete the circuit for the second and third accelerating switch coils E126 and F123, respectively.

The circuit for the pawl magnet coil 114 may be traced from line 3', line 96, line 97, by way of line 98 through contacts 92 and contacts N100, by way of line 115 through contacts V113, contacts U112 and coil 114, line 105, to line 5'. With either contacts 92 or contacts N100 open, the above circuit will be through the by-pass formed by contacts U110 and V111 and cooling resistance 101. This by-pass forms a holding circuit for the pawl magnet coil. The resistance 101 not only functions during normal operation but also serves to reduce power consumption and to eliminate overheating of coil 114 in case the operator has moved the starting switch to position I and then back to "neutral" without starting the car.

The circuit for the second and third accelerating switch coils may be traced from line 1', line 68, switch 33b, line 69, contacts 71 and 118, bridged by "director switch" segment 70, line 120, by way of line 121 through car slow speed switch 122, contacts U116, contacts V117, coil F123, shunted by back contacts E124 and resistance 125 in series, coil E126, shunted by resistance 127, resistance 128, back contacts S129 of the door contact sequence relay, back contacts RA130 of the retardation control load switch and contacts A53, a portion of transfer resistances 6 and 7, to line 2'. The voltage applied to the coils being of low value, there is no operation of the accelerating switches at this time.

The pawl magnet coil 114, however, retracts its pawls 842 and 843 allowing the "selector" stop switches 132 and 133 and "selector" slow-down switches 134 and 135 to close in the manner previously described. Due to the fact that the gate and doors have been closed, gate contacts 136 and a series of door contacts, indicated by a single set of contacts 137, are closed. The operator may now move the starting switch to position II to start the car.

With the starting switch in this position, contacts 138 are bridged to complete a circuit for coil S140 of the door contact sequence relay, closing coil N141 of the brake resistance switch and closing coil C62 of the "down" direction switch, all arranged in series relation. At the same time contacts 138 complete a circuit for the oppositely wound coil S142 of the door contact sequence relay. The circuit for the coils C62, N141 and S140 may be traced from contact 72, by way of line 143 through contacts P60, coil C62, contacts 132, coil N141, coil S140, back contacts S144, door contacts 137, gate contacts 136 and contacts 138, line 75, line 74, to line 5' as previously traced. The circuit for coil S142 may be traced from line 69, by way of line 145 through coil S142, contacts 138, line 75, line 74, to line 5'.

The purpose of the door contact sequence relay is to insure the closure of the gate and doors before starting the motor. When coils S140 and S142 are energized simultaneously, the coils being differentially wound, the door contact sequence relay is not operated. If either coil S140 or coil S142 is energized ahead of the other, or if either coil alone is energized, contacts S144 will open preventing the starting of the car. If, when contacts 138 are closed, any of the contacts P60, 132, 137, or 136 are open, coil S142 alone will be energized resulting in the opening of contacts S144. One of the reasons why it is preferred to bridge contacts 92 ahead of contacts 138 is to insure the prior closure of the "selector" stop switches 132 and 133 and slow-down switches 134 and 135. Similarly, contacts 77 are bridged ahead of contacts 138 to effect the prior closure of the gate and door contacts. It will be obvious, therefore, that the car cannot be started on the gate contacts. The door contact sequence relay is provided with additional contacts S129. These contacts will be separated to stop the motor if the gate or door is opened while the car is running. After the first accelerating switch D has operated, the "down" direction switch will be maintained in operated position by holding coil C146, unaffected by contacts S144. When contacts S129 separate, however, operating coil D170 of the first accelerating switch will be de-energized. The circuit for coil C62 being open at contacts S144, the direction switch will drop out due to the fact that the circuit for its holding coil is open at contacts D197.

Upon operation of the "down" direction switch in response to the energization of its closing coil C62, contacts C147 and C148 separate, breaking the electro-dynamic brake circuits comprising the resistances 15 and 16, and the contacts C149 and C150 close, completing the circuit for the motor armature M. The circuit for the motor armature may be traced from line 1', by way of line 151 through contacts A49, by way of line 152 through contacts C149, by way of line 153 through the reactance coil 154 and the motor armature M, by way of line 155 through contacts C150, contacts A50, and current coils RA156 and RC157 of the load switches, through contacts D190, to line 2'. Also contacts C36 separate so that, with contacts C149 closed, the field 12 is connected across mains 1 and 5. The circuit for the field may now be traced from line 152, by way of line 158 through back contacts B160 of the "up" direction switch and a portion of resistance 16, line 161, by way of line 34 through back contacts F162, line 38, by way of line 39 through field 12, to line 5', as previously traced. The direction switch is provided also with contacts C163 which close to complete a circuit for the brake release coil 24. This circuit may be traced from line 158 and a portion of resistance 16, by way of line 161 through coil 24, contacts RC164, contacts A52, coil O165 of the signal reset switch and contacts 166, by way of line 167 through contacts C163, to line 5'. Energization of the brake coil releases the brake, permitting the motor to start. The direction switch is provided further with auxiliary forward contacts C168 and auxiliary back contacts C169, the purpose of contacts C168 being to complete the circuit for the first accelerating switch coil D170, and the purpose of contacts C169 being to prevent energization of the holding coil B177 for the "up" direction switch when auxiliary contacts D178 close in response to the energization of coil D170. The circuit for coil D170 may be traced from segment 70 and contact 172, by way of line 173 through contacts 134 and contacts C168, by way of line 174 through coil D170, shunted by resistance 175, and contacts D176, line 121, to line 2' as previously traced.

The brake resistance switch N operates substantially simultaneously with the direction switch C. Thus contacts N100 separate to break the circuit through line 98 so that if the operator, after starting the car, should return and hold the starting switch in position I, bridging contacts 92, the pawl magnet coil will not be overheated. Contacts N180 close to by-pass starting switch contacts 138. The starting switch may now be released whereupon it will be automatically centered in "neutral" position. Contacts N181 close to prepare another circuit for the automatic reset switch closing coil X95, the purpose of which will be set forth in later description. Additional contacts N182 may be provided on this switch to close the circuit to suitable mechanism, such as a motor 31, for withdrawing the leveling switch 30 from the path of its cams. This circuit may be traced from line 1', line 68, switch 36, line 81, line 87, by way of line 183 through contacts N182, resistance 184, motor field 185 and armature 186, line 187, line 75, line 74, to line 5' as previously traced.

The energization of the first accelerating switch operating coil D170 will cause the closure of power contacts D189 and D191 and auxiliary contacts D197 and D178 and the separation of power contacts D190 and D192 and auxiliary contacts D176 and D104. Of the power contacts, first contacts D189 close to connect the transfer resistance 6 across lines 2' and 3', the circuit being from line 2', through contacts D192, contacts D190, line 193, resistance 6, contacts D189, line 194, contacts E202, contacts E204, to line 3', and contacts D190 separate to place resistance 7 in series with resistance 6 across lines 2' and 3'. Then contacts D191 close and contacts D192 separate to connect the motor armature directly to line 3' and break the connection to line 2' respectively. Of the auxiliary contacts, contacts D176 separate to insert cooling resistance 195 in series with the operating coil D170. Contacts D104 separate to insert cooling resistance 196 in series with coil U93. Contacts D197 close to complete a circuit for holding coil C146 of the "down" direction switch and holding coil N198 of the brake resistance switch. Contacts D178 close in the circuit for the holding coil B177 of the "up" direction switch but this closure has no effect during the period of down travel since the circuit for coil B177 is open at contacts C169, as previously set forth. The circuit for coils C146 and N198 may be traced from line 68, by way of line 69 through coil C146, back contacts B199 and contacts D197, by way of line 200 through coil N198, to line 5'.

It is preferred to provide the accelerating switches with mechanical interlocks to insure proper sequence of operation. A form of interlock which has been found suitable, illustrated in Figures 36 and 37, will be described later. It is to be noted that, with the transfer of the motor armature circuit to line 3', a higher voltage is applied to the coils E126 and F123, due to the fact that line 121 also is transferred to line 3'. Sufficient current is now supplied to coil E126 to cause the operation of the second accelerating switch. A copper sleeve (not shown) may be provided to give the switch a time element, as is well understood by those versed in the art.

The switch E operates to transfer the motor armature M from line 3' to line 4', the operation of the power contacts E201, E202, E203 and E204 and resistances 8 and 9 being the same as the operation of the power contacts of switch D and resistances 6 and 7. The switch is provided also with auxiliary contacts E206, E124 and E210. Contacts E206 close to complete a circuit for brush magnet coil 207 and voltage coil RB208 of the speed control load switch. This circuit may be traced from line 121, by way of line 209 through coils 207 and RB208 in parallel and contacts E206, back to line 121 and thence to line 3' as previously traced. Contacts E124 separate to break the shunt circuit, comprising resistance 125, for coil F123. Contacts E210 close to short circuit resistance 128 in series with coil F123. These last two operations, in conjunction with the fact that line 121 has been transferred to a still higher voltage line, permit sufficient current to be taken by coil F123 to effect the operation of the last accelerating switch.

The switch F now operates to transfer the motor armature to line 5', the operation of contacts F211, F212, F213 and F214, along with resistances 10 and 11, being the same as that of the power contacts and transfer resistances of the first and second accelerating switches. The motor armature circuit may now be traced from line 1', by way of line 151 through contacts A49, by way of line 152 through contacts C149, by way of line 153 through reactance coil 154 and the motor armature M, by way of line 155 through contacts C150 and A50, by way of line 215 through contacts F213 and current coil RB216 of the speed control load switch, to line 5'. The purpose of the reactance coil 154 is to smooth out the voltage steps as will be readily understood by those skilled in the art.

It will be noted that the current coil RB216 of the speed control load switch is now energized. The switch is so adjusted that its voltage coil RB208 alone will not operate it. However, when the motor armature is taking current from the line, the coils RB208 and RB216 assist each other to operate the switch, separating contacts RB217. Auxiliary back contacts F162 are separated upon operation of switch F. Separation of contacts RB217 and contacts F162 inserts all of resistance 20 in the shunt field circuit to bring the motor up to full speed. If at any time the motor operates under negative load conditions, i. e., light load up or heavy load down for an over counterweighted elevator, the current coil RB216 will oppose the voltage coil RB208, permitting the closure of contacts RB217. Closure of these contacts short circuits a portion of resistance 20 to strengthen the field, slowing down the motor.

It will be understood that had the "director switch" segment 70 been in up position bridging contacts 291, 702, 703 and 508, "up" direction and non-interference switches B and Q, instead of "down" direction and non-interference switches C and P, respectively, would have been operated. The "up" direction switch has power contacts B218, B160, B219 and B220, corresponding to and operating in place of "down" direction switch power contacts C147, C148, C149 and C150 respectively, and has auxiliary contacts B35, B221, B222 and B199, corresponding to and operating in place of auxiliary contacts C36, C163, C168 and C169. The "up" non-intereference switch has contacts Q283, Q325, Q64 and Q294, corresponding to and operating in place of "down" non-interference switch contacts P57, P58, P60 and P61.

The motor and car will continue to run at full speed until stopped by one of the many stopping arrangements. Stopping by means of the "director switch" hatchway cams will now be described. It is assumed that the car has started from floor 4 and that it has gotten up to full speed. As the car nears the bottom floor, the roller 738 on the "director switch" operating arm 737 strikes the hatchway cam, moving the bridging segment 70 off contact 118. The circuit for coils E126 and F123 is thus interrupted. The switch F, having no time constant, drops out immediately, resulting in the connection of the motor armature to the next lower voltage step. The power contacts of switch F operate in inverse order so that the transfer from line 5' to line 4' is gradual. The circuit through current coil RB216 is broken upon separation of contacts F211.

Contacts RB217 and contacts F162 close to short circuit resistance 20 strengthening field 12 for regenerative braking during the slow down operation. Switch E also drops out, retarded however by the copper sleeve and discharge resistance 127 as will be readily understood. The motor armature is now transferred from line 4' to line 3'. Auxiliary contacts E124, E206 and E210 return to their original positions in preparation for the next starting operation.

As the roller rides farther down on the cam, the "director switch" segment 70 moves off contact 172, breaking the circuit for coil D170. Switch D now drops out, retarded however by its discharge resistance 175, transferring the motor armature from line 3' to line 2'. It will be understood that the mechanical interlocks function during the period of retardation to insure the operation of the accelerating switches in inverse sequence. Auxiliary contacts D197 separate, breaking the circuit for holding coils C146 and N198. Contacts D178 separate and contacts D176 and D104 close in preparation for the next starting operation.

As the car approaches still closer to the bottom landing, the hatchway cam will move the "director switch" to neutral and then reverse position. As a result, the segment 70 moves off contact 71 and then contact 72, deenergizing coils P56, C62 and N141.

"Down" non-interference switch P drops out, separating contacts P60 and P61 and closing contacts P57 and P58. Separation of contacts P60 prevents the establishment of a circuit for coil C62 upon the completion of a circuit for coil B63 as will be obvious from previous description. The purpose of the separation of contacts P61 and the closure of contacts P57 and P58 will be obvious from later description. "Down" direction switch C drops out, separating power contacts C149 and C150 and auxiliary contacts C163 and C168 and closing power contacts C147 and C148 and auxiliary contacts C36 and C169. Contacts C149 and C150 disconnect the motor armature from the power mains while contacts C147 and C148 connect electro-dynamic brake resistances 15 and 16, respectively, across armature M. It is preferred to arrange contacts C147 and C148 to close in sequence as indicated in Figure 31. Separation of contacts C163 deenergizes the brake release coil 24. The brake shoes will be applied, which, along with the action of the electro-dynamic brake resistances, will bring the motor to a stop. The closure of contacts C36 will reconnect the field to lines 3' and 5', as will be obvious from previous description. Contacts C168 and contacts C169 are prepared for the next starting operation.

The switch N drops out along with the direction switch, separating contacts N182, N181 and N150 and closing contacts N224 and N100. The separation of contacts N182 deenergizes the leveling switch motor 31. The separation of contacts N181 and N180 is in preparation for the next starting operation, contacts N180 breaking the by-pass circuit around starting contacts 138. Contacts N224, being on the smaller and faster switch, close substantially at the same time that contacts C163 separate, connecting discharge resistance 225 around coil 24 to "soften" the brake. The closure of contacts N100 is in preparation for the next starting operation.

The leveling switch motor being deenergized, the leveling switch is moved into position for its operating rollers to engage the leveling cams. For convenience of description, it is assumed that the main motor is stopping with the car still above the floor. Leveling switch contacts 226, 226' and 227, 227' close completing the circuits for coils J228 and H230 and coil K231 respectively. The circuit for coils J228 and H230 may be traced from line 81, coil J228, by way of line 232 through back contacts G233 of the auxiliary "up" direction switch and coil H230, contacts 226, 226', line 187, to line 5' as previously traced. The circuit for coil K231 may be traced from line 81, line 82, by way of line 234 through coil K231, line 235, contacts 227, 227', line 236, contacts 226, 226', line 187, to line 5'. It is to be noted, due to the fact that the circuit for coil K231 is through contacts 226, 226', that the circuit for coil H230 must be made in order for the circuit for coil K231 to be completed. The auxiliary line switch J now operates to close contacts J237, preparing the circuit for the auxiliary motor, and to close auxiliary contacts J238, preparing a control circuit hereinafter described. Auxiliary "down" direction switch H also operates, separating contacts H239 and H240 and closing contacts H241 and H242. Separation of contacts H239 disconnects electro-dynamic brake resistance 19 from across the auxiliary motor armature $m$. The auxiliary speed switch K also operates, separating contacts K243 and closing contacts K244. Closure of contacts H241, H242 and K244 completes the auxiliary motor circuit for fast speed operation. The circuit for armature $m$ may be traced from line 1', contacts J237, by way of line 245 through contacts H241 and back contacts G246, armature $m$, by way of line 247 through contacts H242, line 248, contacts K244, resistance 27, series field 14, to line 5'. The circuit for shunt field 13 may be traced from contacts J237, by way of line 250 through resistance 22 and field 13, to line 5'. The circuit for brake release coil 25 may be traced from contacts H241, by way of line 251 through coil 25 to line 250.

The switch K also separates auxiliary back contacts K252. As back contacts K252 separate before forward contacts J238 close, closure of the latter contacts has no effect at this time other than to prepare the control circuit as above stated.

The auxiliary motor armature and field circuits being complete and the brake released, the auxiliary motor starts, driving the elevator through the main motor brake. The main motor brake rotates, serving as a clutch for the auxiliary motor, a form of drive which is well understood in the art. The auxiliary motor will assume the drive of the elevator as the main motor is stopping, giving smooth operation. The auxiliary motor accelerates subject to the operation of short circuiting accelerating resistance 27 and series field 14. This operation is effected in the usual manner, the resistance and field being short circuited in steps by means of contacts L253, L254, L255 and L256 subject to the control of C. E. M. F. coil L257. Auxiliary contacts L258 close along with contacts L253 to insert a resistance 259 in parallel with coil H230. Thus, so long as contacts L258 are closed, coil H230 will receive sufficient current to hold in but not enough current to operate. Resistance 259, therefore, not only serves to cool the operating coils H230 and G260 of the auxiliary direction switches but also forms an electrical interlock between them. Back contacts G233 and H240 form an additional interlock in the manner well understood in the art.

As the car nears the exact floor level, due to the contour of the leveling cams and the construction of the leveling switch itself, as will be described in connection with Figure 38, contacts 227, 227' separate, deenergizing coil K231. Switch K drops out, separating contacts K244 and closing both contacts K243 and auxiliary contacts K252. The auxiliary motor armature $m$ is thus disconnected from line 5' and connected to line 3', the connection being through slowdown resistance 28. This resistance is provided to "cushion" the motor at the instant of change. Closure of contacts K252 completes a circuit for coil T263 of the auxiliary slow-down switch. Operation of this switch separates contacts T264, breaking the circuit for C. E. M. F. coil L257, and closes both contacts T265 and contacts T266, short circuiting slow-down resistance 28 and shunt field resistance 22 respectively. The auxiliary motor now brings the car at a slow speed to an exact level with the floor, leveling switch contacts 226, 226' separating to deenergize coils J228 and H230. The switches J and H drop out, disconnecting the motor which is brought to a full stop due to the re-insertion of electrodynamic brake resistance 19 at contacts H239, the resistance functioning on a dying field, and the application of the brake shoes, the brake release coil 25 being deenergized upon separation of contacts H241. If the car overruns the floor, the leveling operation will be the same except that the auxiliary motor switches for up direction of travel will be closed. The auxiliary "up" direction switch contacts are designated G267 and G268. It is believed that such operation will be obvious from the description of operation above set forth.

It is preferred to have the gate and door open automatically upon each floor stop. This may be done by providing line 269 to shunt contacts 88 when both contacts J238 and K252 are closed. With such an arrangement, the gate and door will open while the car is in the slow speed leveling zone so that completion of the door opening operation and the leveling of the car occur substantially at the same time. It will be noted that contacts J238 separate when switch J drops out in the final leveling operation so that further automatic operation of the door and gate operating mechanism is prevented. Thus, when the operator moves the starting switch to position I causing the closing of the door and gate, the door and gate will remain closed. Obviously, other connections or circuits may be employed to effect the automatic door opening operation.

Although the "director switch" may act to stop the car in the above described manner, its major purpose is to determine the direction of travel of the car. It is preferred to employ the selector machine primarily to effect all normal stopping operations, permitting the "director switch" to insure the stop at the terminal floors. Referring now more particularly to Figure 33 and the circuits associated with Selector Machine, Elevator No. 1, the stopping operation at the bottom floor as effected by the selector machine will now be described.

Assume that the car has started down from floor 4 and has attained full speed as previously described. Contacts E206 are therefore closed and the brush magnet coil 207 is energized, advancing the stop brushes. Provision for advancing the brushes is made in order to meet the local running conditions; that is, when the car is running at full speed it requires a longer slow-down period than when running from floor to floor. "Down" stop brushes 270 and 271, being advanced, will engage the bottom floor stop contacts 272 and 273 when the car is about fifteen feet from the floor, such a distance having been found a satisfactory one in practice within which to perform the slowdown and stop operations for a car running at 800 feet per minute. It will be observed that no car or hall buttons are provided for the top and bottom floors, contacts 272 and 273 being connected directly to a power line. Keeping these contacts permanently "alive" in this manner assures a stop on the selector machine at these limit floors. Engagement of car stop brush 271 and contact 273 establishes a short circuit for coil U93 of the car stop switch while engagement of hall stop brush 270 and contact 272 establishes an additional circuit for coil X95 of the automatic reset switch. The short circuit for coil U93 may be traced from line 274 at resistance 196, through contacts Z275 which are closed as the motor starts to prepare circuits for the car stop brushes as will be explained later, line 276, contacts P61, brush 271, contact 273, line 277, to line 105. The additional circuit for coil X95 may be traced from line 96, line 97, by way of line 102 through contacts V111 and U110, line 106, coil X95, contacts X107, line 278, by way of line 280 through non-stop switch 281, automatic non-stop switch contacts 444, contacts N181, by way of line 282 through back contacts Q283, brush 270, contact 272, line 277, line 105, to line 5'. As this latter circuit, by-passing coil V94, permits increased current flow to coil X95, the automatic reset switch operates to separate contacts X107, deenergizing coil V94. Coil U93 being short circuited, the car stop switch drops out, separating contacts U110, U116 and U112 and, coil V94 being open circuited, the hall stop switch drops out, separating contacts V111, V117 and V113. The separation of contacts U110 and V111 is in preparation for the next starting operation. The separation of contacts U116 and V117 deenergizes the coils of the second and third accelerating switches E and F. These switches now function in the stopping operation to retard the main motor in the manner previously described. The separation of contacts U112 and V113 deenergizes the pawl magnet coil 114 to release the pawls. As the selector machine crosshead continues its movement, the "down" pawl 842 engages the first floor stopping collar 844, causing the contacts 134 and contacts 132 to separate in sequence as has previously been described in connection with Figure 13. Separation of contacts 134 deenergizes the coil of the first accelerating switch D, further retarding the motor. Separation of contacts 132 breaks the circuit for the direction switch closing coil C62 and the brake resistance switch closing coil N141, stopping the main motor and causing the auxiliary motor to bring the car to a level with the floor in the manner previously described. It will be observed that the separation of either contacts U116 and U112 or V117 and V113 will effect the slow-down and stop operations above described.

The purpose of the retardation control load switch RA and the brake control load switch RC is to aid in stopping the car level with a floor under varying conditions of load and speed. These switches are provided with voltage coils RA261 and RC262 connected in such a manner that their applied voltage is always that of the line less the voltage across the motor armature M. Thus, at the instant of starting the motor, the voltage applied to these coils will be a maximum and, when the motor is running at full speed, the voltage applied will be substantially zero. The circuit for the voltage coils is completed by direction switch auxiliary contacts C163 and may be traced from line 1', by way of line 151 through contacts A49, by way of line 152, through contacts C149, line 153, through reactance coil 154 and armature M, by way of line 155, back contacts B218, a portion of resistance 15, by way of line 167 through coils RA261 and RC262, arranged in parallel, and contacts C163, to line 5'. The switches are preferably adjusted so that their voltage coils alone will not operate them. As has been indicated in tracing the power circuits for the motor armature, these switches are provided also with current coils RA156 and RC157. The switches will not operate when the motor armature is taking current from the line as the voltage coil and current coil of each switch are arranged to act in opposition under these condtions. When, however, the motor changes to a generator and returns current to the line, as it may do during the retardation period, the coils, acting cumulatively, may cause the switches to operate. The switches may be adjusted to operate at any desired value of total ampere turns, such adjustment being determined by the particular installation. It is to be noted that the effectiveness of the voltage coils increases as the accelerating switches drop out. Thus the load switch RC, for example, may not operate until after the motor armature circuit has been transferred back to main 2.

The load switches are inactive during the period of full speed operation of the motor due to the fact that their current coils are shunted by a circuit comprising line 215 and contacts F213. As the deenergization of switch coil F123 is normally caused by the separation of contacts U116 or V117 and as the separation of these contacts is caused by the engagement of a selector machine brush and "live contact", it may be said that the switches are rendered active in response to the operation of the selector machine. The switches are preferably adjusted so that the slow-down and stop operation is governed entirely by the selector machine when the motor is "lifting" a load. When, however, the motor is "lowering" a load, that is, a light load up or a heavy load down, the load switches act automatically. The switch RA, therefore, may operate in advance of the "selector" slow-down switch 134 to deenergize the first accelerating switch coil D170 by separating contacts RA130. Thus the regenerative braking effect is increased with the car at a greater distance from the landing, causing the motor to be running at a slower speed when the final stopping operation is initiated. Similarly, the switch RC may act in advance of the "selector" stop switch 132 to insert a resistance 223 in series with brake release coil 24, with the result that the brake shoes are partially applied, causing the motor to be running at a still slower speed when the final stopping operation is initiated.

Under normal operating conditions, the stops at the intermediate floors are made in response to the pushing of car or hall buttons. The stop operation in response to the pushing of a car button will now be described.

Assume that a "down" traveling car has taken on passengers at the sixth floor and that these passengers have called the third and second floors. The operator now pushes car buttons 653 and 652 and moves the starting switch to position I, closing the gate and door, and then to position II, starting the car. Or, the operator may start the car and push the car buttons while the car is running. As has been previously explained, these buttons once pushed will be held in closed position by the car button magnet coil 67. Thus a circuit is prepared to third floor car stop contact 285 and second floor car stop contact 286, rendering them "alive". Upon the engagement of brush 271 and contact 285 a short circuit is again established for the car stop switch coil U93. This circuit may be traced from line 274 at resistance 196, contacts Z275, line 276, contacts P61, brush 271, contact 285, line 287, push button 653, to line 105. Coil U93 being short circuited, the car stop switch will drop out, separating contacts U116 and U112. Separation of contacts U116 effects the initial slow-down while separation of contacts U112 effects the further slow-down and stop of the car in the manner previously described. Incidentally, separation of contacts U110 deenergizes coils V94 and X95 but without effect at this time as no hall buttons have been pushed.

On a run of several floors, such as has just been completed, the slow-down is effected with advanced brushes. During the slow-down however, contacts E206 are separated, deenergizing the brush magnet coil 207, whereupon the brushes are brought back to their retarded position. Such retardation is to be desired since a permanent advance of the brushes might carry them beyond the next floor contacts. For example, upon a stop at the third floor such as just described, with the distance to the second floor only twelve feet, brush 271, advanced, might be below contact 286. Thus the car, upon being started again, would not stop at the second floor in response to the second floor car button.

The brushes being in retarded position however, the car, upon being started again, will stop in response to the car button at the second floor. Depending upon the distance between floors, brush 271 may engage contact 286 before switch E operates to complete the circuit for the brush magnet coil 207. Once this engagement is made, due to the shunting of coil U93 and consequent separation of contacts U116, switches E and F cannot operate. Therefore, the brush magnet coil will not be energized and the motor cannot accelerate to full speed. Thus the shorter slow-down range, due to the comparatively late engagement of the brush and contact, will be sufficient. Even though the brush magnet coil does become energized during this floor to floor run, if brush 271 in its downward movement sweeps across contact 286, the slow-down operation will immediately become effective. With the exception of the initiation of the slow-down operation, the stop at the second floor is made in the same manner as the stop at the third floor, above described.

In some installations the distance between certain floors may be so short that, for example, with the car at rest at the third floor, brush 271 may be touching contact 286. The short circuit, which would be established for coil U93 with contact 286 "alive", is not complete however because the circuit to the brush is not prepared until contacts Z275 of the sequence stop relay are closed. Since the operating coil Z288 of the relay is connected in parallel with the brake release coil 24, contacts Z275 are not closed until contacts C163 are closed and therefore not until the starting switch is moved to position II. Thus, when the starting switch is moved to position I, the energization of the pawl magnet coil 114 is effected in the previously described manner so that, when the starting switch is moved on to position II, contacts 132, 133, 134 and 135 will be closed and the motor will start.

The stop at the second floor having been completed, the car, upon being started by the operator, will proceed to the bottom floor where it will stop in the manner previously described. The car may not get up to full speed as will be evident from the description of the run from the third to the second floor. Furthermore, in event of another "short" floor, the "director switch" segment 70 may be moved off contact 118 by the engagement of its cam and roller at the second floor, preventing the operation of the second and third accelerating switches and the advance of the brushes.

As the bottom floor stop is made, the "director switch" will be moved to its up position as previously described. As a result, it will be observed that the car button magnet coil 67 will be deenergized as segment 70 moves off contact 71. All the car buttons which have been pushed are thus released or reset to their original open circuit position. Coil 67 will be reenergized when its circuit is completed by the engagement of segment 70 and contact 291.

It is to be noted from the above description that response will always be had to car buttons, regardless of the order in which they are pushed, since a button, once pushed, is held down by the car button magnet, maintaining the car stop circuit prepared until the "director switch" is moved to "neutral" position. Similarly, response will be had regardless of the time during the run that a car button was pushed, so long as the "down" car stop brush 271 with the car traveling in the down direction, or "up" car stop brush 292 with the car traveling in the up direction, has not passed the corresponding car stop contact for that floor. Thus on a down run for example, the car will respond to the sixth floor car button pushed at the eighth floor, the fourth floor car button pushed at the fifth floor, the third floor car button pushed at the seventh floor and the second floor car button pushed at the tenth floor. It will be observed that no signal is lighted due to car button operation.

It will be observed that none of the "down" hall buttons were pushed and therefore none of the "down" hall contacts were "alive" in the above described operations so that no circuit was completed by hall stop brush 270. Also the circuits including the "up" car stop brush 292 and the "up" hall stop brush 293 were open at contacts Q294 and contacts P57 respectively. Thus, even though an "up" hall button had been pushed, there would be no response during down operation.

A stopping operation in response to the pushing of a hall button will now be described. Assume that the car is at rest at the sixth floor and that a prospective passenger at the fourth floor pushes "down" hall button 295, completing a circuit for closing coil 296 of the "down" fourth floor stop switch. This circuit may be traced from power main 4, line 298, by way of line 299, through back contacts 300, 300' of the "down" fourth floor signal switch, coil 296, closing coil 301 of the floor signal switch, cut-out switch 302 and push button 295, line 303, to power main 5. The floor stop switch will operate in the manner previously described in connection with Figures 26 and 27 to latch contacts 304, 304' in closed position. It will be observed that, along with the operation of the floor stop switch to close contacts 304, 304', the floor signal switch operates to separate back contacts 300, 300'. Thus, until contacts 300, 300' are again closed, if the prospective passenger should again push hall button 295, no circuit would be completed. The utility of these back contacts will be more evident from further description. Closure of contacts 304, 304' prepares a circuit for "down" fourth floor hall stop contact 305, rendering it "alive".

Assume now that the car has started down. As it nears the fourth floor, hall stop brush 270 will engage contact 305, establishing an additional circuit for closing coil X95 of the automatic reset switch. This circuit may be traced from line 96, line 97, by way of line 102 through contacts V111 and U110, line 106, coil X95, contacts X107, line 278, by way of line 280 through non-stop switch 281, automatic non-stop switch contacts 444 and contacts N181, by way of line 282 through back contacts Q283, brush 270, contact 305, line 306, bar 307, line 308, contacts 304, 304', floor stop switch reset coil 310, line 303, to main 5. As this circuit, by-passing coil V94 through coil 310 of low resistance, permits increased current flow to coil X95, the automatic reset switch X operates to separate its contacts X107, deenergizing coil V94. Coil V94 being deenergized, the hall stop switch V will drop out, separating its contacts V117 and V113. Separation of contacts V117 effects the initial slow-down, while separation of contacts V113 effects the further slow-down and stop of the car in the manner previously described. This increased current, however, is not sufficient to cause coil 310 to reset the floor stop switch. As the automatic reset switch operates, it closes forward contacts X312 just before it separates back contacts X107. Thus, just as the circuit is broken for coil V94, a circuit is established for a holding coil X313 for the automatic reset switch. When the holding coil circuit is completed, the current flow through reset coil 310 is increased due to the fact that holding coil X313 is of lower resistance than closing coil X95 and further to the fact that the current has an additional path around coil X313 through resistance 314. The increased current is sufficient to cause the reset coil 310 to trip out of the latch permitting contacts 304, 304' to separate, completing the reset operation. The holding coil X313 serves the additional purpose of giving the floor stop switch sufficient time in which to reset.

It is believed that the operation of the system in response to the pushing of a hall button, so far as the advance or retard of the brushes is concerned, will be obvious from previous description. In the event of a "short" floor however, with the car at rest at the fourth floor, brush 270 may be in engagement with contact 385. The by-pass, which would be established for coil V94 with contact 385 "alive", is not complete however because contacts N181 of the brake resistance switch, included in the by-pass circuit, are open when the motor is at rest. Furthermore, closing coil N141 is not energized and consequently contacts N181 are not closed until the starting switch is moved to position II. Thus when the starting switch is moved to position I, the energization of the pawl magnet is effected in the previously described manner so that, when the starting switch is moved on to position II, "selector" switches 132, 133, 134 and 135 will be closed and the motor will start.

As in the case of car button operation, response will always be had to hall buttons, regardless of the order in which they were pushed, since the contacts of the floor stop switches, once closed, will be maintained so until tripped out by reset operations. Similarly, during a run from one terminal landing to another, response will be had regardless of the time during the run that the hall button was pushed so long as the "down" hall stop brush 270 with the car traveling in the down direction, or "up" hall stop brush 293 with the car traveling in the up direction, has not passed its corresponding hall stop contact for that floor. As distinguished from car button operation, however, the hall stop contact is not rendered "dead" at the terminal landings so that the call will ultimately be responded to. Since the result of pushing either a car button or a hall button is to prepare a circuit for a corresponding stop contact, it is believed obvious that a car will respond to all calls during a run, regardless of whether due to a car or hall button and regardless of the relative order in which the buttons were pushed.

In order to assure a stop at the second floor, when going up and at the ninth floor when going down, the insulation guarding the selector machine stopping contacts for these floors is cut away in the manner previously described. In order to illustrate the operation, a stop at the second floor will be described. So long as "up" stop brushes 292 and 293 pass below their corresponding second floor stationary contacts 286 and 311, respectively, when the car makes a stop at the bottom floor, the stop at the second floor in response to the car or "up" hall button will be made in the usual manner. However, if for any reason, for example a "short" floor, these brushes do not pass their contacts, due to the fact that the guarding insulation is removed the brushes and contacts will be in engagement. Assuming such a condition with the second floor "up" hall button 472 pushed, when the operator moves the starting switch to position II to start the car, contacts N181 will be closed to complete the by-pass for coil V94. Thus a stop at the second floor is assured. Similarly, with the second floor car button 652 pushed, when the operator moves the starting switch to position II, contacts Z275 will be closed to complete the short circuit for coil U93.

Further description of the operation of stopping in response to the pushing of hall buttons will be given along with the description of operation of a group of cars. The operation of the floor signal system will now be described. It has been seen that the floor signal switch operates simultaneously with the floor stop switch in response to the pushing of a hall button. Thus when hall button 295 was pushed, the "down" fourth floor signal switch closed contacts 315, 315' at the same time that the floor stop switch closed contacts 304, 304'. As has been stated, the signal switch also separated its back contacts 300, 300'. Closure of contacts 315, 315' prepared a circuit for "down" fourth floor signal contact 316, rendering it "alive". Assume that the car has started down from the tenth floor and that button 295 has been pushed. The initial circuit to the signal lamp is completed by the leading signal brushes when the car is about forty feet away from the floor called. This distance is more or less arbitrary but has been found in actual practice to give sufficient advance warning for the prospective passenger to note the signal and position himself at the proper elevator door. Thus when the car is forty feet from the fourth floor, leading signal brushes 317 and 318 engage signal contacts 316 and 320 respectively, completing the circuit for the "down" fourth floor signal lamp 321. This circuit may be traced from line 96, by way of line 322 through non-stop switch 323 and automatic non-stop switch contacts 445, by way of line 324 through back contacts Q325 of the "down" non-interference switch and lamp 321, contact 320, brush 318, connection 326, brush 317, contact 316, line 327, bar 328, by way of line 330 through contacts 315, 315' and reset coil 331, line 303, to main 5. Reset coil 331, as well as reset coil 310, is of low resistance so that the brightness of the signal light will not be affected. The circuit for the lamp is maintained by the succeeding pairs of signal brushes 332—333, 334—335 and 336—337 in the order named, each pair engaging before its preceding pair moves off contacts 316 and 320. With the car stopped at the fourth floor, brushes 336 and 337 will engage contacts 316 and 320, the other brushes having passed, beyond, as illustrated in the diagram.

Assuming that the car has completed its stop at the fourth flour, the operator moves the starting switch to position I, and then to position II starting the car. As has previously been explained, the starting switch in position II causes the operation of a direction switch, in this case direction switch C. Closure of the direction switch auxiliary contacts C163 completes the circuit for coil O165 of the signal reset switch. This coil is arranged in series with brake release coil 24, the circuit for which has previously been traced. The signal reset switch operates immediately to close contacts O338, connecting a resistance 340 of small ohmic value in parallel with lamp 321. This parallel circuit permits sufficient current flow to floor signal switch reset coil 331 to effect the reset operation. Thus contacts 315, 315' separate breaking the circuit for lamp 321. It will be observed that this comparatively late reset operation maintains the signal lighted until the car is actually being started away from the floor. Thus a tardy prospective passenger will be informed that the car is at the floor, affording him an opportunity to "catch" it.

The late reset operation serves another and important purpose in that it prevents reclosure of the floor stop switch until the stop has been fully completed. Prospective passengers sometimes become impatient and push the hall button several times before the car arrives. This might be done just as the car is arriving at the floor and after the floor stop switch has been reset. However, reclosure of the floor stop switch, which would cause a later false stop, is prevented by the fact that back contacts 300, 300' of the floor signal switch remain separated. Thus, even though the floor stop switch is already reset, it cannot be operated again until the corresponding floor signal switch resets to close its back contacts.

Figure 39:
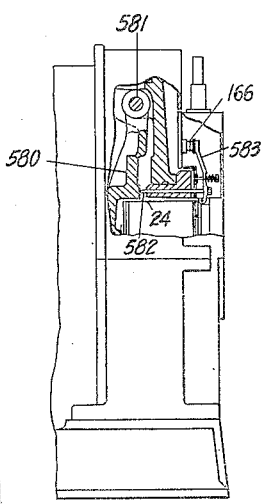
Figure 39 is a fragmental detail of the brake operated switch.

As has been seen, closure of contacts C163 also causes the release of the brake. Contacts 166 are provided on the brake and are arranged to separate as the brake releases. Referring briefly to Figure 39, the brake switch is operated by means of a movable brake magnet arm 580 pivotally mounted on pin 581. Upon energization of brake release coil 24, the brake magnet arm 580 is attracted, operating through rod 582 to cause the switch arm 583 to separate contacts 166. Separation of contacts 166 breaks the circuit for signal reset switch coil O165, the circuit for brake release coil 24, however, continuing through resistance 341. The signal reset switch now drops out to separate contacts O338 in preparation for the next starting operation. Contacts O339 of the signal reset switch are opened and closed along with contacts O338 but with no effect during down operation of the car due to the separation of "down" non-interference switch contacts P58.

If no other car or hall buttons are pushed, the car will proceed to the bottom floor and stop in the previously described manner. As is the case with the bottom floor stop contacts, the bottom floor signal contact 342 is permanently alive. Thus the "up" signal lamp 343 at the bottom floor will be automatically lighted upon the approach of the car. The circuit for lamp 343 is established and maintained in a similar manner as was the circuit for lamp 321 at the fourth floor, the signal brushes engaging in sequence with signal contacts 343 and 344. With the car stopped at the bottom floor, leading brushes 317 and 318 will be in engagement with additional signal contacts 3.5 and 346. An additional circuit is thus established to lamp 343. This circuit is not affected by the separation of contacts Q325 in response to the reversal of the "director switch". The circuit for lamp 343, with the "director switch" reversed, may be traced from line 96, line 347, contact 345, brush 317, connection 326, brush 318, contact 346, line 348, line 324, lamp 343, contact 344, brush 335, connection 350, brush 334, contact 342, line 277, line 105, to line 5'. It will be observed that this circuit does not include the trailing signal brushes 336 and 337. This is because contacts 342 and 344 are arranged below the normal floor stop position, as set forth in the description of Figure 11. It is preferred to so arrange contacts 342 and 344 in this manner in order that contacts O338 of the light reset switch will close in an open circuit, there being no floor signal switch to reset. The light will be extinguished upon up movement of the car as brushes 317 and 318 move off contacts 345 and 346. As signal operation at the top floor is accomplished in the same manner as at the bottom floor, no description is believed necessary.

The system may also be provided with car and dispatcher annunciators in which event the circuit may be arranged so that closure of a hall button causes the completion of a circuit for the corresponding annunciator lamps. A car annunciator is particularly desirable for intermittent service, such as in hotels or in other installations during night operation. Further, it is useful to the operator for any kind of service as it will register the floor where the button was pushed and will indicate the direction in which the prospective passenger desires to go. The dispatcher annunciator is particularly useful where a group of elevators are operating as will be hereinafter set forth.

For the purpose of illustrating the operation of the annunciator system, assume again that the car is at the top floor starting down and that the "down" fourth floor hall button 295 has been pushed. As previously set forth, closure of hall button 295 causes the operation of the "down" fourth floor signal switch to close contacts 315, 315'. Regardless of the position of the signal brushes, closure of contacts 315, 315' immediately completes the circuit for car annunciator lamp 351 and dispatcher annunciator lamp 352. This circuit may be traced from line 96, by way of line 353 through the parallel circuits comprising the car annunciator cut-out switch 354 and lamp 351 and the dispatcher annunciator cut-out switch 355 and lamp 352, line 327, bar 328, by way of line 330 through contacts 315, 315' and reset coil 331, line 303, to main 5. These lamps will remain lighted until a signal reset operation causes the separation of contacts 315, 315'. The annunciator lamps for the other intermediate floors are controlled in an identical manner for both up and down operation.

It has previously been indicated that no hall buttons, stop switches or signal switches are provided at the top and bottom floors. However, push buttons may be provided at these floors for use in connection with the annunciator system. The operation of the annunciators for the bottom floor will be described, as illustrative of the principle involved. Pushing of the bottom floor annunciator button 356 completes a circuit for the closing coil 357 of the bottom floor annunciator switch. This circuit may be traced from main 4, line 298, by way of line 358 through floor annunciator switch back contacts 359, 359', coil 357, switch 360 and annunciator button 356, line 303, to main 5. The floor annunciator switch, being of the same construction as a floor signal switch, operates in a similar manner to close contacts 361, 361' and to separate contacts 359, 359'. Closure of contacts 361, 361' prepares a circuit for selector machine annunciator contact 362, rendering it "alive", and completes a circuit for the "up" bottom floor car and dispatcher annunciator lamps 363 and 364 respectively. The circuit for these lamps may be traced from line 96, by way of line 353 through the parallel circuits comprising the cut-out switch 354 and lamp 363 and the cut-out switch 355 and lamp 364, line 365, bar 366, by way of line 367 through contacts 361, 361' and reset coil 368, line 303, to main 5. Similar to the operation of the system in the case of the fourth floor annunciator lamps 351 and 352, lamps 363 and 364 will be lighted as soon as contacts 361, 361' close, regardless of the position of the signal brushes, and will remain lighted until the floor annunciator switch is reset. The reset circuit for the floor annunciator switch will be completed by the engagement of the leading "down" signal brushes 317 and 318 and the bottom floor annunciator contacts 362 and 371 respectively. This circuit may be traced from line 96, line 347, line 370, contact 371, brush 318, connection 326, brush 317, contact 362, line 365, bar 366, by way of line 367 through contacts 361, 361' and reset coil 368, line 303, to main 5. In this manner a direct current path, by-passing lamps 363 and 364, is established to reset coil 368. The reset coil 368 now operates to trip out the latch permitting contacts 361, 361' to separate, completing the reset operation. It is to be noted that the signal reset switch O is not employed for this operation as distinguished from the reset operation for the intermediate floor annunciator lamps. The operation of the annunciator system for the top floor is substantially the same as that for the bottom floor and therefore will not be described. Cut-out switches 354 and 355 are provided to open circuit the car and dispatcher annunciators when their use is not desired. In the event that the dispatcher should have his station at the bottom floor, the annunciator lamp 364 may be omitted. Further description of the operation of the annunciator system will be given along with the description of operation of a group of cars.

Referring now to the whole of Figure 33, the operation of a bank of elevators will be described. It will be understood that the power mains are common to all the elevators. The power and control circuits for the additional elevators will not be shown since they are identical with those illustrated in Figure 32 for Elevator No. 1. As has previously been set forth, the floor stop and signal switches are arranged in groups of four, each group for a distinct intermediate floor. These switches, along with their corresponding hall buttons, and the floor annunciator switches along with their push buttons, are common to all the elevators of a bank. The reset circuit for each of these switches leads from an individual bus bar. These bars have been characterized generally in accordance with a floor and circuit. For example, DS4 indicates that the bar is in the "down" fourth floor stop circuit; UL2 indicates that the bar is in the "up" second floor lamp or signal circuit; and DA10 indicates that the bar is in the "down" tenth or top floor annunciator circuit. These bars also are common to all the elevators of a bank. Each elevator has one "up" and one "down" signal lamp for each intermediate floor, a "down" signal lamp for the top floor and an "up" signal lamp for the bottom floor. Each elevator car is provided with a set of car buttons for the intermediate floors, the sets operating independently. Each car may be provided with an annunciator. The dispatcher annunciator, however, is common to all the elevators.

It is believed that unnecessary duplication will be avoided and that the invention will be sufficiently clear from the illustration of the circuits for the selector machines for two elevators. It is to be understood, however, that the operation of any number of elevators in a group is contemplated. The selector machine wiring diagram for Elevator No. 2 is substantially identical with the selector machine wiring diagram for Elevator No. 1 and will not be described in detail except as set forth in the description of operation. The designating letters employed for the various switches, such as U for the car stop switch and P for the down non-interference switch, are used for both selector machine diagrams, differentiation being had by changing the added reference numerals. The wiring diagrams for the two selector machines are arranged for Car No. 1 at rest at the fourth floor with its "director switch" in down position, as heretofore set forth, and for Car No. 2 at rest at the second floor with its "director switch" (not shown) in up position. Selector Machine No. 2 non-interference contacts will therefore be set for up operation, i. e., contacts P375, P376 and Q380 closed and contacts P377, Q378 and Q379 open, as distinguished from the corresponding contacts for Selector Machine No. 1.

Assume that the "down" third floor hall button 382 has been pushed. "Down" floor stop switch contacts 383, 383' and "down" floor signal switch contacts 384, 384' will therefore be closed. Due to the closure of contacts 383, 383', circuits are prepared for Selector Machine No. 1 "down" third floor stop contact 385 and for Selector Machine No. 2 "down" third floor stop contact 386, rendering them "alive". Due to the closure of contacts 384, 384', circuits are prepared for Selector Machine No. 1 "down" third floor signal contact 387 and Selector Machine No. 2 "down" third floor signal contact 388. Further, due to closure of contacts 384, 384', the circuits for the "down" third floor dispatcher, Car No. 1 and Car No. 2 annunciator lamps 390, 391 and 392, respectively, are completed. The circuit prepared for stop contact 385 may be traced from contact 385, line 393, bar 394 (D. S. 3), by way of line 395 through contacts 383, 383' and reset coil 396, line 303, to main 5. The circuit prepared for stop contact 386 may be traced from contact 386, line 397, bar 394, to main 5 as above traced. The circuit prepared for signal contact 387 may be traced from contact 387, line 398, bar 400 (D. L. 3), by way of line 401 through contacts 384, 384' and reset coil 402, line 303, to main 5. The circuit prepared for signal contact 388 may be traced from contact 388, line 403, bar 400, to main 5 as above traced. The circuits for lamps 390 and 391 are believed obvious from annunciator circuits previously traced. The annunciator circuit for lamp 392 may be traced from the power line (not shown) of Elevator No. 2, similar to power line 3' of Elevator No. 1, line 404, by way of line 405 through cut-out switch 406, lamp 392, line 403, bar 400, to main 5 as previously traced. The annunciator lamps 390, 391 and 392 light immediately. Signal brushes 334 and 335, being already in engagement with the "down" third floor signal contacts 387 and 407, "down" third floor signal lamp 408 for Car No. 1 also lights immediately.

Assume now that the operator for each car moves his starting switch to position II. Car No. 1 will start down and Car No. 2 will start up. Engagement of hall stop brush 270 and hall stop contact 385 will cause Car No. 1 to slow down and stop in the manner previously described. Also the "down" third floor stop switch will be reset, separating contacts 383, 383'. These circuits will not be traced as they are believed obvious from previous description. The circuit for Car No. 1 signal lamp is maintained by the engagement of signal brushes 336 and 337 with signal contacts 387 and 407 respectively. Signal lamp 408 and annunciator lamps 390, 391 and 392 will remain lighted until Car No. 1 is again started whereupon the "down" third floor signal switch will be reset in the manner previously described. As has previously been set forth, the reset of a floor signal switch not only breaks the circuit for the signal and annunciator lamps, in this example by separating contacts 384, 384', but also prepares the circuit for its own and the corresponding floor stop switch closing coil by closing its back contacts, here back contacts 409, 409'.

It will be noted that Car No. 2, while traveling up, will not respond to the call at the third floor. Engagement of Selector Machine No. 2 "down" hall stop brush 410 and "live contact" 386 will have no effect as the circuit for brush 410 is open at "up" non-interference contacts Q378. Similarly, engagement of Selector Machine No. 2 "up" signal brushes and contacts 388 and 411 will not complete a circuit for Car No. 2 third floor "down" signal lamp 412 as the circuit for this lamp is open at "up" non-interference contacts Q379. As has previously been stated Car No. 2 annunciator lamp circuit is broken by separation of floor signal switch contacts 384, 384' after Car No. 1 has completed its stop.

If Elevator No. 1 car button 653, instead of hall button 382, had been pushed, it will be seen that only Car No. 1 will respond since only Selector Machine No. 1 car stop contact 285 is rendered "alive".

Assume now that the pushing of the "down" third floor hall button 382 occurred after the cars had started and too late for Car No. 1 to respond. If no other buttons have been pushed, Car No. 2 will proceed to the top floor where it will automatically signal its approach, slow down and stop in the same manner as previously described for Car No. 1 at the bottom floor. The "director switch" for Elevator Car No. 2 will be reversed at the top floor, causing the separation of contacts P375, P376 and Q380 and the closing of contacts P377, Q378 and Q379, preparing the circuits for down car travel. Due to the fact that Selector Machine No. 2 third floor "down" hall stop contact 386 and signal contact 388 remain "alive" until floor stop switch contacts 383, 383' and floor signal switch contacts 384, 384' separate in response to reset operations, Car No. 2 will "pick up" the call on its way down. The circuit for third floor "down" lamp 412 for Elevator No. 2 will be completed upon the engagement of leading signal brushes 413 and 414 with contacts 388 and 411 respectively. This circuit may be traced from line 404, by way of line 415 through non-stop switch 416 and automatic non-stop switch contacts 447, by way of line 417 through contacts Q379, lamp 412, contact 411, brush 414, connection 418, brush 413, contact 388, line 403, to main 5 as previously traced. Car No. 2 will be slowed down and stopped at the third floor in the same manner as described for Car No. 1 at an intermediate floor, the engagement of hall stop brush 410 and contact 386 establishing an additional circuit for closing coil X420 of the automatic reset switch. This circuit may be traced from line 404, line 421, by way of line 422 through contacts V423 and U424 of the hall and car stop switches respectively, line 425, coil X420, contacts X426, line 427, by way of line 428 through non-stop switch 430, automatic non-stop switch contacts 446 and brake resistance switch contacts N431, by way of line 432 through back contacts Q378, brush 410, contact 386, line 397, to main 5 as previously traced. It is not believed that the slow-down, stop and floor stop switch reset operations need further be described in view of similar descriptions for Elevator No. 1. Similarly, it is believed that the operations of maintaining the above described lamp circuit and resetting the floor signal switch will be obvious from previous descriptions. Once the call is made, the annunciator lamps 390, 391 and 392 will remain lighted until the "down" third floor signal switch contacts 384, 384' separate, in this example, in response to the floor signal switch reset operation caused by Car No. 2. Thus it is seen that response to a call will certainly be made. In fact, the call might be "picked up" by Car No. 1 on its next down run if it reaches the third floor ahead of Car No. 2.

Assume now that both cars are running in the same direction, for example down, with Car No. 1 slightly ahead of Car No. 2, and that, before either car reaches the fourth floor, hall button 295 is pushed. Selector Machine No. 1 contacts 305 and 316 and Selector Machine No. 2 contacts 433 and 436 are thus rendered "alive". Advance signal brushes 317 and 318 of Selector Machine No. 1, upon engagement with contacts 316 and 320, complete the circuit for Elevator No. 1 "down" fourth floor signal lamp 321, the circuit being maintained by the brushes which follow in the manner previously described. Then advance signal brushes 413 and 414 of Selector Machine No. 2, upon engagement with contacts 433 and 434, complete the circuit for Elevator No. 2 "down" fourth floor signal lamp 435. The engagement of hall stop brush 270 and contact 305 of Selector Machine No. 1 will cause the reset of the "down" fourth floor stop switch, separating contacts 304, 304', and also will cause the slow-down and stop of Car No. 1 at the fourth floor. Contacts 304, 304' now being separated, "down" hall stop contact 436 of Selector Machine No. 2 is no longer "alive". Car No. 2, therefore, passes the fourth floor, the circuit to lamp 435 being broken upon the separation of the trailing signal brushes 437 and 438 and contacts 433 and 434, without effecting the reset of the "down" fourth floor signal switch. The "down" fourth floor signal switch is not reset as Car No. 2 passes the fourth floor because its resetting operation is dependent upon the closure of Elevator No. 2 signal reset switch O, the closure of which, as previously explained, is dependent upon a stop and restart of a car. The floor signal switch will be reset by the starting operation for Car No. 1. Thus with two cars running in the same direction, although the signal lamps for both cars may light, only the car first to arrive at its stopping distance from the landing at which the call was made will stop. By stopping distance is meant the distance from the car to the landing at the instant its stopping operation is initiated. It will be seen from previous description that the stopping distances for each car may vary under certain conditions.

It is preferred to have the hall stop brushes of all selector machines arranged slightly in advance of the corresponding car stop brushes. In this manner, the reset of the floor stop switches is assured even though a hall button and car button for the same floor have been pushed. Assume, for example, that Car No. 1 has started down from the top floor with its third floor car button pushed and that a prospective passenger at the third floor pushes "down" hall button 382. The engagement of hall stop brush 270 and contact 385 ahead of the engagement of car stop brush 271 and contact 285 permits the circuit to holding coil X313 of the automatic reset switch to be completed before a short circuit is established for coil U93 to effect the separation of contacts U110 and the consequent deenergization of closing coil X95. If the circuit for closing coil X95 is broken too soon, obviously the automatic reset switch cannot operate to complete the circuit for its holding coil X313. Once the circuit for coil X313 is established however, the reset operation for the "down" third floor stop switch will be effected because the circuit for this coil is not dependent on contacts U110 but leads directly from line 96 through contacts X312. Without a reset operation, the next down car reaching the third floor would make a false stop.

Figure 34:
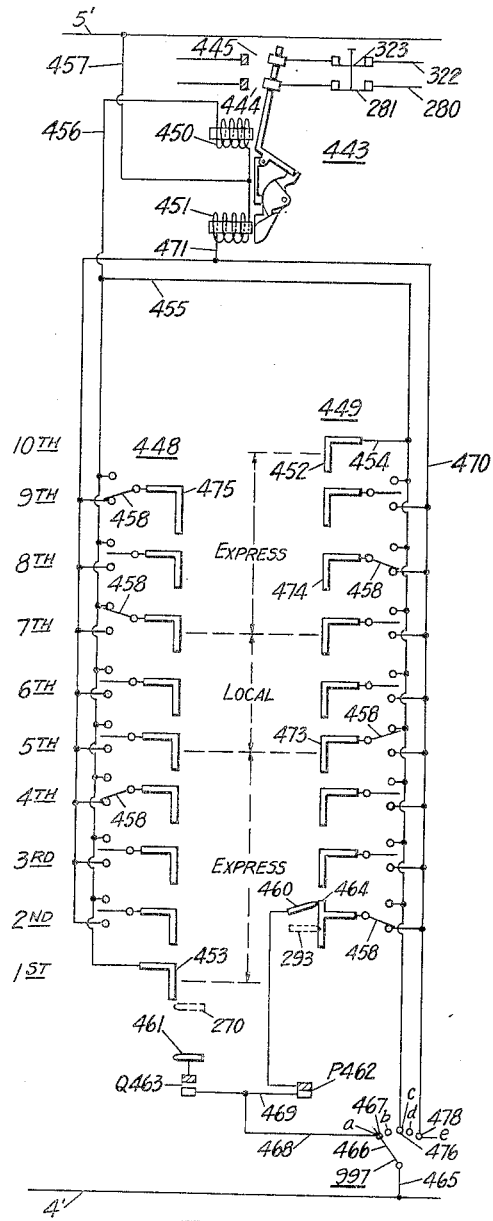
Figure 34 is a simplified diagram of the system for obtaining express and local service.

As has previously been indicated, the selector machines, for example Selector Machine No. 1, may be provided with additional stop control contacts, arranged in columns 448 and 449, and brushes 460 and 461 for effecting local and express operation. A diagram of the preferred arrangement is shown in Figure 34, separate from Figure 33, to more clearly illustrate the principles involved. According to the preferred arrangement, automatic non-stop switches 443 are employed to control the hall stop and signal circuits already described. The automatic non-stop switch contacts, 444 and 445 for Elevator No. 1 and 446 and 447 for Elevator No. 2, are illustrated in Figure 33 in order to maintain the relationship between the diagrams of the two figures.

Referring to Figure 34, the automatic non-stop switch has a closing coil 450 and a reset coil 451. Top floor "up" stop control contact 452 and bottom floor "down" stop control contact 453 are permanently connected to the closing coil 450 in order that the selector machine may operate to signal the approach of the car and stop the car at these two floors in the manner previously described. The circuit for stop control contact 452 may be traced from the contact, line 454, line 455, line 456, coil 450, line 457, to line 5'. Stop control contact 453 is shown as connected directly to line 456. A single pole, double throw switch 458 is arranged in the line from each intermediate floor stop control contact. Each switch 458 is adapted to connect its stop control contact with either closing coil 450 or reset coil 451. The stop control brushes 460 and 461 are arranged to lead the hall stop brushes 293 and 270 respectively, even with the hall stop brushes in their advanced position. Thus "up" stop control brush 460, for example, will engage a stop control contact before "up" hall stop brush 293 will engage the corresponding hall stop contact. The diagram is arranged for express service between the first and fifth floors and between the seventh and tenth floors in both directions. Thus stop contact switches 458 at the "up" second and eighth floors and "down" ninth and fourth floors are closed in circuits to reset coil 451, and stop control contact switches 458 at the "up" fifth floor and "down" seventh floor are closed in circuits to closing coil 450. All other switches 458 are in open position. Additional forward contacts P462 and Q463 may be provided on the non-interference switches P and Q, the function of which will be evident from later description.

Referring now to both Figures 34 and 33, assume that Car No. 1 is stopping at the bottom floor. As previously explained, the "director switch" will cause the non-interference switches to operate, separating contacts Q463 and closing contacts P462. With the car at rest at the bottom floor, depending on the particular installation, brush 460 may be below or in engagement with stop control contacts 464, as illustrated. With the brush and contact in engagement, the circuit for reset coil 451 will be completed and the automatic non-stop switch will operate in the same manner that a floor stop switch resets, to separate contacts 444 and contacts 445. The circuit for the reset coil may be traced from line 4', line 465, switch arm 466 and contact 467 of switch 997, line 468, line 469, contacts P462, brush 460, contact 464, switch 458, line 470, line 471, coil 451, line 457, to line 5'. So long as contacts 444 and contacts 445 are separated, the car will not respond further to hall buttons either by signalling or stopping. The parts of the system are now in the position illustrated in Figure 34. Thus, even though "up" second floor hall button 472 is pushed, the car will not respond in its upward movement because the circuit for brush 293 is broken at contacts 444 before contacts N181 are closed in the next starting operation.

Assume now that the car has started in the up direction and that its third floor car button 653 and the "up" fourth and fifth floor hall buttons have been pushed. The "up" fourth and fifth floor stop and signal switches, therefore, will be closed. The car will respond to car buttons and will stop at the third floor, due to the engagement of "up" car stop brush 292 and contact 285, unaffected by the position of the automatic non-stop switch contacts 444 and 445. The car will not stop nor will its approach be signalled at the fourth floor because the circuit to the "up" hall stop brush 293 is open at contacts 444 and the circuit to the signal lamps is open at contacts 445. The fourth floor call will be "picked up", however, by the first up car that reaches the fourth floor running local in that zone. Before Car No. 1 reaches the fifth floor, stop control brush 460 engages contact 473 to complete the circuit to closing coil 450. This circuit may be traced from line 4', to brush 460 as above traced, contact 473, switch 458, line 455, line 456, coil 450, line 457, to line 5'. The automatic non-stop switch will now operate to close contacts 444 and contacts 445. Thus the circuit for the "up" fifth floor signal lamp is completed and the slow-down and stop circuit is prepared. Upon engagement of the "up" hall stop brush 293 and the fifth floor hall stop contact, the car will slow down and stop in the manner previously described. So long as contacts 444 and contacts 445 remain closed, there will be response to hall buttons. Thus, if either the sixth or seventh floor "up" hall buttons are pushed, the car will signal and stop at the corresponding floor. Engagement of stop control brush 460 and contact 474 at the eighth floor will cause the separation of contacts 444 and contacts 445 to prevent further response to the hall buttons until contacts 444 and contacts 445 are again closed. Engagement of the stop control brush 460 and contact 452 at the top floor will cause the closure of contacts 444 and contacts 445 again, permitting the selector machine to complete the signal and car stop circuits. Due to the fact that the "director switch" will now be changed to its down position, contacts Q463 will be closed and contacts P462 will be open. It is believed the operation of the selector machine for down car travel will be understood from the above description.

It will be evident that the car may be made express or local for any floor, up or down. For example, by closing switch 458 for the "up" second floor stop control contact on line 470 and the switch 458 for the "down" ninth floor stop control contact 475 on line 456, with the other switches 458 open, the car will run express in the up direction and local in the down direction for all floors.

If it is desired to run local for all floors, both up and down, switch arm 466 is moved into engagement with contact 476 to complete the circuit for closing coil 450, causing the closure of contacts 444 and contacts 445. Due to the fact that these automatic non-stop switch contacts are latched closed, switch arm 466 may then be moved to an off position. Similarly, if it is desired to run express all the way up and all the way down, switch arm 466 is moved into engagement with contact 478, to complete the circuit for reset coil 451, causing the separation of contacts 444 and contacts 445. As before, the switch arm 466 may then be moved to an off position. It will be understood that all the elevators may be arranged for express service operation and that the connections at each selector machine may be varied so that the express zones for each elevator may be different.

As has previously been indicated, the circuits for the floor stop and signal switch closing coils at each floor may be provided with a cut-out switch, for example, switch 302 for the "down" fourth floor coils. These switches are opened whenever it is desired to run all the cars express past the corresponding floors. Thus to run all "down" cars express past the fourth floor, switch 302 is opened, so that the pushing of hall button 295 does not complete the circuit for coils 296 and 301 and contacts 304, 304' and 315, 315' will not be closed. None of the cars, therefore, will respond to this call. It will be observed, however, that the car button circuits for each elevator are not affected by the opening of these cut-out switches.

A floor may be made a regular stop in both directions for any car by connecting the hall stop contacts and the outer signal contacts for that floor directly to line. For example, if it is desired to have Car. No. 1 stop regularly in both directions at the third floor, hall stop contacts 385 and 480 and signal contacts 387 and 481 will be connected directly to line 5' by way of line 105, as is done with the bottom and top floor hall stop and signal contacts. Car stop contact 285 also may be so connected. If it is desired to have Car No. 1 stop at the third floor regularly only when traveling down, only contacts 385 and 387 will be connected directly to line 5'. Obviously, when a hall stop and signal contact are connected directly to line, the corresponding circuits to the bus bars are omitted. It will be understood that these connections for the various selector machines may be varied to suit the requirements of the particular installation.

It will be obvious from the above description that, where several elevators are installed in a group, connections may be made whereby any car may be caused to run express or local for any desired zone in either direction and other connections may be made whereby any car may be caused to stop regularly at any desired floor in either direction.

It has been previously indicated also that the selector machines may be provided with further contacts and brushes for effecting operation of the car position indicator. In Figure 33, Selector Machine No. 1 car position indicator brush 483 and fourth floor position indicator contact 484 are shown in engagement, completing a circuit for Car No. 1 position indicator lamp 485. This circuit may be traced from line 96, line 353, by way of line 486 through indicator cut-out switch 487, by way of line 488 through lamp 485, contact 484, brush 483, line 490, line 491, line 277, line 105, to line 5'. Lamp 485 being lighted indicates that Car. No. 1 is at the fourth floor. As the car moves up and down, the indicator lamp corresponding to the position of the car will be lighted due to the engagement of brush 483 with the corresponding contact. Selector Machine No. 2, car position indicator brush 492 and second floor contact 493 are shown in engagement, completing a circuit for Car No. 2 position indicator lamp 494. This circuit may be traced from line 404, line 405, by way of line 495 through indicator cut-out switch 496, by way of line 497 through lamp 494, contact 493, brush 492, lines 498, 499 and 500, to line 501. Line 501 corresponds to line 105 for Elevator No. 1. The indicator lamps for Elevator No. 2 will light similarly to those for Elevator No. 1 depending on the position of the car. The indicator lamps for each elevator may be arranged in a column and the columns suitably arranged on the dispatcher panel. As was the case with the dispatcher annunciator, in the event that the dispatcher should have his station on the bottom floor, the bottom floor position indicator lamps for all the elevators of a group might be omitted.

A dispatcher signal circuit may be provided for each elevator, that for Elevator No. 1 leading from line 105, by way of line 502, through dispatcher signal switch 503, resistance 504 and bell 505, to line 96. A similar circuit is illustrated for Elevator No. 2 and may be provided for all elevators. The bells or other signals are located in the respective cars while the dispatcher signal switches are located on the dispatcher panel, as illustrated in Figure 1.

Thus where a group of elevators are operating, the dispatcher can determine the position of the cars from the car position indicator lamps. When a car reaches the top floor, the dispatcher, at the time he desires the car to start down, may give a prearranged signal by closing the corresponding dispatcher signal switch. If a car gets too far ahead in its relation to other cars during a run, the dispatcher may give another signal for the operator of that car to slow down. The operator of the car so signalled will open the slow speed switch, for example slow speed switch 122 for Car No. 1, in the circuit of the operating coils for the second and third accelerating switches, causing the car to slow down. The car will now run at half speed until further signal is given. In this manner, the cars of a group may be maintained on a schedule. Further, as the dispatcher has full knowledge of all the calls from his annunciator, he may signal the operator of one of the cars to reverse at an intermediate floor and to go back and pick up a call.

Assume now that Car No. 1 is fully loaded and that its operator desires to run past the remaining floors to a terminal landing or past some of the floors until room is again provided in the car due to discharge of passengers. He may do so by pressing down on the non-stop switch operating lever 614, opening switches 281 and 323. Obviously, in view of the description of operation when contacts 444 and contacts 445 of the automatic non-stop switch were separated, switches 281 and 323 opening the same circuits as contacts 444 and 445 respectively, Car No. 1 will not respond further by signal or stop to any of the hall buttons pushed until switches 281 and 323 are again closed. The non-stop switches, however, do not change the operation of the car in response to the car buttons. Thus stops are made in the previously described manner for the discharge of passengers. Further, as only the circuits for the hall stop brushes 270 and 293 and Elevator No. 1 signal lamps are broken by the opening of switches 281 and 323, the next car running in that direction will "pick up" the hall button calls. If conditions demand it, however, the dispatcher may by-pass the non-stop switches 281 and 323 by closing the non-stop cut-out switches 506 and 507 provided on his panel. In this manner unwarranted use of the non-stop switches is prevented. The non-stop switches are further useful in maintaining the cars on schedule. For example, the dispatcher, noting from his car position indicator that Car No. 1 is behind in its schedule and noting from his annunciator that there are several calls ahead of the car, may give another prearranged signal for its operator to run with the non-stop switch open until further signal is given. The non-stop operation for the other elevators is the same as that for Elevator No. 1 and will not be described.

Ordinarily, in the event of extra floors, only one elevator is arranged to make the runs due to the fact that such floors are seldom used. Elevator No. 1 has been so illustrated for convenience of description, but it will be understood that other elevators of a group may be so arranged if desired. As Car No. 1 arrives at the top floor, the "director switch" will be moved into down position as previously indicated. In order for the car to run to the extra top floor, the operator moves the "director switch", by means of handwheel 688 in the car, back into an up position. As previously indicated, according to the preferred arrangement the "director switch" cannot be moved all the way into full speed up position but is stopped, due to the contour of the hatchway cam, with its segment 70 short of engagement with contact 508. Thus, when the operator moves the car switch to position II, the car will proceed at half speed to the extra floor landing. There the car will be stopped in the manner previously described, the selector machine being provided with car stop contact 509, hall stop contact 510 and extra floor stopping collar 848 for this purpose. Contacts 509 and 510 are permanently "alive", being connected to line 5' by way of line 511, line 491, line 277 and line 105. The "director switch" will be moved again into down position, where, as previously explained, it cannot now be moved back into up position by hand. The car will stop automatically at the top floor as it travels down due to engagement of "down" car stop brush 271 and contact 512, contact 512 being permanently "alive" due to its connection to line 5' by way of line 513, line 491, line 277 and line 105. An additional stopping collar 850 is arranged on the selector machine to initiate the final slow-down and stop operations at this floor. Contacts 514 and 515 and extra floor stopping collar 849 are provided for stopping the car at the extreme bottom floor. Any suitable signalling arrangement may be provided for calling the car to these floors, for example push button annunciator arrangement such as described and illustrated for the top and bottom floors.

The operator may control the car by means of the handwheel 688 and starting switch for intermediate floor runs. For example, if the car is at the fifth floor with the "director switch" in the down position and it is desired to operate the car in the up direction, the operator may move the "director switch" to up position by means of the handwheel and then start the car in the usual manner. The car may now be stopped by operating the handwheel to move the "director switch" to "neutral" position. Direction switch holding coils C146 and B177 are particularly useful in guarding against the effect of sudden movements of the "director switch" to "neutral" position while the main motor is running. Thus for example, even though the circuit for closing coil C62 is broken by segment 70 during such a movement, direction switch C is held in by coil C146 until the circuit for this coil is broken by the separation of contacts D197 of the first accelerating switch. Retarding resistances 516 and 517 are arranged in parallel with coils C146 and B177 respectively to insure a sequence of operation between the first accelerating switch and the direction switches. Holding coil N198 controls brake resistance switch N in a similar manner under such operating conditions. If a car is run entirely on the handwheel and starting switch, the car annunciator is particularly useful since the operator, by observing the annunciator lights, may direct the car to the floors called without runs to the terminal floors.

Auxiliary motor switches 518 and 519 are provided for use under unusual or emergency conditions. Switch 518 in closed position by-passing leveling switch contacts 226, 226' and 227, 227' to complete circuits for auxiliary "down" direction switch coil H230 and auxiliary speed switch coil K231 respectively. Switch 519 in closed position similarly by-passes leveling switch contacts 520, 520' and 521, 521' to complete circuits for auxiliary "up" direction switch coil G260 and coil K231 respectively. The by-pass circuit for coil H230 may be traced from line 1', line 68, switch 33b, line 81, coil J228, by way of line 232 through back contacts G233 and coil H230, line 236, line 522, switch 518, by way of line 523 through auxiliary gate contacts 524, line 187, to line 5' as previously traced. The by-pass circuit for coil K231 through switch 518 may be traced from line 81, line 82, by way of line 234 through coil K231, line 235, line 525, switch 518, to line 5' as above traced. The by-pass circuits for coils G260 and K231 through switch 519 are similar to those through switch 518 and will not be traced. Thus if the main motor becomes inoperative or the car is carrying a heavy load, such as a safe, operation may be had on the auxiliary motor by closing switch 518 or 519, depending on the direction desired. Further, these switches may be employed to bring the car to the floor called in the event that a stop is made outside a leveling zone.

In case of an extreme emergency, such as a fire, when the gate and doors cannot be closed, operation may be had by breaking glass plate 616 in the car operating box and closing emergency cut-out switch 526 to by-pass gate contacts 136, door contacts 137 and door contact sequence relay contacts S144. Contacts S144 are by-passed because, with the gate and door contacts open upon the bridging of starting switch contacts 138 in the starting operation, the door contact sequence relay S will operate. As has previously been explained, operation of the door contact sequence relay will separate contacts S144, preventing the starting of the car under normal operating conditions. Thus if the gate or a door cannot be closed, the operator breaks the glass plate 616, closes emergency cut-out switch 526, permitting the starting of the car. Both coils S140 and S142 of the door contact sequence relay will now be energized, permitting contacts S129 to close so that the car will accelerate in the normal manner.

Safety switch 44 is provided for stopping the car in case of an emergency. Opening this switch breaks the circuit for coil A41, permitting the main potential switch A to drop out. Thus contacts A49, A50 and A52 separate to break the main motor armature circuit and to cause the application of the brake and contacts A47 and A48 close in sequence to connect electro-dynamic brake resistances 17 and 18 across the armature, stopping the motor. Opening of any of the "safety switches" included in line 45 or of contacts Y46 of the fuse protective relay will effect the stopping of the car in the same manner.

Figure 35:
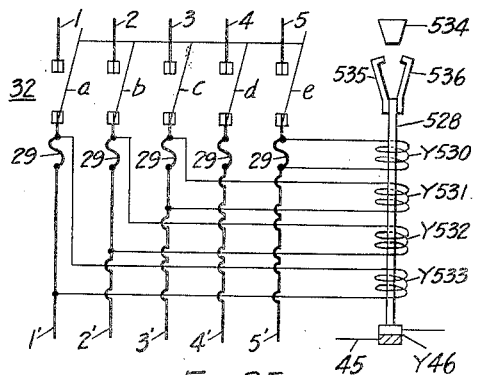
Figure 35 is a diagrammatic representation of the fuse protective relay and its circuit connections.

The preferred form of fuse protective relay, illustrated in Figure 35, comprises an operating plunger 528 provided with four operating coils Y530, Y531, Y532 and Y533, each connected across a main line fuse 29 and each capable, when energized, of effecting the operation of the relay. So long as the main line fuses are intact, the operating coils are not energized. If any of the fuses in lines 1', 2', 3' or 5' should fail, however, the corresponding operating coil will be immediately energized to effect the separation of contacts Y46. No coil is provided across fuse 29 in line 4' as steady operation on line 4' cannot be had, that is, line 4' serves merely as a voltage step in acceleration or retardation. A wedge shaped stationary catch 534 is mounted on the control panel. Plunger 528 is provided with spring members 535 and 536 for engaging catch 534 to latch the relay in open position. With the reclosure of contacts Y46 prevented in this manner, the trouble will be overcome and a new fuse inserted before the latch is released. Thus any danger, due to a failure of a main line fuse, such as loss of control or damage to the motor, is avoided. It is to be understood that the coils Y530, Y531, Y532 and Y533 may be arranged to operate separate relays, the contacts of which would all be included in line 45.

Figures 36, 37:
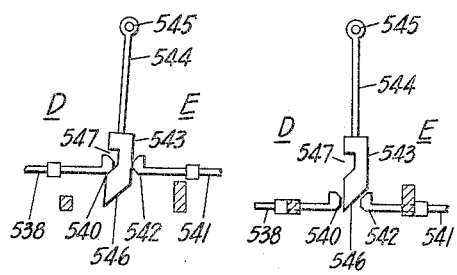
Figure 36 is a fragmental detail of a mechanical interlock for the accelerating switches of Figure 31, the switches being in open position.
Figure 37 is a similar view but with the switches in closed position.

Mechanical interlocks, referred to in the description of operation, suitable for the proposed main accelerating switches are illustrated in Figures 36 and 37. No attempt is made in these figures to illustrate more than the interlock mechanism as the accelerating switches and their interlocks are fully shown in Figure 31. Referring to Figure 36 wherein the switches are illustrated in open position, switch arm 538 of switch D is provided with a lug 540, while switch arm 541 of switch E is provided with lug 542, both lugs being arranged for engagement with the interlock cam 543. The cam 543 is secured in any suitable manner, such as by a pin (not shown), to a rod 544. This rod is pivotally mounted by a pin 545 on the switch panel. The cam is provided with an oblique surface 546 adjacent to lug 542 and a slot 547 on the side adjacent to lug 540. Thus switch D must operate before switch E, as when both switches are open, lug 540 is interposed in the path of the deflection of cam 543 preventing it from moving to permit switch E to close. After switch D has closed, switch E can close, lug 543 striking against surface 546 of cam 543, pushing the cam toward switch D so that lug 540 enters slot 547, as shown in Figure 37. When both switches are closed, switch E must open first, as lug 540 is held in slot 547 so long as lug 542 is against the side of the cam. Switch D is thus prevented from opening until after switch E opens. The structure and operation of the interlock between switches E and F is exactly the same and will not be described.

Figure 38:
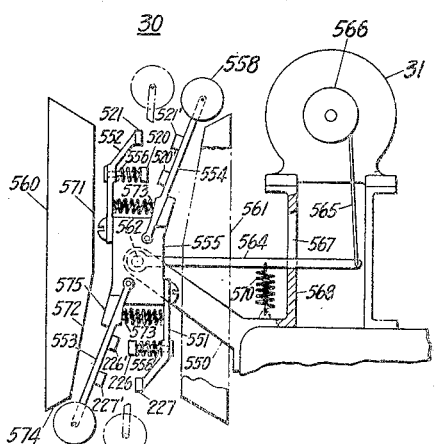
Figure 38 is a simplified representation of a leveling switch and its operating mechanism.

Figure 38 is a simplified representation of a form of leveling switch suitable for operation in the system. This switch, designated as a whole by the numeral 30, is pivotally mounted on a bracket 550 extending from a top corner of the elevator car. The switch comprises a pair of stationary contact arms 551 and 552 and a pair of cooperating movable contact arms 553 and 554. The stationary contact arms 551 and 552 extend oppositely from a frame member 555, being secured to the sides thereof as by means of screws. The movable contact arms 553 and 554 also extend oppositely from frame member 555, being pivotally mounted thereon as by means of pins. The stationary arm 551 is provided with a fixed contact 227 in the circuit for the auxiliary speed switch coil K231 and a movable contact 226 in the circuit for auxiliary "down" direction switch oil H230. Stationary arm 552 is similarly provided with contacts 521 and 520 for coil K231 and auxiliary "up" direction switch coil G260 respectively. Movable arm 553 is provided with fixed contacts 227' and 226' for engagement with contacts 227 and 226 and movable arm 554 is provided with fixed contacts 521' and 520' for engagement with contacts 521 and 520. Movable contacts 226 and 520 are extended toward contacts 226' and 520', respectively, by means of springs 556 in order that, for example, contacts 226 and 226' will separate after the separation of contacts 227 and 227'.

It is to be understood that suitable insulation is provided for all the contacts so that distinct circuits will be completed by their engagement. Operating rollers 557 and 558, mounted on the ends of movable arms 553 and 554, respectively, co-act with leveling cams 560 and 561, mounted in the hatchway at the various floors, to effect the operation of the leveling switch. It is to be understood that only the rollers are in the direct path of the cams. Frame member 555 is secured to an operating shaft 562 in any suitable manner. This shaft extends through a bearing in bracket 550 to form the pivot for the leveling switch. Secured to the extended portion of the shaft 562 is a lever 564. The lever is operated by leveling switch motor 31, being connected thereto by means of a tape 565 wound on the motor operated drum 566. Stops, for limiting the movement of the lever 564, are formed by the extremities of a slot 567 in motor support 568. Spring 570 forms a bias, normally tending to maintain the lever 564 in the position shown, i. e., the position in which the leveling switch is operative.

In operation, upon energizing the motor 31, lever 564 will be operated to move the leveling switch about its pivot until stopped by the top of slot 567, springs 573 acting to maintain the contacts separated. Rollers 557 and 558 will now be out of the path of the cams, as indicated by dotted lines, rendering the leveling switch inoperative. The switch remains in this position, as the car runs past the various floors, until motor 31 is deenergized during a stopping operation. Assume that the car is traveling in the down direction and that a stop is to be made. Upon deenergization of motor 31, spring 570 operates lever 564 to return the leveling switch to the position with the rollers in the path of the cams. This operation will normally occur in the leveling zone so that, for example, roller 557 will engage the vertical surface 571 of cam 560. In this position, both contacts 226 and 226' and contacts 227 and 227' will be closed, spring 556 for contact 226 being compressed. As the roller moves onto the oblique surface 572 of cam 560, spring 573 will force movable arm 553 away from stationary arm 551, separating contacts 227 and 227'. Contacts 226 and 226', however, are maintained in engagement by spring 556. As has heretofore been explained, contacts 227 and 227' being in the circuit for closing coil K231 of the auxiliary speed switch, the auxiliary motor will be slowed down. As the roller 557 moves farther down oblique surface 572 and onto surface 574 of the cam 560, spring 573 forces arm 553 farther away from contact 551 causing the separation of contacts 226 and 226' to effect the stopping of the auxiliary motor in the manner previously explained. Movable arm 553 will be held against further movement by a stop 575 arranged on frame member 555. It is believed that the operation of the leveling switch with the elevator car moving in the up direction or in case of an overrun will be obvious from the above description.

In accordance with the provisions of the patent statutes, the principle of operation of the invention, together with the apparatus now considered to represent the best embodiment thereof, have been described; but it is desired to have it understood that the apparatus shown is only illustrative, and that the invention can be carried out by other means.

What is claimed is:—

1. A control system for a plurality of elevator cars comprising means for stopping any car at a predetermined point, said means comprising controlling means common to all the cars.

2. A control system for a plurality of elevator cars comprising, means for stopping each car, and controlling means common to all the cars for causing the operation of the stopping means for the car first to arrive at its stopping distance from a landing.

3. A control system for a plurality of elevator cars comprising means for stopping any car at any one of a plurality of predetermined points, said means comprising controlling means common to all the cars.

4. A control system for a plurality of elevator cars comprising means for stopping any car at any one of a plurality of predetermined points from a given direction, said means comprising controlling means common to all the cars.

5. A control system for a plurality of elevator cars comprising, means for stopping each car at a landing, and controlling means common to all the cars for causing the operation of the stopping means for only one of the cars approaching the landing from a given direction.

6. A control system for a plurality of elevator cars comprising, means for stopping each car at a landing, and controlling means common to all the cars for causing the operation of the stopping means for any car approaching the landing.

7. A control system for a plurality of elevator cars comprising, means for stopping each car at a plurality of predetermined points, and controlling means common to all the cars for causing the operation of the stopping means to stop any car at any one of said points.

8. A control system for a plurality of elevator cars comprising, means for stopping any car at a predetermined point, and a single switch for controlling said means.

9. A control system for a plurality of elevator cars comprising means for stopping any car at any one of a plurality of landings, said means comprising only one switch for each landing.

10. An elevator system comprising, a plurality of elevator cars, a landing, a stop control switch for said landing, and stopping mechanism for each of said cars, each of said mechanisms being adapted to stop the car for which it is provided at said landing in response to said switch.

11. An elevator system comprising, a plurality of elevator cars, a landing, a stop control switch for said landing, stopping mechanism for each of said cars, each of said mechanisms being adapted to stop the car for which it is provided at said landing in response to said switch, and means dependent upon the relative positions of the respective cars for determining which of the cars shall respond to an operation of said switch.

12. A control system for a plurality of elevator cars comprising, a stop control for each of a plurality of landings, and car actuating and stopping mechanism for each car, each of said mechanisms being responsive to said stop controls to stop its car at the landings corresponding to the stop controls operated.

13. A control system for a plurality of elevator cars comprising means for stopping any car from either direction at a predetermined point, said means comprising controlling means common to all the cars.

14. A control system for a plurality of elevator cars comprising, stopping mechanism for each of said cars, and a control switch common to all the cars operable to cause the operation of any one of said mechanisms to stop the car for which such mechanism is provided.

15. An elevator system comprising, a plurality of elevator cars, a landing, a manually operable stop control for said landing, and mechanism responsive to an operation of said stop control to stop any one of said cars at said landing.

16. An elevator system comprising, a plurality of elevator cars, a landing, a manually operable stop control for said landing, and mechanism responsive to an operation of said stop control to stop any one of said cars at said landing, said one car being the car first to near said landing from a given direction.

17. An elevator system comprising, a plurality of elevator cars, a landing, stopping mechanism for each of said cars, a manually operable stop control switch common to all of said cars and located at said landing, and means responsive to the operation of said switch for causing the operation of the stopping mechanism for but one of the cars to stop said car at said landing.

18. An elevator system comprising, a plurality of elevator cars, a landing, a stop control for said landing, mechanism for stopping each of said cars at said landing, and means responsive to the operation of said stop control for causing the operation of the stopping mechanism for any one of said cars to stop said one car at said landing.

19. An elevator system comprising, a plurality of elevator cars, a landing, mechanism for stopping each of said cars at said landing, and a control switch for said landing for causing the operation of the stopping mechanism for any one of said cars to stop said car at said landing.

20. An elevator system comprising, a plurality of elevator cars, a landing, and a stop control for said landing for causing upon operation the stopping of any one of said cars at said landing.

21. An elevator system comprising, a plurality of elevator cars, a landing, and a stop control for said landing for causing upon operation the stopping of the car first to arrive at its stopping distance from said landing from a given direction.

22. A control system for a plurality of elevator cars comprising, slow-down mechanism for each of said cars, and a switch common to all of said cars operable to cause the operation of any one of said mechanisms to initiate the slowing down of the car for which such mechanism is provided.

23. A control system for a plurality of elevator cars comprising, slow-down mechanism for each of said cars, a control switch common to all of said cars operable to cause the operation of any one of said mechanisms to initiate the slowing down of the car for which such mechanism is provided, and means for thereafter bringing said car to a stop.

24. A control system for a plurality of elevator cars comprising, slow-down mechanism for each of said cars, a control switch common to all of said cars and located at a landing, said control switch being manually operable to cause the operation of any one of said slow-down mechanisms to initiate the slowing down of the car for which such mechanism is provided upon the arrival of said car within a predetermined distance from said landing, and means for thereafter stopping said car upon its arrival at said landing.

25. An elevator system comprising, a plurality of elevator cars, slow-down mechanism for each of said cars, a landing, a control switch common to all of said cars and located at said landing, and means responsive to the operation of said control switch for causing the operation of the slow-down mechanism for but one of said cars to initiate the slowing down of said car as it nears said landing.

26. An elevator system comprising, a group of elevators arranged in a bank, a control switch at a landing operable by an intending passenger to cause the stopping of any one of the elevator cars of the group at said landing, and means for selecting which one of said cars is to be stopped in response to an operation of said control switch.

27. An elevator system comprising, a group of elevators arranged in a bank, a control switch at a landing operable by an intending passenger, stopping mechanism for bringing any one of the elevator cars of the group to a stop at said landing in response to the operation of said control switch, and selectors for the respective cars actuated in accordance with car movement for selecting the car to be stopped in response to a given operation of said control switch.

28. An elevator system comprising, a group of elevators arranged in a bank, a control switch at a landing operable by an intending passenger, stopping mechanism for bringing any one of the elevator cars of the group to a stop at said landing in response to the operation of said control switch, selectors for the respective cars actuated in accordance with car movement for selecting the car to be stopped in response to a given operation of said control switch, and means operable, upon the car which is to be stopped having been selected, to prevent the stopping of other cars of said group at said landing in response to said given operation of said control switch.

29. An elevator system comprising, a plurality of elevator cars, a plurality of landings, and stop controls for the landings common to all of said cars for causing the stopping of a car at each landing for which a stop control has been operated.

30. An elevator system comprising, a plurality of elevator cars, a plurality of landings, stopping mechanism for each of said cars, a plurality of stop controls common to all of said cars, one for each of said landings, and means responsive to said stop controls for causing the operation of any one of said stopping mechanisms to stop the car for which such mechanism is provided at the landings for which stop controls have been operated, the car which is stopped at each landing being that car first to arrive from a given direction at its stopping distance therefrom.

31. An elevator system comprising, a plurality of elevator cars, a plurality of landings, a plurality of control switches, one at each of the respective landings, operable by intending passengers, a plurality of stopping mechanisms, one for each car, for causing the stopping of their respective cars at the respective landings, and a plurality of selectors, one for each of said cars, for causing but one of the cars to be stopped at each of the respective landings at which a control switch has been operated.

32. An elevator system comprising, a plurality of elevator cars, a plurality of landings, a plurality of control switches, one at each of the respective landings, operable by intending passengers, a plurality of stopping mechanisms, one for each car, for causing the stopping of their respective cars at the respective landings, and a plurality of selectors, one for each of said cars, for causing but one of the cars to be stopped at each of the respective landings at which a control switch has been operated, the car which is to be stopped being selected by said selectors.

33. A control system for a plurality of elevator cars comprising, means for stopping each car at a landing, a switch for causing the operation of the stopping means for the cars approaching the landing from one direction, and another switch for causing the operation of the stopping means for the cars approaching the landing from the other direction.

34. A control system for a plurality of elevator cars comprising, means for stopping each car at any one of a plurality of landings, a switch for each landing to cause the operation of the stopping means for any car approaching in one direction the landings corresponding to the switches operated, and another switch for each landing to cause the operation of the stopping means for any car approaching in the other direction the landings corresponding to the latter switches operated.

35. A control system for a plurality of elevator cars comprising, means for stopping each car from either direction at a landing, and means common to all the cars for causing the operation of stopping means for only those cars approaching the landing from one direction.

36. A control system for a plurality of elevator cars comprising, means for stopping each car from either direction at a landing, controlling means common to all the cars operable to cause the operation of the stopping means for cars approaching the landing from one direction, and means for preventing the operation of the stopping means in response to the operation of the common controlling means for cars approaching the landing from the other direction.

37. A control system for a plurality of elevator cars comprising, means for stopping each car at a landing regardless of its direction of travel, a switch operable to cause the operation of the stopping means for cars approaching the landing from one direction, another switch operable to cause the operation of the stopping means for cars approaching the landing from the other direction, and means for preventing the operation of the stopping means in response to the first named switch for cars traveling in the second named direction and in response to the second named switch for cars traveling in the first named direction.

38. A control system for a plurality of elevator cars comprising, means for stopping each car at any one of a plurality of landings regardless of the direction of travel of the car, a switch for each landing operable to cause the operation of the stopping means for any car approaching in one direction the landings corresponding to the switches operated, and means for preventing the operation of the stopping means in response to the operation of the switches for cars approaching the landings from the other direction.

39. A control system for a plurality of elevator cars comprising, means for stopping the cars at a landing, said means comprising controlling means common to all the cars, and means for preventing the operation of the first included means to stop the other cars, upon the initiation of the operation of said first included means to stop one of the cars, until after said car has stopped.

40. A control system for a plurality of elevator cars comprising, means for stopping each car at a landing, means for causing the operation of the stopping means for but one of the cars approaching the landing, and means for preventing the operation of said stopping means for the other cars until after the first named car has stopped at the landing.

41. A control system for a plurality of elevator cars comprising, controlling means common to all the cars, means responsive to the operation of the common controlling means for stopping one of the cars at a landing, and means for preventing the stopping of the other cars at said landing in response to the operation of the common controlling means until after the first named car has stopped at said landing.

42. A control system for a plurality of elevator cars comprising, means for stopping each car at any one of a plurality of landings, a switch for each of said landings to cause the operation of said means to stop the cars at the landings corresponding to the switches operated, and means for preventing the stopping of the other cars at any one of the landings in response to said switch for such landing, upon said initiation of the operation of the stopping means for one of the cars to stop said car at said one landing, until after said car has been stopped.

43. A control system for a plurality of elevator cars comprising, means for stopping the cars at a landing, a switch common to all the cars for causing the operation of the stopping means, and means responsive to said switch for preventing the stopping of more than one car in response to said switch once the stopping of said one car has been initiated.

44. An elevator control system comprising, a plurality of elevator cars, a landing, a car stop control actuatable by an intending passenger at said landing, means for stopping any of said cars at said landing in response to the actuation of said car stop control, and means for preventing the stopping of any of the remaining cars in response to an actuation of said car stop control to which a car has already responded.

45. An elevator system comprising, a plurality of elevator cars, a landing, a stop control switch for said landing, stopping mechanism for each of said cars, each mechanism being adapted to stop the car for which it is provided at said landing in response to said switch, and means rendered effective upon the initiation of the stopping of any one of said cars at said landing by its stopping mechanism in response to said switch for preventing the operation of the stopping mechanisms for the other cars to stop their respective cars at that landing in response to said switch until after said one car has stopped at said landing.

46. An elevator system comprising, a plurality of elevator cars, a plurality of floors, a stop control switch for each of said floors, stopping mechanism for each of said cars, each mechanism being adapted to stop the car for which it is provided at each of said floors in response to said stop control switch for that floor, and means rendered effective upon the initiation of the stopping of any one of said cars at any one of said floors in response to the operation of said stop control switch for that floor for preventing the stopping of any of the other cars at such floor in response to such switch until after said one car has fully completed its stay at such floor.

47. In a control system for elevators, motive power means for each elevator, means for controlling the motive power means of each elevator from within the elevator to cause automatic stopping at any desired number of floors, said means comprising a series of switches in the car, one for each floor, stop-controlling mechanism operated by said switches, and means operable from any floor and cooperating with said first-named controlling means to control the motive power means of all the elevators traveling in one direction to cause the nearest of said elevators to stop at said floor.

48. In a control system for a bank of elevators, each provided with means for stopping at a landing, means operable from said landing for controlling the stopping means of all the elevators traveling in one direction to cause the nearest of said elevators to stop at said landing, said controlling means further comprising selector mechanism to prevent the stopping of another of said elevators at said landing.

49. In a control system for elevators, motive power means for each elevator comprising individual motors and means for controlling the same to stop the associated elevator level with a landing, means operable from said landing to actuate the controlling means of the nearest elevator traveling in one direction, and similar means operable from the said landing to actuate the controlling means of the nearest elevator traveling in the other direction.

50. Apparatus as in claim 49 wherein each of said landing operated means comprises selector mechanism to prevent the actuation of the controlling means of the other elevators.

51. In a control system for a bank of elevators, each provided with means for stopping at a landing, means operable from said landing for controlling the stopping means of all the elevators traveling in one direction to cause the nearest of said elevators to stop at said landing.

52. In an elevator system, the combination with a plurality of cars, of means for initiating the up and down motions of each car, means for stopping at any floor in response to a call, and means for cancelling any call and transferring said call to other cars.

53. In an elevator system, the combination with a plurality of cars, of means for initiating the up and down motion of each car, means for stopping at any floor in response to a call, means for cancelling any call and transferring said call to the other cars, and means for preventing the other cars moving in the same direction from stopping at said floor in response to the same call.

54. In an elevator system, the combination with a plurality of cars, of means for initiating the up and down motion of each car, means for stopping at any floor in response to a call, means for cancelling any call and transferring said call to other cars, and means for preventing interference between up and down calls.

55. In an elevator system, the combination with a car and means for initiating up and down motions thereof, of means for stopping at any floor in response to a push-button operation, and means comprising a floor selector device and floor relays controlled thereby for automatically continuing the car movement in the same direction.

56. A control system for a plurality of elevator cars comprising, means for stopping each car, and common controlling means for causing the operation of the stopping means for the car first to arrive at its stopping distance from a landing.

57. In a control system for a plurality of elevators operable past a floor, means individual to each elevator for starting said elevator, and means common to all of said elevators for stopping the first of said elevators to arrive at said floor.

58. In an elevator control system, a plurality of elevators operable past a floor, means for moving said elevators past said floors, up-call means and down-call means at said floor common to all of said elevators for stopping the first of said elevators to arrive at said floor traveling in the corresponding direction.

59. In an elevator control system, a plurality of elevators operable past a floor, means for moving said elevators past said floors, up-call means and down-call means at said floor common to all of said elevators for stopping the first of said elevators to arrive at said floor traveling in the corresponding direction and means operable only when one of said elevators stops at a floor for rendering the call means for said floor ineffective to stop others of said elevators subsequently arriving at said floor.

60. In a control system for a plurality of elevators operable past a floor, means for moving said elevators past said floor, means common to all of said elevators for stopping the first of said elevators to arrive at said floor traveling in one direction, and means on each of said elevators for stopping said elevator at said floor when traveling in either direction.

61. In an intercepting control system, the combination with a bank of cars, hoisting motor mechanism for said cars, motor controlling means for each car, and means comprising one "up" and one "down" hall-button at each intermediate landing served, to control said motor controlling means of all the cars which form the bank.

62. In an intercepting control system, the combination with a bank of cars, hoisting motor mechanism for said cars, motor controlling means for each car, and means comprising one "up" and one "down" hall-button at each intermediate landing served, to control said motor controlling means of all the cars which form the bank to control car stops only, and a single circuit controller in each car to effect car starts.

63. In an intercepting control system, the combination with a bank of cars, hoisting motor controlling means to control car operation and hall-button controlled stopping circuits common to the motor controlling means of all the cars which form the bank, whereby two buttons at any one landing control only stops thereat for all the cars of the bank, and for both directions of car travel.

64. In an intercepting control system, the combination with a bank of cars, a hoisting motor for each car, electro-magnetically operable reversing switches for each motor, a single manually operable switch in each car to control its reversing switches to effect car starts, a self-holding circuit to maintain a closed reversing switch in such position independently of the manual switch to continue movement of the car automatically, one "up" and one "down" hall push-button for each intermediate landing served, and floor stopping switches for each car, all of which for any one landing which correspond as to direction are electrically interconnected and controlled by said two buttons per landing, whereby any such moving car of the bank, which is first to reach landings at which buttons are pressed, and whose direction of travel corresponds to the button pressed, will be intercepted thereat by opening the self-holding circuit for the reversing switch controlling said first car.

65. In an intercepting control system, the combination with a bank of cars, hoisting-motor controlling mechanism for the cars, one "up" and one "down" hall-button for each intermediate landing served, to control the motor controlling mechanism for all the cars, and electro-magnetically operable direction switches for each car controllable automatically at the limits of travel and manually at any intermediate point of car travel to render each car controlling means responsive only to hall-buttons which correspond to direction of car movement and which are at landings toward which the car is moving.

66. In an intercepting control system, the combination with a bank of cars, hoisting motor mechanism therefor, means operable selectively to effect automatic car stops comprising one "up" and one "down" hall-button at each intermediate landing served, and floor control mechanism for each car for each landing, each operable in accordance with car position and all at any one landing corresponding as to direction being electrically inter-connected and controlled by said "up" and "down" hall-buttons, direction switches for each car controlled automatically at top and bottom landings to establish direction for reverse car travel, manually controlled reversing switch mechanism for each car operable to effect car travel in a direction as determined by its direction switches, and means controlled by said direction switches for each car to render said floor control mechanism for each car responsive to the control of the hall-buttons only at landings toward which a car is moving and only to such buttons as correspond to the direction of car movement.

67. In an intercepting control system, the combination with a bank of cars, hoisting motor mechanism therefor, one "up" and one "down" hall-button at each intermediate landing served, floor-control circuits for each car all of which for any one landing which correspond as to direction are inter-connected, and are controlled by said "up" and "down" buttons to control all the cars, and means whereby the control of each car by its floor control circuits are rendered ineffective, and in this manner transfer the controlling effect of the control-circuits as rendered effective by the hall-buttons, to the control circuits of other cars.

68. In an intercepting control system, the combination with a bank of cars, a hoisting motor for each car, one "up" and one "down" hall-button at each intermediate landing served, car actuated floor-control devices for each car, all for any one landing which correspond as to direction being electrically interconnecter and controlled by two hall-buttons, whereby the two buttons at each landing control all the cars which form the bank, and selectively operable car buttons and circuits for each car, each set controlling its car exclusively, and means operable at will to render such combined controlling effect of said hall-buttons ineffective with respect to any car to permit continuation of its travel as express and at the same time the car buttons of such car remain effective.

69. An electric elevator system comprising; an elevator car; a plurality of landings served by the car; a manually operable control switch in the car; means responsive to the operation of said control switch for causing the starting of the car; a push button for each of said landings; and mechanism responsive to the operation of said push buttons for causing the car to slow down as it nears each of the landings corresponding to the push buttons operated, and for causing such slow downs to occur in the natural order of landings, regardless of the order in which the push buttons are operated, said mechanism comprising stationary control means for each of said landings and control means actuated in accordance with car movement for cooperating with the stationary control means for any of said landings for which a slow down is to be made to initiate the slow-down operation at different distances from such landing.

70. An electric elevator system comprising; an elevator car; a plurality of landings served by the car; a manually operable control switch in the car; means responsive to the operation of said control switch for causing the starting of the car; stationary control means for each of said landings; control means actuated in accordance with car movement for cooperating with the stationary control means for any of said landings to initiate the slowing down of the car at varying distances from such landing; a push button for each of said landings; and means responsive to the operation of any of said push buttons for rendering said control means carried by the car and the stationary control means for the landing corresponding to the push button operated conjointly effective to initiate the slowing down of the car as the car approaches that landing.

71. An electric elevator system comprising; an elevator car; a plurality of landings served by the car; a manually operable control switch in the car; means responsive to the operation of said control switch for causing the starting of the car; a push button for each of said landings; and mechanism responsive to the operation of said push buttons for causing the stopping of the car during its travel in one direction at the landings corresponding to the push buttons operated, in the natural order of landings, regardless of the order in which the push buttons are operated, said mechanism comprising stationary control means for each of said landings and control means actuated in accordance with car movement for cooperating with the stationary control means for any of said landings at which a stop is to be made to initiate the slow-down operation for such stop at different distances from such landing.

72. An electric elevator system comprising; an elevator car; a plurality of landings served by the car; a motor for raising and lowering the car; a manually operable control switch in the car; switching mechanism responsive to the operation of said control switch after each stop for establishing circuits for causing said motor to start the car and for establishing additional circuits for causing said motor to accelerate the car; an up push button located at each of said landings; a down push button located at each of said landings; and mechanism responsive to said up push buttons for causing the car, when travelling in the up direction, to slow down as it nears each of the landings corresponding to the up push buttons operated, and for causing such slow downs to occur in the natural order of landings, regardless of the order in which such buttons are operated, and responsive to said down push buttons for causing the car, when travelling in the down direction, to slow down as it nears each of the landings corresponding to the down push buttons operated, and for causing such slow downs to occur in the natural order of landings, regardless of the order in which said buttons are operated, said last named mechanism comprising stationary slow-down control means for each of said landings and slow-down control means actuated in accordance with car movement for cooperating with the stationary slow-down control means for any landing at which a slow down is to be made to cause the interruption of said accelerating circuits to initiate the slow-down operation at different distances from such landing.

73. An electric elevator system comprising; an elevator car; a plurality of landings served by the car; a motor for raising and lowering the car; a manually operable control switch in the car; circuits for causing said motor to start the car; circuits for causing said motor to accelerate the car; switching mechanism responsive to the operation of said control switch for closing said starting and accelerating circuits; a push button in the car for each of said landings; an up push button located at each of said landings; a down push button located at each of said landings; additional switching mechanism responsive to said car push buttons and said up push buttons for causing the car, when travelling in the up direction, to slow down as it nears each of the landings corresponding to the car push buttons and up push buttons operated, and for causing such slow downs to occur in the natural order of landings, regardless of the order in which such buttons are operated, and responsive to said car push buttons and down push buttons for causing the car, when travelling in the down direction, to slow down as it nears each of the landings corresponding to the car push buttons and down push buttons operated, and for causing such slow downs to occur in the natural order of landings, regardless of the order in which such buttons are operated, said additional switching mechanism comprising stationary slow-down control means for each of said landings and slow-down control means actuated in accordance with car movement for cooperating with the stationary slow-down control means for any landing for which a slow down is to be made to cause the interruption of said accelerating circuits to initiate the slow-down operation at different distances from such landing; and means for interrupting said starting circuits to cause the car to be brought to a stop at any of said landings after the slow-down operation for that landing has been initiated.

74. An electric elevator system comprising; an elevator car; a plurality of landings served by the car; a motor for raising and lowering the car; a manually operable start control switch in the car; circuits for causing said motor to start the car; circuits for causing said motor to accelerate the car; switching mechanism responsive to the operation of said start control switch after each stop for closing said starting and accelerating circuits; means for maintaining said starting circuits and accelerating circuits closed after their being established in response to the operation of said start control switch; a push button in the car for each of said landings; an up push button located at each of said landings; a down push button located at each of said landings; and additional switching mechanism responsive to said car push buttons and said up push buttons for causing the stopping of the car, when travelling in the up direction, at the landings corresponding to the car push buttons and up push buttons operated, in the natural order of landings, regardless of the order in which such buttons are operated, and responsive to said car push buttons and down push buttons for causing the stopping of the car, when travelling in the down direction, at the landings corresponding to the car push buttons and down push buttons operated, in the natural order of landings, regardless of the order in which such buttons are operated, said additional switching mechanism comprising stationary slow-down control means for each of said landings, slow-down control means actuated in accordance with car movement for cooperating with the stationary slow-down control means for any of said landings at which a stop is to be made to cause the interruption of said accelerating circuits to initiate the slow-down operation for such stop at different distances from such landing, depending upon the distance required to effect the desired retardation, and stop control means operable after the initiation of a slow down by the coaction of the movable slow-down control means with stationary control means for any of said landings and upon the arrival of the car at a certain distance from the landing for which slow down is initiated for causing the interruption of said starting circuits to bring the car to rest at such landing.

75. An electric elevator system comprising; a plurality of elevator cars; a landing served by each of said cars; a motor for raising and lowering each car; a manually operable control switch in each car; switching mechanism for each car responsive to the operation of the control switch for the car for which such switching mechanism is provided to cause the motor for that car to start the car; switching mechanism for each car operable to initiate the slowing down of the car for which such slow-down initiating switching mechanism is provided; a push button for said landing, said push button being common to all of said cars; switching mechanism for each of said cars actuated in accordance with the movement of the car for which such switching mechanism is provided; and switching mechanism rendered effective in response to an operation of said push button to cooperate with the switching mechanism actuated in actuated with car movement for any one of said cars to cause the operation of the slow-down initiating switching mechanism for that car to initiate the slowing down of the car as it nears said landing.

76. An electric elevator system comprising; a plurality of elevator cars; a plurality of landings, each served by each of said cars; a motor for raising and lowering each car; a manually operable control switch in each car; switching mechanism for each car responsive to the operation of the control switch for the car for which such switching mechanism is provided to cause the motor for that car to start the car; switching mechanism for each car operable to initiate the slowing down of the car for which such slow-down initiating switching mechanism is provided; a push button switch for each of said landings, each push button switch being common to all of said cars; switching mechanism for each of said cars actuated in accordance with the movement of the car for which such switching mechanism is provided; and a plurality of switching mechanisms, one for each of said push button switches, each of said plurality of switching mechanisms being rendered effective in response to an operation of the push button switch for which it is provided to cooperate with the switching mechanism actuated in accordance with car movement for any one of said cars to cause the operation of the slow-down initiating switching mechanism for that car to initiate the slowing down of the car as it nears the corresponding landing.

77. An electric elevator system comprising; a plurality of elevator cars; a plurality of landings, each served by each of said cars; a motor for raising and lowering each car; a manually operable control switch in each car; switching mechanism for each car responsive to the operation of the control switch for the car for which such switching mechanism is provided to cause the motor for that car to start the car; switching mechanism for each car operable to initiate the slowing down of the car for which such slow-down initiating switching mechanism is provided; circuits for each landing for each car adapted when closed to cause the operation of the slow-down initiating switching mechanism for the car for which such circuits are provided to initiate the slowing down of the car; a push button switch for each of said landings, each push button switch being common to all of said cars; switching mechanism for each of said cars actuated in accordance with the movement of the car for which such switching mechanism is provided; and a plurality of switching mechanisms, one for each of said push button switches, each of said plurality of switching mechanisms being rendered effective in response to an operation of the push button switch for which it is provided to cooperate with the switching mechanism actuated in accordance with car movement for any one of said cars to close the circuits for such car for the corresponding landing to cause the operation of the slow-down initiating switching mechanism for that car to initiate the slowing down of the car as the car nears such landing, the car for which slow down is initiated for any landing being selected by said switching mechanisms actuated in accordance with car movement.

78. An electric elevator system comprising; a plurality of elevator cars; a plurality of landings, each served by each of said cars; a motor for raising and lowering each car; a manually operable control switch in each car; switching mechanism for each car responsive to the operation of the control switch for the car for which such switching mechanism is provided to cause the motor for that car to start the car; switching mechanism for each car operable to initiate the slowing down of the car for which such slow-down initiating switching mechanism is provided; a circuit for each landing for each car adapted when completed to cause the operation of the slow-down initiating switching mechanism for the car for which such circuit is provided to initiate the slowing down of the car; a push button located at each of said landings, each push button being common to all of said cars; a plurality of switching mechanisms, one for each of said push buttons, each of said plurality of switching mechanisms being operable upon the pushing of its corresponding push button to close a gap in the circuits for the corresponding landing for the slow-down initiating switching mechanisms for all of said cars; and floor selector switching mechanism for each of said cars, each floor selector switching mechanism being operable, upon the arrival of the car for which such floor selector switching mechanism is provided at a predetermined distance from any one of said landings, to close a second gap in the circuit for such landing for the slow-down initiating switching mechanism for that car, the closing of both of said gaps for such circuit completing such circuit.

79. An electric elevator system comprising; a plurality of elevator cars; a plurality of landings, each served by each of said cars; a motor for raising and lowering each car; a manually operable control switch in each car; switching mechanism for each car responsive to the operation of the control switch for the car for which such switching mechanism is provided to cause the motor for that car to start the car; switching mechanism for each car operable to initiate the slowing down of the car for which such slow-down initiating switching mechanism is provided; a circuit for each landing for each car adapted when completed to cause the operation of the slow-down initiating switching mechanism for the car for which such circuit is provided to initiate the slowing down of the car; a push button located at each of said landings, each push button being common to all of said cars; a plurality of switching mechanisms, one for each of said push buttons, each of said plurality of switching mechanisms being operable upon the pushing of its corresponding push button to close a gap in the circuits for the corresponding landing for the slow-down initiating switching mechanisms for all of said cars; floor selector switching mechanism for each of said cars, each floor selector switching mechanism being operable, upon the arrival of the car for which such floor selector switching mechanism is provided at a predetermined distance from any one of said landings, to close a second gap in the circuit for such landing for the slow-down initiating switching mechanism for that car, the closing of both of said gaps for such circuit completing such circuit, and means for causing the reestablishment of the first mentioned gap in any one of said circuits for the slow-down initiating switching mechanisms, once such circuit has been completed, to prevent the initiation of the slowing down of more than one of said cars at a landing in response to an operation of the push button for that landing.

80. An electric elevator system comprising; a plurality of elevator cars; a plurality of landings, each served by each of said cars; a motor for raising and lowering each car; a manually operable control switch in each car; switching mechanism for each car responsive to the operation of the control switch for the car for which such switching mechanism is provided to cause the motor for that car to start the car; switching mechanism for each car operable to initiate the slowing down of the car for which such slow-down initiating switching mechanism is provided; a circuit for each landing for each car adapted when completed to cause the operation of the slow-down initiating switching mechanism for the car for which such circuit is provided to initiate the slowing down of the car; a push button located at each of said landings, each push button being common to all of said cars; a plurality of switching mechanisms, one for each of said push buttons, each of said plurality of switching mechanisms being operable upon the pushing of its corresponding push button to close a gap in the circuits for the corresponding landing for the slow-down initiating switching mechanisms for all of said cars; floor selector switching mechanism for each of said cars, each floor selector switching mechanism being operable, upon the arrival of the car for which such floor selector switching mechanism is provided at a predetermined distance from any one of said landings, to close a second gap in the circuit for such landing for the slow-down initiating switching mechanism for that car, the closing of both of said gaps for such circuit completing such circuit; and means for causing each car to be brought to a stop, after the slowing down of such car has been initiated, at the landing for which such slow-down initiation occurred.

81. An electric elevator system comprising; a plurality of elevator cars; a plurality of landings, each served by each of said cars; a motor for raising and lowering each car; a manaully operable control switch in each car; switching mechanism for each car responsive to the operation of the control switch for the car for which such switching mechanism is provided to cause the motor for that car to start the car; switching mechanism for each car operable to initiate the slowing down of the car for which such slow-down initiating switching mechanism is provided; an up slow-down control circuit for each landing for each car adapted when completed to cause the operation of the slow-down initiating switching mechanism for the car for which such up slow-down control circuit is provided to initiate the slowing down of the car during travel thereof in the up direction; a down slow-down control circuit for each landing for each car adapted when completed to cause the operation of the slow-down initiating switching mechanism for the car for which such down slow-down control circuit is provided to initiate the slowing down of the car during travel thereof in the down direction; an up push button located at each of said landings, each up push button being common to all of said cars; a down push button located at each of said landings, each down push button being common to all of said cars; a plurality of switching mechanisms, one for each of said up push buttons, each of said plurality of switching mechanisms being operable upon the pushing of its corresponding up push button to close a gap in the up slow-down control circuits for the corresponding landing for the slow-down initiating switching mechanisms for all of said cars; a plurality of additional switching mechanisms, one for each of said down push buttons, each of said plurality of additional switching mechanisms being operable upon the pushing of its corresponding down push button to close a gap in the down slow-down control circuits for the corresponding landing for the slow-down initiating switching mechanisms for all of said cars; floor selector switching mechanism for each of said cars, each floor selector switching mechanism being operable, during upward travel of the car for which such floor selector switching mechanism is provided, to close a second gap in the up slow-down control circuit for any one of said landings for the slow-down initiating switching mechanism for that car, upon the arrival of the car at a predetermined distance from such landing, the closing of both of said gaps in such up slow-down control circuit completing such circuit, and each floor selector switching mechanism being operable, during downward travel of the car for which such floor selector switching mechanism is provided, to close a second gap in the down slow-down control circuit for any one of said landings for the slow-down initiating switching mechanism for that car, upon the arrival of the car at a predetermined distance from such landing, the closing of both of said gaps in such down slow-down control circuit completing such circuit; and means for causing the reestablishment of the first mentioned gap in any one of said up slow-down control circuits for the slow-down initiating switching mechanisms, once such up slow-down control circuit has been completed, to prevent the initiation of the slowing down of more than one of said cars at a landing in response to an operation of the up push button for that landing, and for causing the reestablishment of the first mentioned gap in any one of said down slow-down control circuits for the slow-down initiating switching mechanisms, once such down slow-down control circuit has been completed, to prevent the initiation of the slowing down of more than one of said cars at a landing in response to an operation of the down push button for that landing.

82. A control system for a plurality of elevator cars comprising, means for stopping the cars at a landing, a switch for causing the operation of the stopping means, and means operable in response to the operation of said switch for preventing the operation of said means in response to the operation of the switch to stop more than one car at the landing so long as the last included means is operated.

83. A control system for a plurality of elevator cars comprising, a switch for a landing, means for stopping the cars, said means being responsive to the operation of the switch to stop the car first to arrive from a given direction at its stopping distance from the landing, and means responsive to the operation of said switch for preventing the operation of the first named means to stop other cars from the same direction at the landing so long as the second named means is operated.

84. A control system for a plurality of elevator cars comprising, means for stopping each car at any one of a plurality of landings, a switch for each landing to cause the operation of said means to stop the cars at the landings corresponding to the switches operated, and means operable in response to the operation of each switch for preventing the operation of the first named means in response to the operation of said switches to stop more than one car at any one of the landings so long as the last included means is operated.

85. A control system for a plurality of elevator cars comprising, means for stopping any car at a landing, means common to all the cars operable to cause the operation of the stopping means, means for causing the operation of said common means, and means operable to prevent more than one response of the common means to the means for causing its operation so long as the last included means is operated.

86. A control system for a plurality of elevator cars comprising, means for stopping any car at a landing, a switch, means common to all the cars for causing the operation of the stopping means, said common means being operable in response to the operation of said switch, and means also operable in response to the operation of said switch for preventing more than one response of said common means until after one of the cars has stopped at a landing.

87. A control system for a plurality of elevator cars comprising, means for stopping any car at a landing, a switch, means common to all the cars for causing the operation of the stopping means, said common means being operable in response to the operation of said switch, and means also operable in response to the operation of said switch for preventing more than one response of said common means so long as said preventing means is operated.

88. A control system for a plurality of elevator cars comprising, means for causing each car to stop at a predetermined point, and means for causing all the cars to stop at said point, said last included means comprising controlling means common to all the cars.

89. A control system for a plurality of elevator cars comprising, a switch in each car, a switch without the cars, means operable in response to the operation of any of the first named switches to cause the respective cars to stop at a landing, and means operable in response to the operation of the second named switch to cause the car first to arrive at its stopping distance from said landing to stop at said landing.

90. A control system for a plurality of elevator cars comprising, means for stopping the cars, a switch in each car, a switch at a landing, means operable in response to the operation of any of the first named switches to cause the stopping means to stop the respective cars at the landing, and means operable in response to the operation of the second named switch to cause the stopping means to stop any car at the landing.

91. A control system for a plurality of elevator cars comprising, means for stopping each car at any one of a plurality of landings, said means comprising switches in each car, and means for stopping any car at any one of the landings, said second named means comprising only one switch at each landing.

92. A control system for a plurality of elevator cars comprising, means for stopping the cars, a switch in each car for each of a plurality of landings, means operable in response to the operation of the switches in each car to cause the stopping means to stop the respective cars at the landings corresponding to the switches operated, a switch without the cars for each landing, and means operable in response to the operation of any of the second named switches to cause the stopping means to stop any car at the landings corresponding to the second named switches operated.

93. An elevator system comprising, a plurality of elevator cars, a landing, a plurality of stop controls for said landing, one in each car, operable to cause the stopping of the respective cars at said landing, and a stop control at said landing operable to cause the stopping of any one of said cars at said landing.

94. An elevator system comprising, a plurality of elevator cars, a landing, a plurality of stop controls for said landing, one in each car, operable to cause the stopping of the respective cars at said landing, and a stop control at said landing operable to cause the stopping of any one of said cars at said landing, said one car being the car first to near said landing from a given direction after the operation of said stop control at said landing.

95. An elevator system comprising, a landing, a plurality of elevator cars, stopping mechanism for each car for stopping it at said landing, a car button in each car for causing the operation of the stopping mechanism for that car to stop it at said landing, and a hall button at said landing for causing the operation of any one of said stopping mechanisms to stop the car for which such mechanism is provided at said landing, said one stopping mechanism being for the car first to arrive at its stopping distance from said landing from a given direction after the operation of said hall button.

96. An elevator system comprising, a plurality of landings, a plurality of elevator cars, stopping mechanism for each car for stopping it at each of said landings, a plurality of stop control switches in each car, one for each of said landings, for causing the operation of the stopping mechanism for that car to stop it at the respective landings, and a stop control switch at each of said landings for causing the operation of any one of said stopping mechanisms to stop the car for which such mechanism is provided at the landing at which the switch is located, the car which is stopped at each landing by its stopping mechanism in response to the stop control switch at such landing being that car first to arrive from a given direction at its stopping distance from such landing.

97. A plural elevator system comprising means for signalling the approach of any one of the cars as it nears a landing and for stopping it at said landing, said means comprising means common to all the cars.

98. A plural elevator system comprising, means for signalling the approach of the cars as they near a landing and for stopping them at said landing, and means common to all the cars for causing the operation of the first named means.

99. A plural elevator system comprising, means for signalling the approach of the cars and for stopping them at a landing, and means common to all the cars for causing the operation of the first named means to signal the approach of the cars and to stop only one of them at the landing.

100. A plural elevator system comprising, means for signalling the approach of the cars and for stopping them at a landing, and a switch for the landing for causing the operation of said means.

101. An elevator system comprising, a plurality of elevator cars, a landing, a plurality of signals for said landing, one for each of said cars, stopping mechanism for each of said cars, and a control switch for said landing common to all of said cars for causing the giving of the signal for any one of said cars as said car nears said landing and the operation of the stopping mechanism for said car to stop said car at said landing.

102. A plural elevator system comprising, means for signalling the approach of the cars and for stopping them at a landing, and means for causing the operation of the first named means to signal the approach of any car and to stop the car, of those whose approach is signalled, first to arrive at its stopping distance from the landing.

103. An elevator system comprising, a plurality of elevator cars, a landing, a plurality of signals for said landing, one for each of said cars, signalling and stopping mechanism for each of said cars, and a control switch for said landing common to all of said cars for causing the signalling and stopping mechanism for any one of said cars to operate the signal for said car as said car nears said landing and to stop said car at said landing.

104. A plural elevator system comprising means for signalling the approach of the cars and for stopping them at a landing, and means common to all the cars for causing the operation of the first named means to signal the approach of all the cars and to stop only one of them at the landing, the first named means being constructed and arranged to maintain the signal for said one car until after it has stopped.

105. A plural elevator system comprising, means for signalling the approach of the cars at each of a plurality of landings and for stopping them at said landings, said means comprising only one switch for each landing.

106. A plural elevator system comprising, means for signalling the approach of each car at each of a plurality of landings and for stopping each car at said landings, a switch at each landing to cause the operation of said means to signal the approach of the cars and to stop them at the landings corresponding to the switches operated.

107. A plural elevator system comprising, means for signalling the approach of the cars and for stopping them at a landing regardless of their direction of movement, and means common to all the cars for causing the operation of the first named means for only those cars approaching the landing from one direction.

108. A plural elevator system comprising, means for signalling the approach of the cars and for stopping them at a landing regardless of their direction of travel, means common to all the cars operable to cause the operation of the first named means for cars approaching the landing from one direction, and means for preventing the operation of the first named means in response to the operation of said common means for cars approaching the landing from the other direction.

109. A plural elevator system comprising, means for signalling the approach of the cars and for stopping them at any one of a plurality of landings regardless of their direction of travel, a switch for each landing operable to cause the operation of the first named means for cars approaching in one direction the landings corresponding to the switches operated, and means for preventing the operation of the first named means in response to the operation of the switches for cars traveling in the other direction.

110. A plural elevator system comprising, means for signalling the approach of the cars and for stopping them at a landing, a switch for causing the operation of the first named means for cars approaching the landing from one direction, and another switch for causing the operation of the first named means for cars approaching the landing from the other direction.

111. A plural elevator system comprising, means for signalling the approach of the cars and for stopping them at a landing, means common to all the cars for causing the operation of the first named means, said common means comprising means operable to prevent the operation of the first named means to stop more than one car at the landing so long as the preventing means is operated.

112. A plural elevator system comprising, a switch at a landing, means responsive to the operation of said switch for stopping the car first to arrive at its stopping distance from the landing from a given direction, and means responsive to the operation of said switch for signalling the approach of said car to the landing and for preventing the operation of the first named means to stop other cars from the same direction at the landing so long as the second named means is operated.

113. A plural elevator system comprising, a signal for each car at a landing, a signal within each car, means for stopping each car, and means for causing the operation of the signals and the first named means to stop the cars at the landing, said last included means comprising means common to all the cars.

114. A plural elevator system comprising, a signal for each car at each of a plurality of landings, an annunciator signal for each landing in each car, means for stopping each car at any one of the landings, a switch at each landing, and means responsive to the operation of the switches for causing the immediate operation of the annunciator signals corresponding to the switches operated, for causing the operation of the signals at the landings corresponding to the switches operated as the cars approach these landings and for causing the operation of the stopping means as the cars arrive at their stopping distances from the landings corresponding to the switches operated.

115. A plural elevator system comprising, a signal for each car at each one of a plurality of landings, an annunciator signal for each landing in each car, an annunciator signal outside the car for each landing, means for stopping each car, and means for causing the operation of all the signals and the first named means to stop the cars at the landings, said last included means comprising means common to all the cars.

116. A control system for a plurality of elevator cars comprising, means for stopping the cars at a predetermined point, said means comprising controlling means common to all the cars, and means for preventing the operation of the first named means.

117. A control system for a plurality of elevator cars comprising, means for stopping the cars at a landing, means common to all the cars operable to cause the operation of the first named means, and means for preventing the operation of the first named means in response to the operation of the common means.

118. A control system for a plurality of elevator cars comprising, means for stopping the cars at a predetermined point, said means comprising controlling means common to all the cars, and means common to all the cars for preventing the operation of the first named means.

119. A control system for a plurality of elevator cars comprising, means for stopping the cars at a predetermined point, said means comprising controlling means common to all the cars, and a single switch for preventing the operation of the first named means.

120. A control system for a plurality of elevator cars comprising, means for stopping the cars at a landing regardless of their direction of travel, said means comprising controlling means common to all the cars, and means for preventing the operation of the first named means for cars traveling in one direction.

121. A control system for a plurality of elevator cars comprising, means for stopping the cars at a landing regardless of their direction of travel, means common to all the cars operable to cause the operation of the first named means, and means for preventing the operation of the first named means in response to the operation of the common means for each direction of travel.

122. A control system for a plurality of elevator cars comprising, means for stopping the cars at a landing, a switch common to all the cars operable to cause the operation of the first named means, and means for preventing the operation of the switch.

123. A control system for a plurality of elevator cars comprising, means for stopping the cars at a landing, a switch common to all the cars operable to cause the operation of the first named means, means operable to cause the operation of the switch, and means for preventing the operation of the switch in response to the operation of the second included means.

124. A control system for a plurality of elevator cars comprising, means for stopping the cars at a landing, an electro-magnetic switch operable to cause the operation of said means, and a switch operable to prevent the energization of the electromagnetic switch.

125. A control system for a plurality of elevator cars comprising, means for stopping the cars at any one of a plurality of landings, a switch for each landing operable to cause the operation of the first named means to stop the cars at the landings corresponding to the switches operated, and means for preventing the operation of the first named means in response to the operation of the switches.

126. A control system for a plurality of elevator cars comprising, means for stopping the cars at any one of a plurality of landings, a switch for each landing operable to cause the operation of the first named means to stop the cars at the landings corresponding to the switches operated, and another switch for each landing operable to prevent the operation of the first named means in response to the operation of the first named switches at the landings corresponding to the second named switches operated.

127. A control system for a plurality of elevator cars comprising, means for stopping the cars at any one of a plurality of landings regardless of their direction of travel, a switch at each landing operable to cause the operation of the first named means to stop the cars at the landings correcponding to the switches operated with the cars traveling in one direction, another switch at each landing operable to cause the operation of the first named means to stop the cars at the landings corresponding to the second named switches operated with the cars traveling in the other direction, a switch for each landing operable to prevent the operation of the first named means in response to the first named switches at the landings corresponding to the third named switches operated, and another switch for each landing operable to prevent the operation of the first named means in response to the operation of the second named switches at the landings corresponding to the fourth named switches operated.

128. A control system for a plurality of elevator cars comprising, means for stopping the cars at a landing, said means comprising controlling means common to all the cars, means operable to prevent the operation of the first named means, and means for stopping each car at the landing regardless of the operation of the preventing means.

129. A control system for a plurality of elevator cars comprising, means for stopping the cars, means operable to cause the operation of the first named means to stop the cars at a landing regardless of their direction of travel, a switch for each direction of travel operable to cause the operation of the second named means, a switch for each direction of travel operable to prevent the operation of the second named means in response to the operation of the first named switches, and means for each car operable for both directions of travel to cause the operation of the first named means to stop the respective cars at the landings regardless of the operation of the second named switches.

130. A control system for a plurality of elevator cars comprising, means for stopping the cars at each of a plurality of landings, said means comprising only one switch at each landing, means operable to prevent the operation of the first named means for each of the landings, and means unaffected by the operation of the preventing means for stopping each car at each landing.

131. A control system for a plurality of elevator cars comprising, means for stopping the cars, a switch at each of a plurality of landings, means operable in response to the operation of any of the switches to cause the first named means to stop the cars at the landings corresponding to the switches operated, a switch for each landing operable to prevent the operation of the first named means to stop the car at the landings corresponding to the second named switches operated, a switch in each car for each landing, and means operable in response to the operation of the switches in each car to cause the operation of the first named means to stop that car at the landings corresponding to the last named switches operated regardless of the operation of any of the second named switches.

132. A control system for a plurality of elevator cars comprising, means for stopping the cars at a landing, said means comprising controlling means common to all the cars, means for preventing the operation of the first named means for each car, and means for preventing the operation of the first named means for all the cars.

133. A control system for a plurality of elevator cars comprising, means for stopping the cars at each one of a plurality of landings, a switch for each landing operable to cause the operation of the first named means to stop the cars at the landings corresponding to the switches operated, means for preventing the operation of the first named means for each car in response to the operation of the switches for each of the landings, and switches for preventing the operation of the first named means for all the cars in response to the operation of the first named switches at the landings corresponding to the second named switches operated.

134. A plural elevator system comprising, means for signaling the approach of the cars and for stopping them at a landing, means common to all the cars for causing the operation of the first named means, and means for preventing the operation of the first named means.

135. A plural elevator system comprising, means for signalling the approach of the cars and for stopping them at a landing, means common to all the cars for causing the operation of the first named means, and a single switch for preventing the operation of the first named means.

136. A plural elevator system comprising, means for signalling the approach of the cars and for stopping them at a landing regardless of their direction of travel, means common to all the cars for causing the operation of the first named means, and means for preventing the operation of the first named means for cars traveling in one direction.

137. A plural elevator system comprising means for signalling the approach of the cars and for stopping them at a landing, means common to all the cars for causing the operation of the first named means, means for preventing the operation of the first named means for each car, and means for preventing the operation of the first named means for all the cars.

138. A plural elevator system comprising, means for signalling the approach of the cars at each of a plurality of landings and for stopping them at the landings, a switch for each landing operable to cause the operation of said means for the landings corresponding to the switches operated, and another switch for each landing operable to prevent the operation of said means in response to the operation of the first named switches for the landings corresponding to the second named switches operated.

139. A control system for a plurality of elevator cars comprising, means for stopping the cars at a landing, said means comprising controlling means common to all the cars, and means for each car for preventing the operation of the first named means for the corresponding car.

140. A control system for a plurailty of elevator cars comprising, means for stopping the cars at a landing, said means comprising controlling means common to all the cars, and means within each car operable to prevent the operation of the first named means for the cars in which the last included means is operated.

141. A control system for a plurality of elevator cars comprising, means for stopping the cars at a landing, said means comprising controlling means common to all the cars, means within each car operable to prevent the operation of the first named means for the cars in which the preventing means is operated, and means for preventing the operating of the first named means for all the cars.

142. A control system for a plurality of elevator cars comprising, means for stopping the cars at a landing, said means comprising controlling means common to all the cars, means within each car operable to prevent the operation of the first named means for the cars in which the preventing means is operated, means for each car for preventing the operation of the first named means for the corresponding car, and means for preventing the operation of the first named means for all the cars.

143. A control system for a plurality of elevator cars comprising, means for signalling the approach of each car and for stopping them at a landing, said means comprising controlling means common to all the cars, and means for each car for preventing the operation of the first named means for that car.

144. A control system for a plurality of elevator cars comprising, means for stopping the cars at a landing, said means comprising controlling means common to all the cars, means for each car for preventing the operation of the first named means for the respective cars, and means for rendering the preventing means ineffective.

145. A plural elevator system comprising, means for stopping the cars at a landing, and means for signalling the approach of the cars and for stopping them at the landing.

146. A plural elevator system comprising, a switch in each car, means responsive to the operation of any of the switches for stopping the respective cars at a landing, a switch without the cars, and means responsive to the operation of the switch without the cars for signalling the approach of the cars and for stopping them at the landing.

147. A plural elevator system comprising, signalling means for each car, means for stopping each car, means for causing the operation of the first and second named means to signal the approach of the cars and to stop them at a landing, and means for causing the operation of the second named means to stop each car at the landing.

148. A control system for a plurality of elevator cars comprising, means for stopping each car, a switch in each car, a switch without the cars, means responsive to the operation of the switches in the cars for causing the first named means to stop the respective cars at a landing, and means responsive to the operation of the switch without the car for causing the operation of the first named means to stop the car first to arrive at its stopping distance from said landing, the parts being constructed and arranged so that, when the switch without the cars and the switch within the car first to arrive at its stopping distance from the landing are both operated, the car is stopped by the response of the third named means.

149. A control system for a plurality of elevator cars comprising, means for starting and stopping each car, a switch for each car for causing the operation of the first named means to start the respective cars, and means for causing the operation of the first named means to stop each car at a landing, said last named means comprising means common to all the cars.

150. An elevator system comprising a plurality of elevator cars, a landing, a start control for each of said cars, a stop control for said landing, and car actuating and stopping mechanism for each of said cars, each of said mechanisms operating in response to the operation of the start control for its car to start said car and the mechanism for the car first to near said landing from a given direction operating in response to the operation of said stop control to stop such car at said landing.

151. An elevator system comprising, a plurality of elevator cars, a plurality of landings, a plurality of car actuating and stopping mechanisms, one for each car, a plurality of stop controls, one at each of the respective landings, operable by intending passengers, a plurality of selectors, one for each of said cars, for causing the operation of the car actuating and stopping mechanism for but one of said cars to stop that car at each of the respective landings at which a stop control has been operated, and a plurality of start controls, one in each of said cars, operable by the car operators to cause the operation of the car actuating and stopping mechanisms to start their respective cars after each stop.

152. An electric elevator system of the type wherein the car operates between the terminal landings and wherein the car is started in response to the operation of a starting switch in the car, characterized by the fact that means responsive to the movement of the car are provided for causing the car to move in the opposite direction, upon reaching the terminal landings, in response to the operation of the starting switch.

153. A control system for an elevator car comprising, a manually operable start control switch within the car, said switch having an on and an off position, means responsive to the operation of said switch to said on position after each stop to cause the starting of the car, and means for determining the direction in which said first named means will start the car in response to the operation of said start control switch.

154. A control system for an elevator car operating between certain landings comprising, a start control switch within the car, means responsive to the operation of said start control switch after each stop to cause the starting of the car, direction control switching mechanism for causing said starting of the car from landings intermediate said certain landings to be in the same direction as the car approached said intermediate landings, and means for automatically causing the operation of said switching mechanism at said certain landings to change the direction in which the car is started from said certain landings in response to the operation of said start control switch.

155. A control system for an elevator car comprising, a manually operable start control switch within the car, said switch being operable in the same direction from a certain position after each stop to cause the starting of the car, and means for determining the direction in which the car is started in response to the operation of said switch.

156. A control system for an elevator car comprising, a manually operable start control switch within the car, said switch being operable in the same direction from a certain position after each stop to cause the starting of the car, and direction control switching mechanism for causing said starting of the car from intermediate landings to be in the same direction as the car approached said landings and from terminal landings in the opposite direction from which the car approached said terminal landings.

157. A control system for an elevator car operating between certain landings as terminals comprising, a manually operable start control switch within the car, direction control switching mechanism, means responsive to the operation of said start control switch after each and every stop to cause the starting of the car in a direction determined by said direction control switching mechanism, said direction control switching mechanism being arranged to remain in position to cause the starting of the car from landings intermediate said certain landings to be in the same direction as the car approached said intermediate landings, and means for automatically causing said direction control switching mechanism to change the direction in which the car is started from said certain landings in response to the operation of said start control switch.

158. A control system for an elevator car operating between certain landings as terminals comprising, a manually operable start control switch within the car, direction control switching mechanism, means responsive to the operation of said start control switch after each and every stop to cause the starting of the car in a direction determined by said direction control switching mechanism, and means operable in response to car movement for operating said direction control switching mechanism to cause the starting of the car from said certain landings to be in a direction opposite to that in which the car approached said landings, said direction control switching mechanism, upon being operated, remaining in its operated position to cause the starting of the car from landings intermediate said certain landings to be in the same direction as the car approached said intermediate landings.

159. A control system for an elevator car comprising, a starting switch, means for starting and stopping the car, said means being responsive to the operation of the starting switch for starting the car, a second switch for determining the direction in which said means will start the car in response to the operation of the starting switch, said second switch being operable to cause said means to stop the car, and means for operating the second switch at will whereby the car will be stopped and upon operation of the starting switch will be started in the opposite direction.

160. A control system for an elevator car normally operating between certain landings as terminals comprising, means for starting the car, means operable to determine the direction of movement of the car, means for operating the direction determining means at one of said certain landings whereby the first named means will start the car from said landing in a direction opposite to that in which the car approached said landing, and means for restoring the direction determining means whereby the first named means will start the car from said landing in the same direction as the car approached said landing.

161. A control system for an elevator car normally operating between certain landings as terminals comprising, an extra landing beyond one of said certain landings, means for starting the car, means operable to determine the direction of movement of the car, means for operating the direction determining means at said one landing whereby the first named means will start the car from said one landing in a direction opposite to that in which the car approached said one landing, means for restoring the direction determining means whereby the first named means will start the car from said one landing toward said extra landing, and means for operating the direction determining means at the extra landing whereby the first named means will start the car from the extra landing in a direction opposite to that in which the car approached the extra landing.

162. A control system for an elevator car normally operating between certain landings as terminals comprising, an extra landing beyond one of said certain landings, means for starting the car, means operable to determine the direction of movement of the car, means for operating the direction determining means at said one landing whereby the first named means will start the car from said one landing in a direction opposite to that in which the car approached said one landing, means for restoring the direction determining means whereby the first named means will start the car from said one landing toward said extra landing, and means for operating the direction determining means at the extra landing whereby the first named means will start the car from the extra landing in a direction opposite to that in which the car approached the extra landing, said last named means being arranged to prevent the operation of the restoring means.

163. A control system for an elevator car comprising, means for stopping the car at any one of a plurality of landings, a switch for each landing operable to cause the operation of said means to stop the car at the landings corresponding to the switches operated, and another switch for each landing operable to prevent the operation of said means in response to the operation of the first named switches at the landings corresponding to the second named switches operated.

164. A control system for an elevator car comprising, means for stopping the car at a landing regardless of its direction of travel, a switch for each direction of travel operable to cause the operation of the stopping means, and a switch for each direction of travel operable to prevent the operation of the stopping means in response to the operation of the first named switches.

165. A control system for an elevator car comprising, means for stopping the car at each of a plurality of landings, said means comprising a switch at each landing, means operable to prevent the operation of the first named means for each of the landings, and means unaffected by the operation of the preventing means for stopping each car at each landing.

166. A control system for an elevator car comprising, means for stopping the car, means without the car for causing the operation of the first named means to stop the car at a landing, means within the car operable to prevent the operation of the first named means in response to the operation of the second named means, and means controlled from the car for causing the operation of the first named means to stop the car at the landing regardless of the operation of the preventing means.

167. A control system for an elevator car comprising, a plurality of stop control switches within the car, one for each of a plurality of landings, a plurality of additional stop control switches, one located at each of said landings, means responsive to the operation of any of said stop control switches within the car or any of said stop control switches at the landings for stopping the car at the landings corresponding to the stop control switches operated, and a non-stop switch operable to prevent the stopping of the car by said means in response to the operation of said stop control switches at the landings without affecting the stopping of the car by said means in response to the operation of said stop control switches within the car.

168. A control system for an elevator car comprising, means for stopping the car at a landing, means for preventing the operation of the first named means, and means for rendering the preventing means ineffective.

169. A control system for an elevator car comprising, a switch in the car, a switch without the car, means operable in response to the operation of the first named switch to cause the car to stop at a landing from either direction, and means operable in response to the operation of the second named switch to cause the car to stop at the landing from only one direction.

170. A control system for an elevator car comprising, means for stopping the car, means for causing the operation of the first named means to stop the car at a landing, and additional means for causing the operation of the first named means to stop the car at the landing, the parts being constructed and arranged so that the second named means will operate prior to the operation of the first named means.

171. A control system for an elevator car comprising, a switch, means operable in response to the operation of the switch for stopping the car at a landing when the car is traveling in one direction, and means for preventing the response of said means to the switch when the car is traveling in the other direction.

172. A control system for an elevator car comprising, means for stopping the car at a landing, means operable to cause the operation of the stopping means when the car is traveling in one direction, and means for preventing the response of the stopping means to the second named means when the car is traveling in the other direction.

173. A control system for an elevator car comprising, a switch for each landing, means operable in response to the operation of the switches for stopping the car at the landings corresponding to the switches operated when the car is traveling in one direction, and means for preventing the response of said means to the switches when the car is traveling in the other direction.

174. A control system for an elevator car comprising, means for stopping the car at a landing, a switch, an electromagnetic switch operable in response to the operation of the first named switch for causing the operation of the stopping means, means for latching the electromagnetic switch in operated position, means for releasing the latching means, and means for preventing the energization of the electromagnetic switch so long as it is latched in operated position.

175. In a switching system, two electromagnetic switches having connected windings, means for supplying current to said windings, means for retaining the switches in closed positions, and means responsive to the closure of one of said switches for discontinuing the supply of current to both windings.

176. In a switching system, two electromagnetic switches having connected windings, means for energizing said windings, means for retaining the switches in closed positions, means responsive to the closure of one of said switches for deenergizing both windings, and means for preventing the operation of the deenergizing means until the retaining means has become effective.

177. In a switching system, two electromagnetic switches having connected windings, means for energizing said windings, means for retaining the switches in closed positions, means for releasing the retaining means for one of said switches, and means for deenergizing both windings and for preventing subsequent energization thereof until said releasing means has operated.

178. A control system of the type wherein an elevator car is driven by means of a power mechanism and wherein the power mechanism is caused to stop the car at a landing in response to the operation of either a switch within the car or a switch at the landing, characterized by the fact that in addition to said switches a start control switch is provided, said start control switch having a single pair of contacts for causing the starting of the car upon their engagement after each stop, regardless of the direction in which the car is to be started.

179. A control system of the type wherein an elevator car is driven by means of power mechanism and wherein the power mechanism is caused to stop the car at a landing in response to the operation of either a switch within the car or a switch at the landing, characterized by the fact that in addition to said switches a start control switch is provided within the car, said start control switch having a single pair of contacts for causing the starting of the car upon their engagement after each stop, regardless of the direction in which the car is to be started.

180. A control system for an elevator car comprising, a start control switch within the car, means responsive to the operation of said start control switch for causing the starting of the car and for causing it to run at a certain speed, and a slow speed switch operable to prevent said means causing said car to run above a slower speed than said certain speed.

181. A control system for an elevator car comprising, a manually operable start control switch within the car, means responsive to the operation of said start control switch for starting the car and for causing it to run at full speed, and a manually operable slow speed switch within the car operable to prevent said means causing said car to run above a slower speed.

182. A control system for an elevator car comprising, means for starting and stopping the car, a switch for causing the operation of said means to start the car, means operable to cause the operation of the first named means to stop the car at a landing, a second switch operable to cause said operation of the second named means, means for retaining said second switch in operated position, and means operable in response to the second named means when the car arrives at its stopping distance from the landing for releasing said retaining means.

183. An electric elevator system of the type wherein the engagement of a stationary contact and a traveling contact causes the stopping of the car and wherein means are provided for causing the traveling contact to move in accordance with the movement of the car, characterized by the fact that means are provided for controlling the traveling contact, said means acting in accordance with the speed of the car.

184. In an electric elevator system, a car, means for increasing the speed of the car, means comprising a contact for stopping the car, means for moving the contact in accordance with the movement of the car so as to initiate the stopping operation at a predetermined distance from a landing, and means for controlling said moving contact in response to the speed increasing means whereby said distance from the landing may be varied.

185. In a switching system, two electromagnetic switches having connected windings, a source of current, means for connecting the windings to said source, a circuit common to both windings for by-passing the connecting means, and means for preventing the completion of the by-pass circuit until both switches have operated.

186. In a switching system, two electromagnetic switches having connected windings, an electromagnet, a source of current, means for connecting said windings to said source, means responsive to the operation of the switches for connecting the winding of the electromagnet to the source and for establishing a holding circuit common to all the windings.

187. An elevator system comprising, means for stopping the car, an electromagnetic switch operable to cause the operation of said means, said electromagnetic switch having a winding, a switch in the car, and means responsive to the operation of said switch in the car for short circuiting the winding of the electromagnetic switch to cause the operation of the electromagnetic switch when the car arrives at its stopping distance from a landing.

188. A switching system comprising, two electromagnetic switches having connected windings, a source of current, means for connecting the windings to said source to cause the operation of a first of the switches, and means for by-passing the winding of the first switch to cause the operation of the second switch.

189. A switching system comprising, two electromagnetic switches having connected windings, means for energizing said windings sufficiently to cause the operation of a first of the switches, means for increasing the energization of the winding of the second switch sufficiently to cause the operation of said second switch, and means responsive to the operation of the second switch for deenergizing the winding of the first switch.

190. A switching system comprising, two electromagnetic switches having connected operated windings, a source of current, means for connecting the windings to said source to cause the operation of a first of the switches, means for shunting the winding of the first switch to cause the operation of the second switch, a holding winding for the second switch, and contacts on the second switch for connecting the holding winding to said source and for disconnecting the operating windings upon operation of said second switch.

191. A switching system comprising, three electromagnetic switches, a first and second of said switches having connected operating windings and the third of said switches having a winding and contacts, a source of current, means for connecting the operating windings of the first and second switches to said source to cause the operation of said first switch, means for shunting the operating winding of the first switch to cause the operation of the second switch, said second named means comprising the winding and contacts of the third switch, a holding winding for the second switch, contacts on the second switch for disconnecting said operating windings, and means comprising contacts on the second switch and the winding and contacts of the third switch for connecting the holding winding to said source to cause the operation of the third switch to separate its contacts disconnecting the winding of the third switch and the holding winding from said source.

192. A control system for an elevator car comprising, a motor for raising and lowering the car, a source of power for said motor, a stationary contact for each of a plurality of landings, a traveling contact adapted to engage the stationary contacts, means responsive to the engagement of the traveling contact and the stationary contacts to disconnect the motor from said source to stop the car at the landing corresponding to the stationary contact engaged, and means for causing the operation of the first named means to reconnect the motor to said source after the car has stopped at a landing, regardless of whether the traveling contact has engaged a stationary contact for another landing.

193. In an elevator system, hatchway door closing means, means for starting the elevator car, and a switch operable upon movement out of off position to cause the operation of the first named means and upon further movement to cause the operation of the second named means.

194. In an elevator system, car gate and hatchway door closing mechanism, means for starting the car, a plural position controller switch operable in one of its positions to cause the operation of said mechanism and in another position to cause the operation of said means, and means for preventing the operation of the first named means until said mechanism has completed its operation.

195. In an elevator system provided with power mechanism for operating the hatchway doors and with means for starting the car, a manually operable controller switch within the car, said switch having an off position and being arranged for movement in only one direction from off position to cause the operation of said mechanism to close the hatchway door for the landing at which the car is positioned and of said means to start the car.

196. In an elevator system provided with power mechanism for operating the hatchway doors and with means for starting the car, a manually operable controller switch within the car, said switch having an off position and being arranged for movement in one direction from off position to cause the operation of said mechanism to close the hatchway door for the landing at which the car is positioned and of said means to start the car and being further arranged to cause the operation of said mechanism to open said door when moved in the opposite direction from off position.

197. In an elevator system, a car, hatchway door opening means, means for bringing the car to a level with a landing in stopping, said second named means comprising means for causing the car to move at a fast leveling speed when beyond a certain distance from the landing and means for causing the car to move at a slow leveling speed upon arriving at said certain distance from the landing, and means, responsive to the operation of said means for causing the motor to run at a slow leveling speed, for causing the operation of the first named means.

198. In an elevator system provided with power operated hatchway door opening mechanism, a car, means for causing the car to stop at any one of a plurality of landings, said means comprising a two speed leveling switch, and means, responsive to the operation of said leveling switch to cause the car to run at a slow leveling speed during the stopping of the car at one of said landings, to cause the operation of said mechanism to open the door for said landing.

199. In an elevator system provided with power operated hatchway door opening mechanism, a car, means, including a leveling switch, for causing the car to stop at a landing, said leveling switch having fast speed contacts and slow speed contacts, and means responsive to the separation of said fast speed contacts during the operation of the leveling switch to cause the operation of said mechanism.

200. In a control system for an elevator car, means for starting the car and for stopping it at any one of a plurality of landings, means including a leveling switch for causing the leveling of the car with the landing at which the car is being stopped by the first named means, said leveling switch having contacts for causing, when in engagement, the operation of the car at a fast leveling speed and additional contacts for causing, when in engagement with the first named contacts separated, the operation of the car at a slow leveling speed, hatchway door opening mechanism, and means responsive to the separation of the first named contacts for causing the operation of said mechanism to open the door for said landing.

201. In an elevator system wherein the hatchway is provided with fast and slow speed leveling zones at the landings and wherein power mechanism is provided for causing the opening of the hatchway doors for the landings, a car, means for causing the car to stop at the landings, and means operable with the car in the slow speed leveling zone for a landing during the stopping of the car at said landing for causing the operation of said mechanism.

202. In an elevator system wherein the hatchway is provided with fast and slow speed leveling zones at the landings and wherein power mechanism is provided for causing the opening of the hatchway doors for the landings, a car, means for causing the car to stop at the landings, said means comprising leveling mechanism for causing the car to run at a fast leveling speed when in a fast speed leveling zone, and at a slow leveling speed when in a slow speed leveling zone, and means responsive to the operation of said leveling mechanism upon the movement of the car into the slow speed leveling zone for a landing during the stopping of the car at said landing for causing the operation of said power mechanism.

203. In an elevator system wherein the hatchway is provided with fast and slow speed leveling zones at the landings, the slow speed zone for each landing extending above and below the landing and the fast speed leveling zone extending above and below the slow speed zone, and wherein power mechanism is provided for causing the opening of the car gate and the hatchway doors for the landings, a car, a main motor therefor, an auxiliary motor therefor, means for causing the auxiliary motor to run at a fast leveling speed, means for causing the auxiliary motor to run at a slow leveling speed, means for causing the car to stop at a landing, said third named means comprising means for discontinuing the operation of the main motor and leveling mechanism for causing the operation of the first named means with the car in the fast speed leveling zone for said landing and for simultaneously causing the operation of the second named means and initiating the operation of the power mechanism with the car in the slow speed leveling zone for said landing.

204. A control system for an elevator car adapted to stop at a plurality of landings comprising, means for stopping the car, and means operated by the car for causing the operation of the stopping means, said last named means comprising means for each landing for causing the initial operation of the stopping means, and means common to all the landings for causing the final operation of the stopping means.

205. A control system for an elevator car comprising, means for slowing down and stopping the car at each of a plurality of landings, and means operated in accordance with the movement of the car for causing the operation of said slow down and stopping means, said last named means comprising a plurality of switches, one for each of said landings, for initiating the operation of said slow-down and stopping means to slow down the car as it approaches the respective landings and a switch common to all of said landings for causing the operation of said slow down and stopping means to stop the car at the landings for which slow down of the car has been initiated.

206. A control system for an elevator car comprising, a switch, means operable to stop the car automatically at a landing and in response to the operation of the switch to stop the car at another landing.

207. An elevator system comprising, means controlled by a switch for a landing for signalling the approach of the car to said landing after it has arrived within a predetermined distance from said landing and for causing the stopping of the car at said landing.

208. An elevator system comprising, an elevator car, a landing, a signal at said landing, a control switch for said landing, and signalling and stopping mechanism responsive to the operation of said control switch for causing the operation of said signal upon the arrival of the car within a predetermined distance from said landing and for causing the stopping of the car upon its arrival at said landing.

209. An elevator system comprising, an elevator car, a landing, a signal at said landing, a manually operable control switch at said landing, and signalling and stopping mechanism responsive to the operation of said control switch for causing the operation of said signal upon the arrival of the car within a predetermined distance from said landing and for causing the stopping of the car upon its arrival at said landing.

210. An elevator system comprising, an elevator car, a plurality of landings, a signal for each of said landings, a control switch for each of said landings, and signalling and stopping mechanism responsive to the operation of any one of said control switches for causing the giving of the signal for the landing corresponding to said one control switch operated, upon the arrival of the car within a predetermined distance from said landing, and for causing the stopping of the car upon its arrival at said landing.

211. An elevator system comprising, an elevator car, a plurality of landings, a signal at each of said landings, a stop switch at each of said landings, and stopping and signalling mechanism responsive to the operation of said stop switches for causing the stopping of the car at landings corresponding to the switches operated and the giving of the signal at each of such landings upon the arrival of the car within a predetermined distance therefrom.

212. An elevator system comprising, an elevator car, a plurality of landings, a signal at each of said landings, a stop switch at each of said landings, stopping and signalling mechanism responsive to the operation of said stop switches for causing the stopping of the car at landings corresponding to the switches operated and the giving of the signal at each of such landings upon the arrival of the car within a predetermined distance therefrom, and a switch within the car for causing the starting of the car after each stop.

213. An elevator system comprising, an elevator car, a plurality of landings, a signal at each of said landings, a control switch for each of said landings, and stopping and signalling mechanism responsive to said control switches for causing the stopping of the car at the landings corresponding to the control switches operated, in the natural order of said landings, regardless of the order in which the control switches are operated, and for causing the giving of the signal at each of such landings prior to the arrival of the car thereat.

214. An elevator system comprising, an elevator car, a plurality of landings, a signal at each of said landings, a stop switch at each of said landings, and signalling and stopping mechanism responsive to the operation of said stop switches for causing the stopping of the car at the landings corresponding to the stop switches operated, in the order of succession of landings, regardless of the order in which said stop switches are operated, and for causing the giving of said signals for landings at which stops are to be made upon the arrival of the car within a predetermined distance therefrom.

215. An elevator system comprising, a landing, an up signal for said landing, a down signal for said landing, an up control switch for said landing, a down control switch for said landing, and mechanism responsive to the operation of said up control switch for causing the operation of said up signal and the stopping of the car at said landing and responsive to the operation of said down control switch for causing the operation of said down signal and the stopping of the car at said landing.

216. An elevator system comprising, a signal at a landing for each direction of car travel, means for stopping the car, and means for causing the operation of the signal corresponding to the direction of travel of the car upon its approach and of the first named means to stop the car at the landing.

217. An elevator system comprising; a plurality of landings; an up signal at each of said landings; a down signal at each of said landings; an up control switch at each of said landings; a down control switch at each of said landings; and signalling and stopping mechanism responsive to the operation of any one of said up control switches for causing, during up car travel, the operation of the up signal at the landing corresponding to the up control switch operated, upon the arrival of the car within a predetermined distance from said landing, and for causing the stopping of the car upon its arrival at said landing and responsive to the operation of any one of said down control switches for causing, during down car travel, the operation of the down signal at the landing corresponding to the down control switch operated, upon the arrival of the car within a predetermined distance from the last specified landing, and for causing the stopping of the car upon its arrival at said last specified landing.

218. An elevator system comprising, a signal at a landing for each direction of car travel, means for stopping the car, and means for causing the operation of the signal corresponding to the direction of travel of the car upon its approach and of the first named means to stop the car at the landing, said last included means comprising a switch at the landing for each direction of car travel.

219. An elevator system comprising; a plurality of landings; an up signal at each of said landings; a down signal at each of said landings; an up stop switch at each of said landings; a down stop switch at each of said landings; and stopping and signalling mechanism responsive to the operation of said up stop switches for causing, during up car travel, the stopping of the car at landings corresponding to up stop switches operated and the giving of the up signal at each of such landings upon the arrival of the car within a predetermined distance therefrom and responsive to the operation of said down stop switches for causing, during down car travel, the stopping of the car at landings corresponding to down stop switches operated and the giving of the down signal at each of the last specified landings upon the arrival of the car within a predetermined distance therefrom.

220. An elevator system comprising, a signal at each landing for each direction of car travel, means for stopping the car, a switch at each landing for each direction of car travel, and means responsive to the operation of the switches for causing the operation of the signals upon the approach of the car and of the first named means to stop it at the landings corresponding to the switches operated.

221. An elevator system comprising, means for signalling the approach of the car and for stopping it at a landing regardless of its direction of travel, means operable to cause the operation of the first named means when the car approaches the landing from one direction, and means for preventing the operation of the first named means in response to the operation of the second named means when the car approaches the landing from the other direction.

222. An elevator system comprising, a signal at each landing for each direction of car travel, means for stopping the car, a switch at each landing for each direction of car travel, means responsive to the operation of the switches for causing the operation of the signals upon the approach of the car and of the first named means to stop the car at the landings corresponding to the switches operated, and means for preventing the operation of the second included means for one direction of car travel when the car is traveling in the other direction.

223. An elevator system comprising; a plurality of landings; an up signal at each of said landings; a down signal at each of said landings; an up stop switch at each of said landings; a down stop switch at each of said landings; stopping and signalling mechanism responsive to the operation of said up stop switches for causing, during up car travel, the stopping of the car at landings corresponding to up stop switches operated and the giving of the up signal at each of such landings upon the arrival of the car within a predetermined distance therefrom and responsive to the operation of said down stop switches for causing, during down car travel, the stopping of the car at landings corresponding to down stop switches operated and the giving of the down signal at each of the last specified landings upon the arrival of the car within a predetermined distance therefrom, and means for preventing response of said mechanism to down stop switches during up car travel and to up stop switches during down car travel.

224. An elevator system comprising, a signal at a landing, a signal within the car, means for stopping the car, means operable to cause the operation of the signals and of the first named means to stop the car at the landing, and a switch for causing the operation of the second named means.

225. An elevator system comprising, an elevator car, a landing, a signal without the car for said landing, a signal within the car for said landing, a control switch for said landing, and means responsive to the operation of said control switch for causing the immediate operation of the signal within the car, the operation of the signal without the car upon the arrival of the car within a predetermined distance from said landing and the stopping of the car upon its arrival at said landing.

226. An elevator system comprising, a signal at a landing, a signal within the car for a landing, means for stopping the car, means operable to cause the operation of the signal at the landing upon the car approaching the landing and to cause the operation of the first named means to stop the car at the landing, and a switch for causing the operation of the signal within the car and the operation of the second named means.

227. An elevator system comprising, a signal at a landing, a signal within the car for a landing, means for stopping the car, a switch, means operable in response to the operation of the switch for causing the operation of the signals and for causing the operation of the first named means to stop the car at a landing.

228. An elevator system comprising, a signal at a landing, an annunciator signal within the car, means for stopping the car, means operable to cause the operation of the signal at the landing upon the car arriving at a predetermined distance from said landing and to cause the operation of the first named means to stop the car at the landing, a switch at the landing, and means operable in response to the operation of the switch for causing the immediate operation of the annunciator signal and for causing the operation of the second named means.

229. An elevator system comprising, an elevator car, a landing, an annunciator signal for said landing within the car, a signal at said landing, a manually controlled stop switch at said landing, an electromagnetic switch for said landing responsive to the operation of said stop switch to cause the immediate operation of said annunciator signal, and signalling and stopping mechanism responsive to the operation of said electromagnetic switch for causing the operation of the signal at the landing upon the arrival of the car within a predetermined distance from said landing and the stopping of the car upon its arrival at said landing.

230. An elevator system comprising, a signal at each of a plurality of landings, an annunciator signal for each landing, means for stopping the car, a switch at each landing, and means responsive to the operation of the switches for causing the operation of the signals for the respective landings and the operation of the stopping means to stop the car at the respective landings.

231. An elevator system comprising, means for stopping the car at a landing, and means for signalling the approach of the car and for stopping it at the landing.

232. An elevator system comprising, a switch in the car, means responsive to the operation of the switch for stopping the car at a landing, a switch without the car, and means responsive to the operation of the last named switch for signalling the approach of the car and for stopping it at the landing.

233. An elevator system comprising, signalling means for the car, means for stopping the car, means for causing the operation of the first and second named means to signal the approach of the car and to stop it at a landing, and means for causing the operation of the second named means to stop the car at the landing.

234. An elevator system comprising, means for starting and stopping the car, a signal, means for causing the operation of the signal and for causing the operation of the first named means to stop the car, a switch, and means responsive to the operation of said switch for discontinuing the operation of the signal, said first named means operating in response to said switch to start the car.

235. An elevator system comprising, means for starting and stopping the car, a signal within the car, a signal without the car, means for causing the operation of the signals and for causing the operation of the first named means to stop the car, a switch, and means responsive to the operation of said switch for discontinuing the operation of the signals, said first named means operating in response to said switch to start the car.

236. An elevator system comprising, a signal within the car, a signal without the car, a switch, means operable in response to the operation of said switch for causing the operation of the first named signal, means responsive to the operation of the first named means for causing the operation of the second signal, means for retaining the first named means operated, and means for releasing the retaining means to discontinue the operation of both signals.

237. In combination, a plurality of push button switches, an electro-magnet common to the switches for retaining them in closed positions, and means for deenergizing the electromagnet to release the switches.

238. A control system for an elevator car comprising, means for stopping the car at the landings, said means comprising a plurality of hand operated switches, and means for retaining the switches in closed positions until a terminal landing is reached.

239. A control system for an elevator car comprising, means for stopping the car at the landings, said means comprising a plurality of hand operated switches, means for retaining the switches in closed positions, and means for releasing the switches upon the arrival of the car at a terminal landing.

240. A control system for an elevator car comprising, means for stopping the car at the landings, said means comprising a plurality of hand operated switches, an electromagnet for retaining the switches in closed positions, a source of current, and means for disconnecting and thereafter connecting the winding of the electromagnet to the source upon the arrival of the car at a terminal landing.

241. A brush comprising, contacting means, means for pivotally supporting said contacting means, and yielding means for biasing said contacting means to central position.

242. A brush comprising, a frame, a pair of contact members pivotally mounted in said frame, and yielding means mounted on said frame for biasing the contact members to central position.

243. A brush comprising, a frame, a pair of contact members, a pivotal support for the contact members, insulating means for securing the support to the frame, yielding means mounted on the frame for biasing the contact members to central position and means for insulating the yielding means from the contact members when the latter are rocked in one direction.

244. A brush comprising, a pair of contact members, slots extending longitudinally of said members, a pin extending through the slots forming a pivot for the contact members, a support for the pin, yielding means for maintaining the pin against an end of each slot, and additional yielding means for maintaining the contact members in central position.

245. An electromagnetically operated device comprising, an electromagnet, a pair of armatures pivotally mounted at opposite ends of said electromagnet and adapted to be attracted thereby, a pivotally mounted arm adjustably secured to each armature, brushes carried by each arm, means for biasing each armature to unattracted position, and means adjustably secured to each arm for determining said unattracted positions.

246. A switching device comprising, a plurality of stationary contacts, a traveling member, a traveling contact carried by said member, mechanism for moving said member to cause the successive engagement of the traveling contact with each of the stationary contacts at certain points in the travel of said member, and means for causing the engagement of the traveling contact with each stationary contact at different points in the travel of said member.

247. A switching device comprising, a plurality of stationary contacts, a traveling contact, mechanism for moving the traveling contact to cause its engagement with each stationary contact, and means for causing earlier engagement of the traveling contact and each stationary contact than is caused by said mechanism.

248. A switching device comprising, a plurality of stationary contacts, a traveling contact, mechanism for moving the traveling contact to cause its engagement with each stationary contact, and means for advancing the traveling contact to cause earlier engagement of the traveling contact and each stationary contact than is caused by said moving mechanism.

249. A switching device comprising, a plurality of stationary contacts, two traveling contacts for engaging the stationary contacts, mechanism for moving the traveling contacts in two directions, and mechanism for advancing the traveling contacts to cause the earlier engagement of one of the traveling contacts and the stationary contacts when the traveling contacts are moving in one direction and to cause the earlier engagement of the other traveling contact and the stationary contacts when the traveling contacts are moving in the other direction.

250. A switching device comprising, a series of stationary contacts, a traveling contact for engaging said stationary contacts, a second series of stationary contacts, a second traveling contact for engaging the second stationary contacts, mechanism for moving the traveling contacts in two directions, and means for advancing the traveling contacts to cause the earlier engagement of the first traveling contact and the first stationary contacts, with the traveling contacts moving in one direction, and to cause the earlier engagement of the second traveling contact and the second stationary contacts, with the traveling contacts moving in the other direction.

251. An electromagnetically operated device comprising, an electromagnet, a pair of armatures pivotally mounted at opposite ends of said electromagnet and adapted to be attracted thereby, means for biasing each armature to unattracted position, and means for initially aiding the biasing means to move the armatures to unattracted position.

252. A switching device comprising, a switch, and means for operating said switch, said means comprising a plurality of engageable members and a traveling member adapted to successively engage each of said engageable members to cause the operation of said switch upon each engagement.

253. A switching device comprising, a stationary contact, a movable contact adapted to engage the stationary contact, said movable contact being normally biased to engaged position, and means for operating the movable contact to disengaged position, said means comprising a plurality of engageable members and a traveling member adapted to successively engage each of said engageable members to cause the operation of said movable contact upon each engagement.

254. A switching device comprising, a switch, means for operating said switch, said means comprising a plurality of engageable members and a traveling member adapted to successively engage each of said engageable members to cause the operation of said switch upon each engagement, and means for preventing the engagement of said traveling member and said engageable members.

255. A switching device comprising, a switch, means for operating said switch, said means comprising a plurality of engageable members and a traveling member adapted to successively engage each of said engageable members to cause the operation of said switch upon each engagement, and means for preventing the engagement of said traveling member and said engageable members, said means comprising an electromagnet.

256. A switching device comprising, a stationary contact, a movable contact for engaging the stationary contact, a second stationary contact, a second movable contact adapted to engage the second stationary contact, means for biasing each movable contact to engaged position, and means for successively operating the movable contacts to disengaged positions, said means comprising a plurality of engageable members and a traveling member adapted to successively engage each of said engageable members to cause the operation of the first movable contact and then the second movable contact upon each engagement.

257. A switching device comprising, a switch, a second switch, and means for operating said switches, said means comprising, a group of engageable members for each switch, a traveling member for each of said groups, and means for moving said traveling members in two directions, one traveling member being adapted to successively engage the engageable members of its group to cause the operation of the first switch upon each engagement, when the traveling members are moving in one direction, and the other traveling member being adapted to successively engage the engageable members of its group to cause the operation of the second switch upon each engagement, when the traveling members are moving in the other direction.

258. A switching device comprising, a pair of switches, means for operating each of said switches, said means comprising an operating rod for each switch, and means for balancing one rod against the other.

259. A switching device comprising, a pair of switches, means for operating each of said switches, said means comprising an operating rod for each switch, and means for balancing one rod against the other, said means comprising means for connecting the rods together.

260. In combination, a switching device, a second switching device, a rod having a normal position and a position for causing the operation of the first switching device, a second rod having a normal position and a position for causing the operation of the second switching device, and means for partially balancing the weight of one rod against the weight of the other, said means comprising means for connecting the rods, the unbalanced portion of the weight of the rods acting to bias the rods to their normal positions.

261. In combination, a switching device, a second switching device, a rod having a normal position and a position for causing the operation of the first switching device, a second rod having a normal position and a position for causing the operation of the second switching device, means for partially balancing the weight of one rod against the weight of the other, said means comprising means for connecting the rods, the unbalanced portion of the weight of the rods acting to bias the rods to their normal positions, and an adjustable stop for determining the normal positions of both rods.

262. A switching device comprising, a pair of switches, means for operating one of said switches, said means comprising, a rod, means for operating the other of said switches, said second named means comprising a second rod, means for causing the operation of the first named means, and means connecting the rods for causing the operation of the second named means.

263. A switching device comprising, a switch, and means for operating said switch, said means comprising, a plurality of engageable members, a pair of levers, a pivotal mounting for each lever, a support for the engageable members, said support being connected at each end to said levers, a traveling member adapted to successively engage each of said engageable members to cause the operation of said switch upon each engagement, and mechanism for moving said traveling member, the parts being so constructed and arranged that, upon excessive movement of the traveling member when in engagement with an engageable member, the levers are moved about their pivots to cause the disengagement of the traveling member and said engageable member.

264. In an elevator, the combination of a car, hoisting means for the car, means for driving the hoisting means, means corresponding to different landings for automatically slowing down the car as it approaches the landing, means for accurately levelling the car with the landings, and selective means within the car for placing in operative condition any desired number of such car slow-down means.

265. In an elevator, the combination of a car, an electric hoisting motor for the car, means corresponding to different landings for automatically slowing down the car as it approaches its corresponding landing, levelling switching mechanism for the car operated to accurately level the car with the landings, and selective means within the car for setting any desired number of such slow-down means in condition to be automatically operated at the time the car successively approaches the corresponding landings.

266. In an electric elevator, the combination of an elevator car, and an electric hoisting motor for the car, of an automatically operated switching mechanism for decelerating the car as it approaches the landings, switching mechanism operated to automatically accurately level the car with the landings, an automatic door opening mechanism, and relay mechanism for closing the circuit to operate said door opening mechanism during operation of the car levelling switching mechanism.

267. In an electrically controlled elevator, the combination with an elevator car and an electric hoisting motor for the car, of electric control mechanism therefor, comprising both hall and car signalling means, a master switching mechanism responsive to either of said means for transferring stopping impulses or signals to a car decelerating switching mechanism, such decelerating switching mechanism having switching means for progressively decreasing the power to said motor, and a car levelling switching mechanism.

268. In an electric elevator, the combination with an elevator car, of an electric control mechanism therefor, including a car levelling switching mechanism, a car decelerating switching mechanism, and means for varying, the distance during which said decelerating mechanism operates, in accordance with variations in speed of the car.

269. In an elevator system, the combination with a car and controlling means therefor, of automatic means for dispatching the car to all floors, a plurality of manually operable switches for excluding certain floors, and additional means for effecting and maintaining a predetermined car level at each floor.

270. In an elevator system, the combination with a car and controlling means therefor, of means for initiating up and down motions of the car, automatic means for stopping said car at any floor, means for predetermining a definite schedule of stops, means for changing said schedule to include any floor, and additional means for effecting and maintaining a predetermined car-level at each floor.

271. In an elevator system, the combination with a plurality of cars, of means for initiating the up and down motion of each car, means for stopping any of said cars at any floor in response to a call, and means for preventing more than one car moving in the same direction from stopping at said floor in response to the same call.

272. A control system for a plurality of elevator cars comprising a plurality of stop controls, each for a different landing for controlling the stopping of a car at the landings for which stop controls are operated, and means for preventing other cars moving in the same direction from stopping at said landing in response to the same stop control.

273. A control system for a plurality of elevator cars comprising a plurality of stop controls, each for a different landing for controlling the stopping of any of said cars at the landings for which stop controls are operated, and means effective upon the stopping of a car for preventing other cars moving in the same direction from stopping at said landing in response to the same operation of the stop control.

274. In an elevator system, the combination with a plurality of cars, of means for initiating the up and the down motion of each car, means for stopping at any floor in response to a call, and means for preventing the other cars moving in the same direction from stopping at said floor in response to the same call.

275. A control system for a plurality of elevator cars comprising, common controlling means for all the cars, means responsive to the operation of the common controlling means for stopping one of the cars at a landing, and means for preventing the stopping of the other cars in response to the operation of the common controlling means after the first named car has stopped at the landing.

276. A control system for a plurality of elevator cars comprising, means for stopping the cars, means for causing the operation of the first named means to stop each car at a landing, said second named means being controlled from the respective cars, and means controlled from without the cars for causing the operation of the first named means to stop the car first to arrive at its stopping distance from the landing.

277. A control system for a plurality of elevator cars comprising, means for starting and stopping each car, a switch for each car for causing the operation of the first named means to start the respective cars, and means for causing the operation of the first named means to stop each car at a landing, said last named means comprising means common to all the cars.

278. In a control system for a plurality of elevators operable past a plurality of floors, means individual to each of said elevators for starting said elevator, and manually operable means for said floors common to all of said elevators for stopping the first of said elevators to arrive at the corresponding floor.

279. In a control system for a plurality of elevators operable past a plurality of floors, means individual to each of said elevators for starting said elevator, and manually operable means at said floors common to all of said elevators for stopping the first of said elevators to arrive at the corresponding floor.

280. In a control system for a plurality of elevators operable past a floor, means individual to each of said elevators for starting said elevator, means common to all of said elevators for stopping the first of said elevators to arrive at said floor, and means on each of said elevators for stopping only the associated elevator at said floor.

281. In a control system for a plurality of elevators operable past a floor, means individual to each of said elevators for starting said elevator in either direction, up-call means and down-call means at said floor common to all of said elevators for stopping the first of said elevators to arrive at said floor traveling in the corresponding direction.

282. In a control system for a plurality of elevators operable past a floor, means individual to each of said elevators for starting the associated elevator, means common to all of said elevators for stopping the first of said elevators to arrive at said floor traveling in one direction, and means on each of said elevators for stopping said elevator at said floor when traveling in either direction.

283. In a control system for elevators, a car operable between a plurality of floors, control means for said car, means for actuating said control means to start said car in either direction, means at said floors for actuating said control means to stop said car at the corresponding floor when said car is moving in one direction, means at said floors for actuating said control means to stop said car at the corresponding floor when said car is moving in the other direction, and a single means for each of said floors on said car for actuating said control means to stop said car at the corresponding floor when traveling in either direction.

284. In an elevator system, the combination with a plurality of cars and controlling means therefor comprising means for dispatching all cars to a desired landing, of means for stopping said cars at said landing and means controlled by the first car to arrive at said landing for rendering said stopping means ineffective to stop the other cars.

285. In an intercepting control system, the combination with a bank of cars, a hoisting motor for each car, electro-magnetically operable reversing switches for each hoisting motor maintained closed by a self-holding circuit to continue movement of the car automatically, a circuit-controller in said self-holding circuit of each car system, two hall push-buttons at each intermediate landing, all of said buttons at any landing which correspond as to direction being interconnected whereby any car of the bank first to reach landings at which buttons are pressed and whose direction of travel corresponds to the buttons pressed, will be automatically intercepted at such landings, by actuation of the said circuit-controller of said first car to open said self-holding circuit.

286. In an intercepting control system, the combination with a bank of cars, a hoisting motor for each car, reversing switch mechanism for each motor, manual means in each car to control its reversing mechanism to effect car starts, means to maintain said reversing mechanism closed independently of said manual means, to continue movement of the car automatically, one "up" and one "down" hall push-button for each intermediate landing, and floor stopping switches for each car, all of which for any one landing which correspond as to direction are electrically interconnected and controlled by said two buttons per landing, whereby any such moving car of the bank which is first to reach landings at which buttons are set and whose direction of travel corresponds to the button set will be intercepted by actuation of said maintaining means to effect opening of the reversing switch mechanism of such first car.

287. In an intercepting control system, the combination with a bank of cars, a hoisting motor for each car, reversing switch mechanism, for each hoistway motor maintained closed automatically to effect floor to floor car movement, an electro-responsive device, one for each system, to control said maintaining means to open its reversing switch mechanism, "up" and "down" floor-control circuit controllers for each car controlled in accordance with the car's position, one "up" and one "down" hall-button for each intermediate landing served, "up" and "down" circuits interconnecting all corresponding floor-control circuit controllers for each intermediate landing and including said two hall-buttons, and an energizing circuit for said electro-responsive device divided to form said "up" and "down" circuits, and switch mechanism to control said divided circuits for each car, controlled automatically at the limits and manually at any intermediate point of travel to render said electro-responsive device subject to energization only by the control hall-buttons at landings toward which the car is traveling and which correspond to direction of car movement.

288. In an intercepting control system, the combination with a bank of cars, a hoisting motor for each car, a pair of reversing switches for each motor, having an operating winding, "up" and "down" direction switches controlled automatically by each car at its limits and manually at any intermediate points of travel, to control circuits for the respective reversing switch windings and so established direction for car travel, a single circuit-controller in each car operable manually to effect car starts, operable by closing an energizing circuit for the respective reversing switch windings dependent on whichever direction switch is set in closed position, means to maintain said reversing switch mechanism closed independently of the car switch to continue movement of the car, and means comprising car actuated "up and down" floor controlling means for each car for each landing, all of which for any one floor which correspond as to direction are interconnected, and one "up" and one "down" hall-button at each intermediate landing served to control all corresponding interconnected means whereby any such moving car of the bank which is first to reach any landings at which buttons corresponding to direction of car movement are pressed, will be automatically intercepted at such landings by actuation of its maintaining means to effect opening of its reversing switch.

289. In an intercepting control system, the combination with a bank of cars, a hoisting motor for each car, a pair of reversing switches for each motor, each having an operating winding, electro-magnetically operable "up" and "down" direction switches having energizing circuits controlled automatically by the car at its limits, and manually at any intermediate point of travel to control circuits for the respective reversing switch windings and so established direction for car travel, a single switch in each car to effect car starts, operable to close an energizing circuit for one of its respective reversing switch windings dependent on whichever direction switch is closed, means to maintain said reversing switch closed independently of said single switch to effect a continuation of car movement automatically, interconnected selectively operable floor-stop controlling mechanism for all the cars which form the bank, controlled in accordance with car position, one "up" and one "down" hall push-button for each intermediate landing to control said interconnections between all of said floor-stop mechanisms, whereby any car of the bank during its course of travel, which is first to reach any landings at which the hall-buttons are set and whose direction of movement corresponds to the buttons set, will be automatically intercepted thereat by actuation of said maintaining means to open the reversing switch.

290. In an intercepting control system, the combination with a car, a hoisting motor therefor, reversing switches for said motor, a single switch in the car to initiate closing of a reversing switch to effect car start, means controlled by said single switch to maintain such closed reversing switch in such position to effect a continuation of car movement after said single switch is released, and selectively operable car and hall push-buttons and circuits to effect automatic car stops successively at any landings toward which movement of the car is directed, each button having contactors arranged to remain in actuated position when the buttons are released to effect car stops at their corresponding landings, and means for automatically re-setting said contactors to an ineffective or normal position, whereby said contactors remain ineffective during movement of the car away from their corresponding landings.

291. In an intercepting control system, the combination with a car, a hoisting motor therefor, reversing switches for said motor, a single switch in the car to initiate its start by effecting actuation of the reversing switch mechanism, means rendered operable by said single switch to maintain the closed reversing switch in such position automatically to continue movement of the car independently of said single switch, means to control said maintaining means to open said closed reversing switch, and selectively operable car and hall push-buttons and apparatus to control said control means to effect car stops successively at any landings toward which movement of the car is directed.

292. In an intercepting control system, the combination with a car, a hoisting motor therefor, reversing switch mechanism, a single switch in the car to initiate its start by effecting actuation of a reversing switch, means rendered operable by said single switch to maintain such closed reversing switch in said position to continue movement of the car when said single switch is released, and means comprising selectively operable car and hall-buttons having contactors, and circuits to control said maintaining means to effect only automatic car stops, push-button contactors which correspond to landings toward which the car is moving, remaining set after release of the button to effect a car stop, and means controlled by the car automatically to re-set said push-button contactors.

293. In an intercepting control system, the combination with a car, a hoisting motor therefor, reversing switch mechanism, a single switch in the car to initiate its start by effecting actuation of a reversing switch, means rendered operable by said single switch to maintain such closed reversing switch in said position to continue movement of the car when said single switch is released, and means comprising selectively operable car and hall-buttons having contactors, and circuits to control said maintaining means to effect only automatic car stops, any push-button contactors which correspond to landings toward which the car is moving, remaining set after release of the button, to effect a car stop, and electro-magnetic means controlled automatically by the car to re-set said push-button contactors.

294. In an intercepting control system, the combination with a car, a hoisting motor, reversing switch mechanism, a single switch in the car to initiate its start by effecting actuation of the reversing mechanism, means to maintain such closed reversing mechanism in such position to continue movement of the car automatically, and means comprising "up" and "down" hall-buttons having contactors at each intermediate landing to control said maintaining means to effect automatic car stops successively and selectively at landings toward which the car is moving, the contactors of said buttons at any landing toward which the car is moving remaining in set or actuated position when its button is released, a re-set winding for each hall-button, and means controlled by the car to close an energizing circuit for said re-set winding of each button substantially at the time it effects a car stop.

295. In an intercepting control system, the combination with a bank of cars, hoisting motor mechanism therefor, motor controlling means for each car, means comprising one "up" and one "down" hall-button for each intermediate landing, to control circuits interconnecting the motor controlling means of all the cars which form the bank, whereby actuation of any button at any landing, intercepts thereat any car of the bank which is first to reach same and whose direction of travel corresponds to the button pressed, said buttons having contactors arranged to remain in actuated position after the button is released, a re-set winding for each button and circuits therefor, whereby such first car of the bank which is so stopped thereby closes an energizing circuit for the corresponding button which effected such stop, to open such push-button contactors.

296. In an intercepting control system, the combination with a bank of cars, hoisting motor mechanism therefor, motor controlling means for each car, means comprising one "up" and one "down" hall-button for each intermediate landing served, and contactors actuated thereby arranged to remain in actuated position after release of the buttons, a re-set winding for the contactors, each "up" and "down" push-button and circuits interconnecting the motor controlling means of all cars which form the bank and including said re-set windings, controlled by said two buttons per landing in a manner whereby any car of the bank which is first to reach landings and whose direction of travel corresponds to the button pressed thereat, will be intercepted and substantially at the same time will cause the energization of the re-set winding of the contactors of the button which effected such result.

297. In an intercepting control system, the combination with a bank of cars, hoisting motor mechanism therefor, car controlled floor-control switches, selectively operable car buttons for each car, one "up" and one "down" hall-button for each intermediate landing served, both the car and hall-buttons having contactors remaining in actuated position after release of the buttons, circuits controlled by the car-buttons individual to their own particular floor-control switches only, to effect automatic stops of the car successively at any landings toward which movement of the car is directed, a re-set winding individual to each hall-button, additional circuits interconnecting for any one landing the floor switches which correspond as to direction for all cars and including said re-set windings and the "up" and "down" hall-buttons contactors, whereby any car of the bank which is first to reach landings and whose direction of travel corresponds to the buttons pressed thereat, will be intercepted and substantially at the same time will cause the energization of the re-set windings of the contactors of the hall-buttons which effects the intercepting operation of the car, and means controlled by each car to re-set its own car-buttons exclusively.

298. In an intercepting control system, the combination with a bank of cars, hoisting motor mechanism therefor, reversing mechanism for each hoisting motor having a self-holding circuit to effect travel of its car automatically, an electro-magnetically operable stop-switch, one for each car in said self-holding circuit, and means for each car to control its stop switch to effect car stops automatically and selectively at any landing toward which direction of car travel is established, said means comprising selectively operable car buttons and car-controlled floor-stop contactors, such car buttons and floor-stop contactors for any one car functioning to control stop of its own car exclusively, one "up" and one "down" hall push-button at each intermediate landing served, car controlled floor-stop contactors, and circuits which for any one landing interconnect floor-stop contactors of all the cars which correspond as to direction, and are controlled by said two hall-buttons per landing, so that any car which is first to reach landings at which buttons are pressed and whose direction corresponds to the buttons pressed, will be intercepted thereat.

299. In an intercepting control system, the combination with a bank of cars, a hoisting motor for each car, a self-holding operating control circuit for each motor to continue automatic car travel subsequently to manually controlled start of its car, an electro-magnetically operable switch for each system to open its self-holding circuit to effect car stops, one "up" and one "down" hall-button for each intermediate landing served, "up and down" floor stop mechanism for each car controlled in accordance with car position, all such mechanisms for any one landing which correspond as to direction being interconnected and controlled by said two hall-buttons per landing to control said electro-magnetic switch of each system to open its self-holding circuit and thereby effect stop of its car, and means whereby said floor mechanism of any car of the bank is rendered ineffective at will to open its self-holding circuit so that any car is rendered independent of the stopping effect of the hall-buttons and will continue its travel automatically as express, said stopping effect of said buttons being in this manner transferred and effective automatically to stop another car of the bank.

300. In an intercepting control system, the combination with a bank of cars, a hoisting motor for each car, a single control means for each car to control its motor to effect automatic car travel, an electro-magnetically operable switch for each system to control said means to effect stop of its car, and selectively operable means to control said electro-magnetic switch to effect stops of any car of the bank which is first to reach landings at which buttons are pressed and whose direction of travel corresponds to such pressed buttons, said means comprising one "up" and one "down" hall-button for each intermediate landing served, "up and down" floor control switches for each car controlled by its position, all for any one landing, which correspond as to direction being electrically interconnected and such inter-connection being common to said two hall-buttons whereby said two-buttons control the stop for all the cars which form the bank which are so interconnected, and means whereby said floor control switches for any car are rendered ineffective to control their associated electro-magnetic stop switch to effect stop of their car so that such car is thereby rendered independent of the stopping effect of the hall-buttons at any landing and will continue as express, said stopping effect of the hall-buttons being in this manner transferred and effective automatically to stop another car of the bank.

301. In an intercepting control system, the combination with a bank of cars, a hoisting motor for each car, reversing switch mechanism for each motor, means for each car to maintain a closed reversing switch in such position to effect automatic car movement, means for each car system to control said maintaining means to open such closed reversing switch to effect stop of its corresponding car, and means to control said second named means to effect car stops successively at all landings toward which cars are moving, comprising one "up" and one "down" hall-button for each intermediate landing, floor-control circuit-controllers and circuits for each car, all for any one landing which correspond as to direction being electrically interconnected and controlled by said two-buttons, car buttons for each car, and floor-control contactors and circuits controlled thereby rendered operable by said car buttons to control said second named means independently of said interconnected hall push-button controlled system of circuits.

302. In an intercepting control system, the combination with a bank of cars, a hoisting motor for each car, "up" and "down" reversing switches for each motor, each having an operating winding, control means for each car system to control self-holding circuits for its reversing switch windings whereby car movement is continued automatically subsequently to start initiated by manual control, an electro-magnetically operable switch for each system to control its said self-holding circuits to effect stops of its associated car, floor-control circuit-controllers for each car actuated in accordance with the position thereof, all for any one landing which correspond as to direction being electrically interconnected by control circuits for said electro-magnetic stop switch, one "up" and one "down" hall-button for each intermediate landing to control said interconnections to control car stops for all the cars which form the bank, selectively operable car buttons for each car, floor-control contactors and circuits controlled thereby, controlled by said car buttons, said car-button controlled circuits for each car system controlling its associated electro-magnetic stop switch independently of the hall-button controlled circuits, so that said car buttons for any car control its stop exclusively, and said two hall-buttons per landing control stops for all cars which form the bank.

303. In an intercepting control system, the combination with a bank of cars, a hoisting motor for each car, a single circuit-controller in each car to control car starts, a set of selectively operable car buttons for each car to control only its stops, one "up" and one "down" hall-button for each intermediate landing to control the hoisting motors of all the cars which form the bank to control for all of said cars their stops only, so that any car of said bank which is first to reach landings at which buttons are pressed, and whose direction of travel corresponds to buttons pressed, will be the car so stopped, a re-set winding, individual to each hall-button, and means whereby any ascending car of the bank so stopped will substantially at the same time close an energizing circuit for the re-set winding of the "up" button which so effected its stop, and any descending car of the bank so stopped will substantially at the same time close an energizing circuit for the re-set winding of the "down" button which so effected its stop.

304. In in intercepting control system, the combination with a bank of cars, a hoisting motor for each car, a single switch in each car to control its start, means for each car rendered operable by said single switch to continue movement of the car automatically when said switch is centered, an electro-magnetically operable stop switch for each system to control the above named means to effect car stops, "up" and "down" floor-control circuit-controllers for each car system to control an energizing circuit for its associated stop-switch, said circuit controllers being normally open-circuited and closing said energizing circuit momentarily and in accordance with the car's position, all of said floor-control circuit-controllers for any one landing which correspond as to direction being electrically interconnected, and one "up" and "down" hall push-button for each intermediate landing to control said interconnections so that the control of all of said cars which form the bank is subject to the control of said two hall buttons per landing.

305. In an intercepting control system, the combination with a bank of cars, a hoisting motor for each car, a single switch in each car to control its starts, means for each car rendered operable by said switch automatically to continue car travel from floor to floor when said switch is centered, an electro-magnetically operable stop-switch for each system to control said means to intercept said car during its course of travel, "up and down" floor-control circuit-controllers for each car controlled in accordance with its movement to control an energizing circuit for said stop-switch, said circuit-controllers being normally open-circuited and all for any one landing which correspond as to direction being connected in parallel by "up" and "down" wires, one "up" and one "down" hall push-button having contactors for each intermediate landing to control said interconnecting "up" and "down" wires therefor whereby any car of the bank which is first to reach landings will be automatically intercepted thereat provided its direction of travel corresponds to the button pressed, said hall-button contactors being maintained mechanically in actuated position when their buttons are released, a re-set winding for each button, and means whereby any car of the bank which is so stopped will substantially at the same time close an energizing circuit for the hall-button winding which effected the stop and thereby energize its re-set winding.

306. In an intercepting control system for an elevator motor having variable speed regulation, the combination with the car, a hoisting motor therefor, a single switch in the car to initiate car starts and render fast speed operation effective so that the car will continue its travel at fast speed automatically when said single switch is released from manual operation, and means comprising push-button controlled floor-control circuit-controllers actuated in accordance with the position of the car to effect automatic slow-down selectively at any desired predetermined point.

307. In an intercepting control system for an elevator motor having variable speed regulation, the combination with the car, a hoisting motor therefor, a single switch in the car to initiate car starts and render fast speed operation effective so that the car will continue its travel at fast speed automatically when said single switch is released from manual operation, and means comprising push-button controlled floor-control circuit-controllers actuated in accordance with the position of the car to effect automatic slow-down selectively at any desired predetermined point, and means subject to the control of said slow-down control means to effect car stops.

308. In an intercepting control system for an elevator motor having variable speed regulation, the combination with the car, a hoisting motor therefor, speed controlling means controlled to effect floor to floor movement of the car automatically at its fast speed rate, means to control said speed controlling means to effect automatic slow-downs selectively and successively at predetermined points related to landings toward which the car is traveling comprising car and hall push-button actuated circuit-controllers, all of which correspond to landings toward which the car is moving remaining in actuated position when their buttons are released and being automatically re-set by the car, and circuit-controlling mechanism actuable in accordance with the position of the car.

309. In an intercepting control system for an elevator motor having variable speed regulation, the combination with a car, a hoisting motor therefor, means to control fast speed operation of the car to continue its travel at such speed automatically from floor to floor, means to control the above means to effect automatic slow-downs successively and selectively with respect to any landings toward which the car is moving comprising car and hall push-button contactors maintained in set position when their buttons are released and being automatically re-set by the car, circuit-controllers remote from the car but actuated thereby and rendered effective by said buttons to effect said slow-downs, circuit-controllers to control car stops, and camming means controlled to assume an inoperative position, and rendered effective by said fast speed controlling means to actuate said car stop circuit controllers in accordance with movement of the car.

310. In an intercepting control system for an elevator motor having multi-speed regulation, the combination with the car, a hoisting motor, a single operating lever in the car, means rendered operable thereby to control the speed of the car and effect floor to floor movement thereof automatically at its fast speed rate, an electro-responsive device to control said means to effect automatic slow-downs of such automatically moving car, means to control said electro-responsive device to effect such automatic slow-downs selectively and successively at all landings toward which the car is moving comprising car and hall push-button contactors maintained in set position when their respective buttons are released and being automatically re-set, means actuated in accordance with the car position subject to the control of the car and hall-buttons to effect such slow-downs, and floor-stop circuit-controllers controlled in accordance with car position and rendered effective by said electro-responsive means to effect car stops.

311. In an intercepting control system for an elevator motor having multi-speed regulation, a single manually operable circuit-controller in the car, means rendered operable thereby to control the speed of the car to maintain movement thereof automatically at its fast speed rate, an electro-responsive device to control said maintaining means to effect automatic slow-down of such automatically moving car, car and hall push-button contactors maintained in set position when their buttons are released, circuit-controllers remote from the car and controlled thereby in accordance with its movement, subject to the control of said car and hall push-buttons to control said electro-responsive slow-down device to effect automatic slow-downs successively at predetermined points related to landings toward which the car is moving and as selected by such set push-button contactors, floor-stop switch mechanism, camming means to actuate said switches, and electro-responsive means controlled to render said camming means effective to actuate said floor-stop switch mechanism only when the car is at predetermined selected positions.

312. In an intercepting control system for an elevator motor having multi-speed regulation, a single manually operable circuit-controller in the car, means rendered operable thereby to maintain car operation at its fast speed rate automatically, a normally closed switch to control said maintaining means to effect automatic slow-downs of the car, an operating winding therefor, and push-button controlled circuits and circuit-controllers actuable in accordance with the movement of the car, normally open-circuited and controlled by the car momentarily to close an energizing circuit for said winding to effect operation of said normally closed switch to effect automatic slow-downs at predetermined points.

313. In an intercepting control system for a bank of cars having multi-speed regulation, each system comprising a single circuit-controller in the car to render effective fast speed operation thereof which is maintained independently of said circuit-controller so that travel of each car is continued automatically, and means to control automatic slow-down comprising one "up" and one "down" hall push-button for each intermediate landing served, whereby said two hall-buttons per landing control the slowdown operation for all the cars which form the bank.

314. In an intercepting control system for a bank of cars having multi-speed regulation, each system comprising a single circuit-controller in the car to render effective fast speed operation thereof which is maintained independently of said circuit-controller so that car operation is continued automatically, an electro-magnetically operable switch to maintain such continuation of car travel automatically, car and hall push-button controlled circuits and apparatus to control said electro-magnetic switch to effect automatic slow-down, comprising one "up" and one "down" hall push-button for each intermediate landing, and said hall-button controlled circuits for all the cars which form the bank and for any one landing which correspond as to direction being interconnected and controlled at each intermediate landing by said two buttons so that any car of the bank which is first to reach a predetermined point with respect to any landing at which a button is pressed and whose direction of movement corresponds to the button pressed, will be automatically slowed-down by actuation of its associated maintaining switch.

315. In an intercepting control system, the combination with a car, a hoisting motor therefor, reversing switches for the car having operating windings, self-holding circuits for said windings, a single switch in the car to effect car starts and to control said self-holding circuits, electro-magnetically operable switch mechanism to effect fast speed operation of the car, means to control said fast speed controlling means to maintain car movement automatically from floor to floor at said fast speed rate independently of said single switch, means to control said maintaining means to effect automatic slow-down selectively at predetermined points, and means controlled by said maintaining means to control said self-holding circuits for the reversing switch mechanism to effect automatic car stop.

316. In an intercepting control system, the combination with the car, a hoisting motor having a multi-speed regulation, means to control car starts, and means comprising selectively operable push-button controlled circuits and floor-control switches normally open-circuited and controlled automatically in accordance with car position to control slow-down operation of the car.

317. In an intercepting control system, the combination with the car, a hoisting motor having a multi-speed regulation, automatic means to maintain operation of the car at fast speed rate, a car switch to initiate operation of said means, and means comprising push-button controlled circuits and floor-control switches normally open-circuited and controlled in accordance with car position to control said automatic means to effect automatic slow-downs and stops selectively.

318. In an intercepting control system, the combination with the car, a hoisting motor, means to control car starts, selectively operable push-buttons for two or more landings, and an electro-magnetically operable stop switch normally closed subject to the control of all of said push-buttons to control car stops.

319. In an intercepting control system, the combination with the car, a hoisting motor, a motor closing switch mechanism therefor having an operating winding, a self-holding circuit for said winding, and a normally closed circuit-controller in said circuit, controlled automatically in accordance with car position to open said circuit to effect car stops selectively at predetermined points.

320. In an intercepting control system, the combination with the car, a hoisting motor, a single switch in the car to control car starts only, a single circuit-controller to control car stops only and for all landings, and car actuated circuit-controllers to control said single circuit-controller to effect stops successively and selectively at any landings toward which the car is moving.

321. In an elevator system, the combination with a plurality of cars and controlling means therefor comprising means for dispatching all cars to a desired landing, of electro-responsive means controlled in accordance with the movements of said cars for stopping said cars at said landing, and means controlled by the first of said cars to arrive at said landing for rendering said stopping means ineffective to stop the other cars.

322. In a control system for a plurality of elevator cars operable past a floor, motive means for each of said cars, and a controller for said cars, said controller including switching mechanism individual to each car for controlling the motive means for that car, call means associated with said floor and common to all of said cars for establishing a call for service at that floor, means individual to each car and adapted to respond to the operation of said call means to cause operation of the switching mechanism for that car to stop that car, and selective means rendered effective where any car approaches said floor for preventing operation of the switching mechanism for all but one of said cars in response to the operation of said call means, said selective means comprising a selective relay for each car, means responsive to the operation of any one of said selective relays for preventing operation of the others of said selective relays, and circuit connections whereby the operation of the stopping switch mechanism for any car depends upon the previous operation of the selective relay for that car.

323. In a control system for a plurality of elevator cars operable past a floor, motive means for each of said cars, and a controller for said cars, said controller including switching mechanism individual to each car for controlling the motive means for that car, call means associated with said floor and common to all of said cars for establishing a call for service at that floor, means individual to each car and adapted to respond to the operation of said call means to cause operation of the switching mechanism for that car to stop that car, and selective means rendered effective by the first car to approach said floor for preventing operation of the switching mechanism for the other of said cars in response to the operation of said call means, said selective means comprising a selective relay for each car, means electrically associated with said relays and probably responsive to the operation of any of said relays to prevent operation of the others of said relays, and circuit connections whereby the operation of the stopping switch mechanism for any car depends upon the previous operation of the selective relay associated with that car.

In testimony whereof we have signed our names to this specification.

DAVID L. LINDQUIST.
EDWARD L. DUNN.
DAVID C. LARSON.